United States Patent
Werner et al.

(10) Patent No.: US 12,443,588 B2
(45) Date of Patent: Oct. 14, 2025

(54) METHODS AND SYSTEMS FOR TRANSACTIONAL SCHEMA CHANGES

(71) Applicant: Cockroach Labs, Inc., New York, NY (US)

(72) Inventors: Andrew J Werner, Brooklyn, NY (US); Xue Zhang, Astoria, NY (US)

(73) Assignee: Cockroach Labs, Inc., New York, NY (US)

( * ) Notice: Subject to any disclaimer, the term of this patent is extended or adjusted under 35 U.S.C. 154(b) by 747 days.

(21) Appl. No.: 17/476,403

(22) Filed: Sep. 15, 2021

(65) Prior Publication Data

US 2023/0081900 A1    Mar. 16, 2023

(51) Int. Cl.
 *G06F 16/23* (2019.01)
 *G06F 16/21* (2019.01)
 *G06F 16/22* (2019.01)
 *G06F 16/2455* (2019.01)
 *G06F 16/27* (2019.01)

(52) U.S. Cl.
 CPC ........ *G06F 16/2379* (2019.01); *G06F 16/213* (2019.01); *G06F 16/221* (2019.01); *G06F 16/24565* (2019.01); *G06F 16/273* (2019.01)

(58) Field of Classification Search
 CPC .. G06F 16/2379; G06F 16/213; G06F 16/221; G06F 16/24565; G06F 16/273
 See application file for complete search history.

(56) References Cited

U.S. PATENT DOCUMENTS

| | | | | |
|---|---|---|---|---|
| 6,298,478 | B1* | 10/2001 | Nally | G06F 9/54 717/170 |
| 6,457,065 | B1* | 9/2002 | Rich | G06F 9/466 719/329 |
| 10,909,091 | B1* | 2/2021 | Shah | G06F 16/211 |
| 11,941,014 | B1* | 3/2024 | Das | G06F 16/2477 |
| 2005/0066338 | A1* | 3/2005 | Bloesch | G06F 9/4488 719/328 |
| 2006/0117072 | A1* | 6/2006 | McKenney | G06F 16/273 |
| 2016/0350356 | A1* | 12/2016 | Vujic | G06F 16/2329 |
| 2017/0109384 | A1* | 4/2017 | Zhu | G06F 16/2228 |
| 2018/0329931 | A1* | 11/2018 | Baid | G06F 16/213 |

* cited by examiner

*Primary Examiner* — Apu M Mofiz
*Assistant Examiner* — Dara J Glasser
(74) *Attorney, Agent, or Firm* — Goodwin Procter LLP

(57) ABSTRACT

Methods and systems for executing transactional schema changes at a database are provided. The method includes receiving, at a gateway node of a cluster of database nodes, a statement corresponding to a schema of a database stored by the cluster, wherein a parent transaction comprises the statement, the statement comprises a schema change operation to modify the schema, and a first version of one or more versions of a descriptor comprises the schema. The method includes generating, by the parent transaction and using one or more child transactions, a version of a synthetic descriptor comprising an updated schema with an added schema element configured to be available for the parent transaction. The method includes writing the synthetic descriptor as an updated version of the descriptor, wherein the updated version comprises the updated schema with the added schema element in a publicly available state. The method includes committing the parent transaction.

29 Claims, 12 Drawing Sheets

METHODS AND SYSTEMS FOR TRANSACTIONAL SCHEMA CHANGES

FIELD OF TECHNOLOGY

The present disclosure relates generally to methods and systems for managing transactions within a distributed database and more particularly, to implementing schema changes during transaction execution in the database.

BACKGROUND

The foregoing examples of the related art and limitations therewith are intended to be illustrative and not exclusive, and are not admitted to be "prior art." Other limitations of the related art will become apparent to those of skill in the art upon a reading of the specification and a study of the drawings. In some cases, relational databases can apply replication to ensure data survivability, where data is replicated among one or more computing devices ("nodes") of a group of computing devices ("cluster"). A relational database may store data within one or more ranges, where a range is comprised of one or more key-value pairs and is replicated among one or more nodes of the cluster. A range may be a partition of a data table (i.e. "table"), where a table may comprise one or more ranges. In some cases, multiple table configurations may be used to optimally serve range data to client devices. Tables can be configured based on the usage of the stored data and whether the data is frequently read and/or written by client devices.

A database may be configured with one or more logical objects that make up and/or otherwise the define the schema of the database. Examples of such logical objects for a particular database may include schemas, tables, and indexes. A schema may include one or more tables, where each table includes one or more rows. Each key-value (KV) in a row may correspond to a particular column within the table. An index may be a copy of rows for one or more particular columns of a table, where the rows are sorted by a column (or set of columns) included in the table. Each index may correspond to a singular table within the database.

A database may be initially configured with one or more schema to store KV data. In some cases, during operation of the database, users and/or system administrators may wish to modify the schema of the database (e.g., to optimize data management and access). To manipulate and/or otherwise define schema (or data stored within the schema) of a database, individuals may initiate schema changes using one or more transactions (e.g., initiated via a SQL client). Transactions may involve execution of one or more operations, including data manipulation statements (DMLs) and/ or data definition statements (DDLs). Examples of DMLs may include "insert", "update", "delete", and "select" operations associated with rows and/or columns of a particular data table. Examples of DDLs may include "alter", "add", "create", and "drop" operations to modify indexes, rows, columns, and/or constraints of a particular data table. In some cases, based on underlying database architecture, schema changes within a particular database may occur while the database is online and running, enabling schema changes (i.e. online schema changes) without database outages. Such a configuration allows for applications and system that rely on the database to operate without downtime (e.g., periods where data is inaccessible for DMLs and/or DDLs), improving transaction latency.

Existing solutions for implementing online schema changes include converting original schema to new (i.e. updated) schema using one or more discrete steps, where a different version of the schema may correspond to each step. Particular schema may be asynchronously stepped through one or more states after the transaction corresponding to the schema change commits. Each version of the schema may be distributed to each node of a cluster of nodes, such that one or more versions (e.g., two) of the schema may be active (e.g., in use) at a particular point in time. Each version of the schema may correspond to a change to a state of the schema (or schema element) subject to the schema change. Examples of states of particular schema may include "public", "delete-only", "write-only", and "absent". In some cases, delete-only and write-only states may be known as "intermediate states". For schema in a public state, a transaction may read, add to, and/or delete the data stored within the schema using any suitable operations. For schema in a delete-only state, a transaction may delete the data stored within the schema using operations such as "update" and "delete". For schema in a write-only state, a transaction may add to and/or delete the data stored within the schema using operations such as "insert", "update", and "delete". Schema that does not exist in the database may be absent. But, due to the asynchronous nature of online schema changes, schema changes are asynchronously implemented after a schema change transaction commits. Such a configuration can result in functional disadvantages described as follows: (1) when a schema change transaction commits, DMLs included in the transaction may also commit, but DDLs included in the transaction may only be queued for asynchronous execution (e.g. stepping through states and propagating each state to nodes) after the transaction commits, introducing the possibility for DDLs to fail and result in a partial commit (and non-atomicity) of the schema change transaction, and (2) changes to schema may not be visible and/or accessible for subsequent write operations within the schema change transaction, such that the transactional model of the database is not upheld. As such, improved methods and systems are required to enable transactional schema changes, where online schema changes may occur during (rather than after) the execution of a schema change transaction at a database.

SUMMARY

Methods and systems for execution of transactional schema changes at a database are disclosed. In one aspect, embodiments of the invention feature a method for transactional schema changes. According to one embodiment, the method can include receiving, at a gateway node of a cluster of database nodes, a statement corresponding to a schema of a database stored by the cluster, wherein a parent transaction comprises the statement, the statement comprises a schema change operation to modify the schema, and a first version of one or more versions of a descriptor comprises the schema. The method can include generating, by the parent transaction and using one or more child transactions, a version of a synthetic descriptor comprising an updated schema with an added schema element configured to be available to one or more operations within the parent transaction, wherein the version of the synthetic descriptor is physically compatible with a current version of the one or more versions of the descriptor. The method can include writing the synthetic descriptor as an updated version of the one or more versions of the descriptor, wherein the updated version comprises the updated schema with the added schema element in a publicly available state, wherein the current version of the descriptor precedes the updated version of the descriptor. The method can include committing the parent transaction.

In various embodiments, the schema can be one of a table, type, view, sequence, database, role, or namespace, wherein the schema can be comprised of at least one of a column, index, constraint, value, overload, and default value. The schema change operation can include a data definition language (DDL) operation. The version of the synthetic descriptor being physically compatible with a current version of the descriptor further comprises first data included the schema of the version of the synthetic descriptor and second data included in the schema of the current version of the descriptor being readable to one or more concurrent transactions originating from one or more client devices. The method can include acquiring a lock on the first version of the descriptor to exclusively modify the schema comprised in the first version of the descriptor by writing to a descriptor coordination table stored by the cluster. The method can include reading, by a first child transaction of the parent transaction, the first version of the descriptor comprising the schema. Reading the first version of the descriptor comprising the schema can include determining whether a pending schema change exists for the first version of the descriptor and if a pending schema change exists for the first version of the descriptor, removing the pending schema change for the first version of the descriptor.

In some embodiments, the method can include writing, by the first child transaction, a second version of the one or more versions of the descriptor, wherein the second version comprises the updated schema with the added schema element in a delete-only state, wherein the added schema element comprises a column or an index, wherein an index comprises one or more rows corresponding to at least one column of the schema. The method can further include waiting, by a second child transaction of the parent transaction, for the second version of the descriptor to propagate to each of the database nodes of the cluster and committing the second child transaction. The method can further include writing, by a third child transaction of the parent transaction, a third version of the one or more versions of the descriptor, wherein the third version comprises the updated schema with the added schema element in a write-only state, wherein the third version is the current version of the descriptor. The method can include writing, by a third or subsequent child transaction of the parent transaction, a third or a successor version of the one or more versions of the descriptor comprising the one or more added, removed, or modified schema elements in a logically equivalent and physically compatible state relative to the predecessor state. The method can further include waiting, by a fourth child transaction of the parent transaction, for the third version of the descriptor to propagate to each of the database nodes of the cluster and committing the fourth child transaction. The method can further include waiting, by a fourth or a subsequent child transaction of the parent transaction, for a latest committed version of the descriptor to propagate to each of the database nodes of the cluster. The method can further include filling, at each of the database nodes of the cluster, the added schema element comprised in the third version of the descriptor with one or more values based on a default value and one or more values written by one or more concurrent transactions operating on the schema.

In some embodiments, the method can include writing, by the first child transaction, a second version of the one or more versions of the descriptor, wherein the second version comprises the updated schema with the added schema element in a validating state, wherein the added schema element comprises a constraint for one or more columns of the schema, wherein the second version is the current version of the descriptor. The method can further include waiting, by a second child transaction of the parent transaction, for the second version of the descriptor to propagate to each of the database nodes of the cluster. The method can further include validating that the one or more columns comprise data that adheres to the constraint. Validating that the one or more columns comprise data that adheres to the constraint can further include: identifying whether one or more concurrent transactions operating on the schema violate the constraint and if the one or concurrent transactions violate the constraint, failing to commit the parent transaction. Identifying whether one or more concurrent transactions violate the constraint can further include: scanning a constraint coordination table to identify whether the one or more concurrent transactions have written to the constraint coordination table. The method can further include receiving a second statement as a part of the parent transaction, wherein the second statement comprises a data manipulation language (DML) operation or a data definition language (DDL) operation corresponding to the added schema element and modifying, within the parent transaction and based on the DML operation or the DDL operation, the updated schema comprised in the synthetic descriptor. The method can include waiting, by the parent transaction, for each of the database nodes of the cluster to release a lease for a version of the descriptor that precedes the updated version of the descriptor. The method can further include sending, based the updated version of the descriptor propagating to each of the database nodes of the cluster, an indication of a success of the operation to modify the schema to a client device.

In another aspect, the invention features a system for execution of transactional schema changes. The system can include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
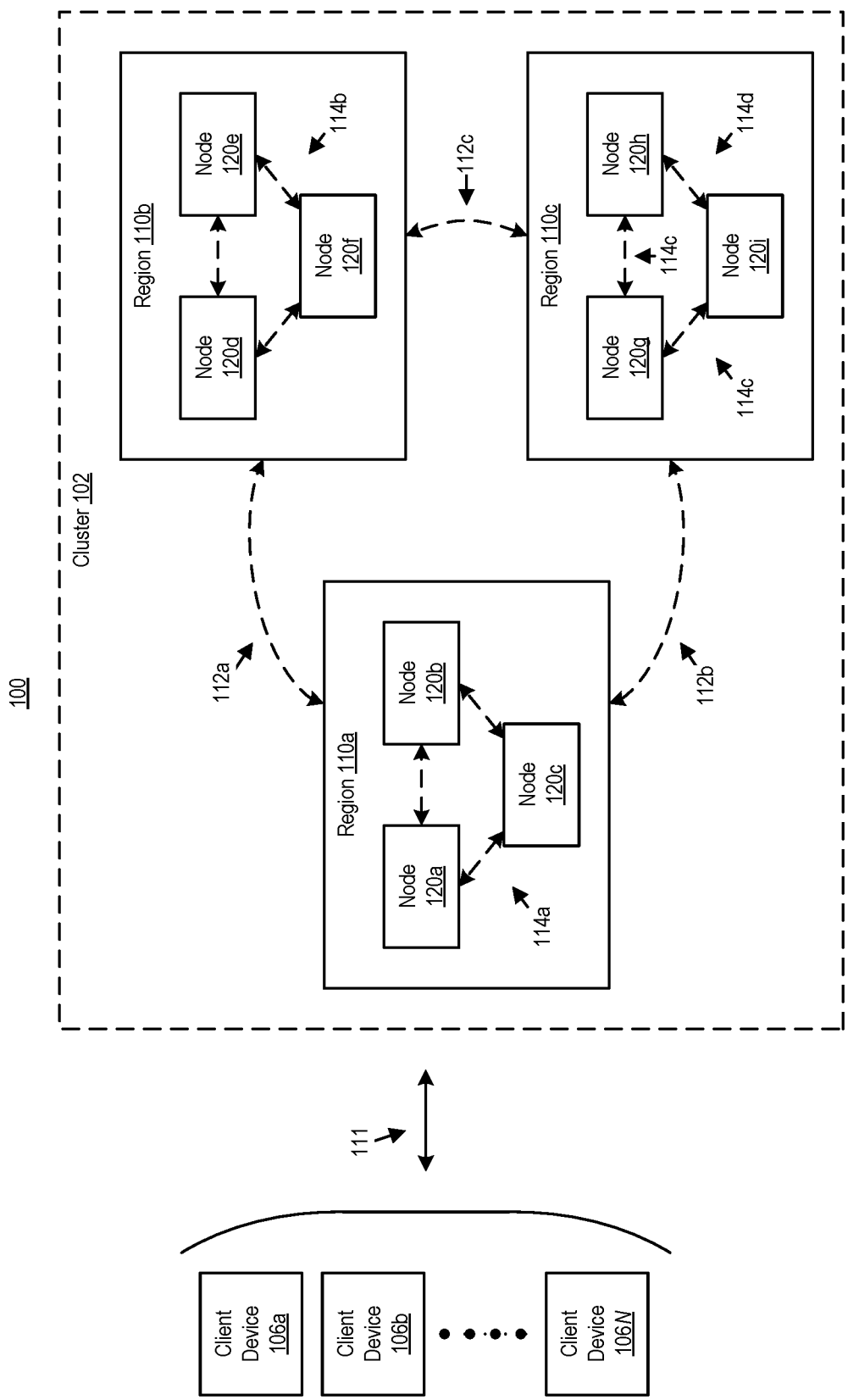
FIG. 1 ("FIG. 1") shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for execution of transactional schema change at a database are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

As described above, schema changes may include operations that add, remove, and/otherwise manipulate schema of a particular distributed database. In some cases, these operations may include DMLs and DDLs, which can respectively manipulate or define schema within the database. Existing online schema change mechanisms for distributed databases enable schema changes that are implemented after, rather than before a schema change transaction is committed. While such online schema change mechanisms improve data availability (and application usability for applications that rely on the data) by enabling access to data while the associated schema undergoes changes, these schema change mechanisms enable operating disadvantages. In some cases, the disadvantages can include the lack of atomicity of DDLs, which may arise when particular asynchronous DDLs (e.g., DDLs queued to execute after the transaction commits) fail to successfully complete. Accordingly, schema changes that may never successfully complete may be visible to concurrent transactions. Further, the disadvantages can include non-visible DDLs, where schema modified by DDLs of a transaction are not available in their modified state for subsequent write (or other) operations within the transaction. As an example, a column added to a table via a DDL included in a transaction may not be written to within the transaction, as the DDL is queued to execute after the transaction has committed. To write to the modified schema, additional write transactions are required, further increasing the time and complexity associated with manipulating the data within the schema. Thus, there is a pressing need for improved techniques for schema changes, such that DDLs can execute underneath their corresponding transaction and subsequent write operations can operate with the schema resulting from the executed DDLs.

Terms

"Cluster" generally refers to a deployment of computing devices that comprise a database. A cluster may be located in one or more geographic locations (e.g., data centers). The one or more geographic locations may be located within a single geographic region (e.g., eastern United States, central United States, etc.) or more than one geographic location. For example, a cluster may be located in both the eastern United States and western United States, with 2 data centers in the eastern United states and 4 data centers in the western United States.

"Node" generally refers to an individual computing device that is a part of a cluster. A node may join with one or more other nodes to form a cluster. One or nodes that comprise a cluster may store data (e.g., tables, indexes, etc.) in a map of key-value pairs. A node may store a "range", which can be a subset of the key-value pairs (or all of the key-value pairs depending on the size of the range) stored by the cluster. A table and its secondary indexes can be mapped to one or more ranges, where each key-value pair in a range may represent a single row in the table (which can also be known as the primary index because the table is sorted by the primary key) or a single row in a secondary index. Based on the range reaching or exceeding a threshold storage size, the range may split into two ranges. For example, based on reaching 512 mebibytes (MiB) in size, the range may split into two ranges. Successive ranges may split into one or more ranges based on reaching or exceeding a threshold storage size.

"Replica" generally refers to a copy of a range. A range may be replicated a threshold number of times. For example, a range may be replicated 3 times into 3 distinct replicas. Each replica of a range may be stored on a distinct node of a cluster. For example, 3 replicas of a range may each be stored on a different node of a cluster. In some cases, a range may be required to be replicated a minimum of 3 times.

"Leaseholder" or "leaseholder replica" generally refers to a replica of a range that is configured to hold the lease for the replicas of the range. The leaseholder may receive and/or coordinate read transactions and write transactions directed to one or more key-value pairs stored by the range. "Leaseholder node" may generally refer to the node of the cluster that stores the leaseholder replica. The leaseholder may receive read transactions and serve reads to client devices indicated by the read transactions. Other replicas of the range that are not the leaseholder may receive read transactions and route the read transactions to the leaseholder, such that the leaseholder can serve the read based on the read transaction.

"Raft leader" or "leader" generally refers to a replica of the range that is a leader for managing write transactions for a range. In some cases, the leader and the leaseholder are the same replica for a range. In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority of the replicas of the range.

"Follower" generally refers to a replica of the range that is not the leader. "Follower node" may generally refer to a node of the cluster that stores the follower replica. Follower replicas may receive write transactions from the leader replica.

"Raft log" generally refers to a time-ordered log of write transactions to a range, where the log of write transactions includes write transactions agreed to by a threshold number of the replicas of the range. Each replica of a range may include a raft log stored on the node that stores the replica. A raft log may be a source of truth for replication among nodes for a range.

"Consistency" generally refers to causality and the ordering of transactions within a distributed system. Consistency defines rules for operations within the distributed system, such that data stored by the system will remain consistent with respect to read and write operations originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write transaction. Based on achieving consensus, data modified by the write transaction may be stored within the ranges targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

"Table leaseholder" may refer to a node of the cluster that holds a lease (e.g., non-exclusive lease) on a particular version of a descriptor corresponding to a schema (e.g., table, database, etc.) or schema element (e.g., types, sequences, views, etc.). One or more nodes may hold a lease on a particular version of a descriptor corresponding to schema or a schema element. For example, one or more nodes may hold a lease on a current or previous version of a table descriptor corresponding to a table.

Database Overview

A database stored by a cluster of nodes may operate based on one or more remote procedure calls (RPCs). The database may be comprised of a key-value store distributed among the nodes of the cluster. In some cases, the RPCs may be SQL RPCs. In other cases, RPCs based on other programming languages may be used. Nodes of the cluster may receive SQL RPCs from client devices. After receiving SQL RPCs, nodes may convert the SQL RPCs into operations that may operate on the distributed key-value store.

In some embodiments, as described herein, the key-value store of the database may be comprised of one or more ranges. A range may be a configured storage size. For example, a range may be 512 MiB. Each range may be replicated to more than one node to maintain data survivability. For example, each range may be replicated to at least 3 nodes. By replicating each range to more than one node, if a node fails, replica(s) of the range would still exist on other nodes such that the range can still be accessed by client devices and replicated to other nodes of the cluster.

In some embodiments, a node may receive a read transaction from a client device. A node may receive a write transaction from a client device. In some cases, a node can receive a read transaction or a write transaction from another node of the cluster. For example, a leaseholder node may receive a read transaction from a node that originally received the read transaction from a client device. In some cases, a node can send a read transaction to another node of the cluster. For example, a node that received a read transaction, but cannot serve the read transaction may send the read transaction to the leaseholder node. In some cases, if a node receives a read or write transaction that it cannot directly serve, the node may send and/or otherwise route the transaction to the node that can serve the transaction.

In some embodiments, modifications to the data of a range may rely on a consensus algorithm to ensure a threshold number of replicas of the range agree to commit the change. The threshold may be a majority of the replicas of the range. The consensus algorithm may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time.

Database Layers

In some embodiments, database architecture for the cluster of nodes may be comprised of one or more layers. The one or more layers may process received SQL RPCs into actionable processes to access, modify, store, and return data to client devices, while providing for data replication and consistency among nodes of a cluster. The layers may comprise one or more of: a SQL layer, a transactional layer, a distribution layer, a replication layer, and a storage layer.

SQL Layer

In some embodiments, the database architecture for the cluster may include a SQL layer. In some cases, the database may operate using at least some American National Standards Institute (ANSI) defined SQL standards. The SQL layer may operate as an intermediary between client devices and nodes of the cluster. Client devices may interact with and/or otherwise access a database using SQL statements. Client devices may include a SQL application programming interface (API) to communicate with the cluster. SQL statements may reach a node of the cluster via a wire protocol. For example, SQL statements may be sent to a node of the cluster via a PostgreSQL wire protocol. The SQL layer may convert the SQL statements (received from the client devices) to a plan of key-value (KV) operations. The SQL layer may send the converted KV operations to another layer of the database.

Based on receiving a SQL request from a client device at a node of the cluster, the SQL layer may parse the SQL request in view of the supported syntax of the database. Based on parsing the SQL request, the SQL layer may convert a query of the SQL request into an abstract syntax tree (AST) to create a query plan associated with the SQL request. The AST may be used to generate a query plan based on three phases. In phase 1, the AST may be transformed into a logical query plan, where the SQL layer may perform semantic analysis. In some cases, as a part of semantic analysis, the SQL layer may determine whether the query of the SQL request is valid, resolve names within the query, remove intermediate computations that are determined to be unnecessary, and/or determine data types for intermediate results of the query. In phase 2, the SQL layer may simplify the logical query plan using one or more transformation optimizations. In phase 3, the SQL layer may optimize the logical query plan using a search algorithm, wherein the search algorithm evaluates one or more methods of executing the query and selects the method having the lowest cost. In some cases, the cost may be measured in time. Cost may be determined based on estimating the time each node in the query plan will use to process all results of the query and modeling data flow through the query plan. The result of phase 3 may be an optimized logical query plan.

In some embodiments, based on determining an optimized logical query plan for the SQL request, the SQL layer may determine which nodes of the cluster may be included in execution of the query to generate a physical plan. The SQL layer may determine the nodes to be included in the execution of the query based on locality (e.g., location) information for the range. For example, the SQL layer may distribute the query to nodes located close to the geographic location of the stored data. Based on generating the physical plan, the SQL layer may send the physical plan to one or more nodes for execution.

On each node that received the physical plan, the SQL layer may determine a part of the query. One or more logical processors located at each node may communicate with each other over a logical flow of data to determine one or more results for the query. The results of the query may be combined and sent back to the node where the SQL request was received. Based on receiving the combined results of the query at the node where the SQL request was received, the SQL may send the combined results to the client device.

To execute the query, each processor of a node may require encoded data for the scalar values manipulated by the query. The encoded data may be a binary data that is different from the string data used in the SQL layer. Based on requiring binary data, the contents of the SQL query may be encoded to binary form, such that the binary data may be communicated between logical processors and/or read from a storage device of the node.

In some embodiments, the SQL layer may encode data for use by the lower layers of the database during query execution. The SQL layer may encode data by converting row data (e.g., from a SQL representation as strings) into bytes for use by lower layers of the database. Based on receiving data as bytes (e.g., returned from lower layers after query execution), the SQL layer may convert the bytes into string data, such that the string data may be sent to the client device. In some cases, such byte encoding may preserve the order of the received string data. By storing bytes in the same order as the string data as it was received, the database may efficiently scan for KV data stored in ranges.

In some embodiments, for non-indexed columns of a range, the SQL layer may instead use an encoding method (e.g. value encoding) that requires less storage capacity. Value encoding may not preserve the ordering of the received string data of the SQL query.

Transaction Layer

In some embodiments, the database architecture for the cluster may include a transaction layer. The transaction layer may enable atomicity, consistency, isolation, and durability (ACID) semantics for transactions within the database. The transaction layer may receive binary KV operations from the SQL layer and control KV operations sent to a distribution layer.

In some embodiments, for write transactions, the transaction layer may generate one or more locks. A lock may represent a provisional, uncommitted state. The lock may be written as part of the write transaction. The database architecture may include multiple lock types. In some cases, the transactional layer may generate unreplicated locks, which may be stored in an in-memory, lock table that is specific to the node on which the write transaction executes. An unreplicated lock may not be replicated based on the consensus algorithm as described herein. In other cases, the transactional layer may generate one or more replicated locks (or write intents). A replicated lock may operate as a provisional value and an exclusive lock on a node on which the write transaction executed. A replicated lock may be replicated to other nodes of the cluster comprising the range based on the consensus algorithm as described herein. In some cases, a replicated lock may be known as a "write intent".

In some embodiments, a transaction record may be stored in a replica of a range where a first write transaction occurs. A transaction record may include a state of the transaction. States for a transaction may include the following: pending, staging, committed, or aborted. A pending state may indicate that a write intent's transaction is in progress. A staging state may be used to enable parallel commits as to be described herein. A write transaction may or may not be in a committed state during a staging state. An aborted state may indicate the write transaction has been aborted and the values (e.g., values written to the range) associated with the write transaction may be discarded and/or otherwise dropped from the range. As write intents are generated by the transaction layer as a part of a write transaction, the transaction layer may check for newer (e.g., more recent) committed values at the KVs of the range on which the write transaction is operating. If newer committed values exist at the KVs of the range, the write transaction may be restarted. Alternately, if the write transaction identifies write intents at the KVs of the range, the write transaction may be resolved as a transaction conflict as to be described herein.

In some embodiments, for read transactions, the transaction layer may execute a read transaction at KVs of a range indicated by the read transaction. The transaction layer may execute the read transaction if the read transaction is not aborted. The read transaction may read multi-version concurrency control (MVCC) values at the KVs of the range as to be described herein in "Storage Layer". Alternately, the read transaction may read write intents at the KVs, such that the read transaction may be resolved as a transaction conflict as to be described herein.

In some embodiments, to commit a write transaction, the transaction layer may determine the transaction record of the write transaction as it executes. The transaction layer may restart the write transaction based on determining the state of the write transaction indicated by the transaction record is aborted. Alternately, the transaction layer may determine the transaction record to indicate the state as pending or staging. Based on the transaction record indicating the write transaction is in a pending state, the transaction layer may set the transaction record to staging and determine whether the write intents of the write transaction have succeeded (i.e. been replicated to the other nodes of the cluster storing the range). If the write intents have succeeded, the transaction layer may report the commit of the transaction to the client device that initiated the write transaction.

In some embodiments, based on committing a write transaction, the transaction layer may cleanup the committed write transaction. A coordinating node of the cluster of nodes to which the write transaction was directed may cleanup the committed write transaction via the transaction layer. A coordinating node may be a node that comprises the range that is the subject of the transaction. The coordinating node may track a record of the KVs that were the subject of the write transaction. To clean up the transaction, the coordinating node may modify the state of the transaction record for the write transaction from staging to committed. In some cases, the coordinating node may resolve the write intents of the write transaction to MVCC (i.e. committed) values by removing the pointer to the transaction record. Based on removing the pointer to the transaction record for the write transaction, the coordinating node may delete the write intents of the transaction.

In some embodiments, the transaction layer may track timing of transactions (e.g., to maintain serializability). The transaction layer may implement hybrid-logical clocks (HLCs) to track time within the cluster. An HLC may be composed of a physical component (e.g., which may be close to local wall time) and a logical component (e.g., which is used to distinguish between events with the same physical component). HLC time may always be greater than or be equal to the wall time. Each node may include a local HLC.

For a transaction, the gateway node (e.g., the node that initially receives a transaction) may determine a timestamp for the transaction based on HLC time for the node. The transaction layer may enable transaction timestamps based on HLC time. A timestamp within the cluster may be used to track versions of KVs (e.g., through MVCC as to be described herein) and provide guaranteed transactional isolation.

For a transaction, based on a node sending a transaction to another node, the node may include the timestamp generated by the local HLC (i.e. the HLC of the node) with the transaction. Based on receiving a request from another node (i.e. sender node), a node (i.e. receiver node) may inform the local HLC of the timestamp supplied with the transaction by the sender node. In some cases, the receiver node may update the local HLC of the receiver node with the timestamp included in the received transaction. Such a process may ensure that all data read and/or written to a node has a timestamp less than the HLC time at the node. Accordingly, the leaseholder for a range may serve reads for data stored by the leaseholder, where the read transaction that reads the data includes an HLC time greater than HLC timestamp of the MVCC value read by the read transaction (i.e., the read occurs "after" the write).

In some embodiments, to maintain data consistency, the transaction layer may cause a node to crash. A node may crash if the node detects that its local HLC is out of sync with at least half of the other nodes in the cluster. In some cases, out of sync may be defined as 80% of the maximum allowed offset. A maximum allowed offset may be the maximum allowed timestamp difference between nodes of the cluster. In an example, the maximum allowed offset may be 500 ms.

To provide serializability within the cluster, based on a transaction reading a value, the transaction layer may store the operation's timestamp in a timestamp cache. The timestamp cache may include the transaction having the latest timestamp (i.e. the furthest ahead in time) for value(s) read by the transaction. Based on execution of a write transaction, the transaction layer may compare the timestamp of the write transaction to the timestamp cache. If the timestamp is less than the latest time of the timestamp cache, the transaction layer may attempt to advance the timestamp of the write transaction forward to a later time. In some cases, advancing the timestamp may cause the write transaction to restart in the second phase of the transaction as to be described herein with respect to read refreshing.

As described herein, the SQL layer may convert SQL statements (e.g., received from client devices) to KV operations. KV operations generated from the SQL layer may use a Client Transaction (CT) transactional interface of the transaction layer to interact with the KVs stored by the cluster. The CT transactional interface may include a Transaction Coordination Sender (TCS). The TCS may perform one or more operations as a part of the transaction layer. Based on the execution of a transaction, the TCS may send (e.g., periodically send) "heartbeat" messages to a transaction record for the transaction record. These messages may indicate that the transaction should keep executing (i.e. be kept alive). If the TCS fails to send the "heartbeat" messages, the transaction layer may modify the transaction record to an aborted status. The TCS may track each written KV and/or KV range during the course of a transaction. In some embodiments, the TCS may clean and/or otherwise clear accumulated transaction operations. The TCS may clear an accumulated write intent for a write transaction based on the status of the transaction changing to committed or aborted.

As described herein, to track the status of a transaction during execution, the transaction layer writes a value (known as a transaction record) to the KV store. Write intents of the transaction may route conflicting transactions to the transaction record, such that the conflicting transaction may determine a status for conflicting write intents. The transaction layer may write transaction records to the same range as the first KV indicated in a transaction. The TCS may track the first KV indicated in a transaction. The transaction layer may generate the transaction when one of the following occurs: the write operation commits; the TCS sends heartbeat messages for the transaction; or an operation forces the transaction to abort. As described herein, a transaction record may have one of the following states:

pending, committed, staging, or aborted. In some cases, the transaction record may not exist. If a transaction encounters a write intent, where a transaction record corresponding to the write intent does not exist, the transaction may use the timestamp of the write intent to determine how to proceed. If the timestamp of the write intent is within a transaction liveness threshold, the write intent may be treated as pending. If the timestamp of the write intent is not within the transaction liveness threshold, the write intent may be treated as aborted. A transaction liveness threshold may be a duration based on a period for sending "heartbeat" messages. For example, the transaction liveness threshold may be a duration lasting for 5 "heartbeat" message periods, such that after 5 missed heartbeat messages, a transaction may be aborted. The transaction record for a committed transaction may remain until each of the write intents of the transaction are converted to MVCC values.

As described herein, in the transaction layer, values may not be written directly to the storage layer during a write transaction. Values may be written in a provisional (i.e. uncommitted) state known as a write intent. Write intents may be MVCC values with a pointer to a transaction record to which the MVCC value belongs. Based on interacting with a write intent (instead of an MVCC value), an operation may determine the status of the transaction record, such that the operation may determine how to interpret the write intent. As described herein, if a transaction record is not found for a write intent, the operation may determine the timestamp of the write intent to evaluate whether or not the write intent may be considered to be expired.

In some embodiments, based on encountering and/or otherwise interacting with a write intent, an operation may attempt to resolve the write intent. The operation may resolve the write intent based on the state of the write intent identified in the transaction record. For a committed state, the operation may read the write intent and convert the write intent to an MVCC value. The operation may convert the write intent to an MVCC value by removing the write intent's pointer to the transaction record. For an aborted state, the operation may ignore the write intent (e.g., the operation may not read the write intent) and the operation may delete the write intent. For a pending state, a transaction conflict may exist and the transaction conflict may be resolved as to be described herein. For a staging state, the operation may determine whether the staging transaction is still in progress. The operation may determine the transaction is still in progress by verifying that the TCS is still sending "heartbeat" messages to the transaction record. If the operation verifies the TCS is sending "heartbeat" messages to the record, the operation should wait. For a record that does not exist, the operation may determine the transaction state to be pending if the write intent was created within a transaction liveness threshold as described herein. If the write intent was not created within a transaction liveness threshold, the operation may determine the write intent to be aborted.

In some embodiments, the transaction layer may include a concurrency manager for concurrency control. The concurrency manager may sequence incoming requests (e.g., from transactions) and may provide isolation between the transactions that issued those requests that intend to perform conflicting operations. This activity may be known as concurrency control. The concurrency manager may combine the operations of a latch manager and a lock table to accomplish this work. The latch manager may sequence the incoming requests and may provide isolation between those requests. The lock table may provide locking and sequencing of requests (in combination with the latch manager). The lock table may be a per-node, in-memory data structure. The lock table may hold a collection of locks acquired by transactions that are in-progress as to be described herein.

As described herein, the concurrency manager may be a structure that sequences incoming requests and provides isolation between the transactions that issued those requests, where the requests intend to perform conflicting operations. During sequencing, the concurrency manager may identify conflicts. The concurrency manager may resolve conflicts based on passive queuing and/or active pushing. Once a request has been sequenced by the concurrency manager, the request may execute (e.g., without other conflicting requests/operations) based on the isolation provided by the concurrency manager. This isolation may last for the duration of the request. The isolation may terminate based on (e.g., after) completion of the request. Each request in a transaction may be isolated from other requests. Each request may be isolated during the duration of the request, after the request has completed (e.g., based on the request acquiring locks), and/or within the duration of the transaction comprising the request. The concurrency manager may allow transactional requests (i.e. requests originating from transactions) to acquire locks, where the locks may exist for durations longer than the duration of the requests themselves. The locks may extend the duration of the isolation provided over specific keys stored by the cluster to the duration of the transaction. The locks may be released when the transaction commits or aborts. Other requests that encounter and/or otherwise interact with the locks (e.g., while being sequenced) may wait in a queue for the locks to be released. Based on the locks being released, the other requests may proceed. The concurrency manager may include information for external locks (e.g., the write intents)

In some embodiments, one or more locks may not be controlled by the concurrency manager, such that one or more locks may not be discovered during sequencing. As an example, write intents (i.e. replicated, exclusive locks) may be stored such that that may not be detected until request evaluation time. In most embodiments, fairness may be ensured between requests, such that if any two requests conflict, the request that arrived first will be sequenced first. Sequencing may guarantee first-in, first-out (FIFO) semantics. An exception to FIFO semantics is that a request that is part of a transaction which has already acquired a lock may not need to wait on that lock during sequencing. The request may disregard any queue that has formed on the lock. Lock tables as to be described herein may include one or more other exceptions to the FIFO semantics described herein.

In some embodiments, as described herein, a lock table may be a per-node, in-memory data structure. The lock table may store a collection of locks acquired by in-progress transactions. Each lock in the lock table may have an associated lock wait-queue. Conflicting transactions can queue in the associated lock wait-queue based on waiting for the lock to be released. Items in the locally stored lock wait-queue may be propagated as necessary (e.g., via RPC) to an existing Transaction Wait Queue (TWQ). The TWQ may be stored on the leader replica of the range, where the leader replica may contain the transaction record.

As described herein, databases stored by the cluster may be read and written using one or more "requests". A transaction may be composed of one or more requests. Isolation may be needed to separate requests. Additionally, isolation may be needed to separate transactions. Isolation for requests and/or transactions may be accomplished by maintaining multiple versions and/or by allowing requests to acquire locks. Isolation based on multiple versions may require a form of mutual exclusion, such that a read and a conflicting lock acquisition do not occur concurrently. The lock table may provide locking and/or sequencing of requests (in combination with the use of latches).

In some embodiments, locks may last for a longer duration than the requests associated with the locks. Locks may extend the duration of the isolation provided over specific KVs to the duration of the transaction associated with the lock. As described herein, locks may be released when the transaction commits or aborts. Other requests that encounter and/or otherwise interact with the locks (e.g., while being sequenced) may wait in a queue for the locks to be released. Based on the locks being released, the other requests may proceed. In some embodiments, the lock table may enable fairness between requests, such that if two requests conflict, then the request that arrived first may be sequenced first. In some cases, there may be exceptions to the FIFO semantics as described herein. A request that is part of a transaction that has acquired a lock may not need to wait on that lock during sequencing, such that the request may ignore a queue that has formed on the lock. In some embodiments, contending requests that encounter different levels of contention may be sequenced in a non-FIFO order. Such sequencing in a non-FIFO order may enable greater concurrency. As an example, if requests $R_1$ and $R_2$ contend on key $K_2$, but $R_1$ is also waiting at key $K_1$, $R_2$ may be determined to have priority over $R_1$, such that $R_2$ may be executed on $K_2$.

In some embodiments, as described herein, a latch manager may sequence incoming requests and may provide isolation between those requests. The latch manager may sequence and provide isolation to requests under the supervision of the concurrency manager. A latch manager may operate as follows. As write requests occur for a range, a leaseholder of the range may serialize write requests for the range. Serializing the requests may group the requests into a consistent order. To enforce the serialization, the leaseholder may create a "latch" for the keys in the write value, such that a write request may be given uncontested access to the keys. If other requests access the leaseholder for the same set of keys as the previous write request, the other requests may wait for the latch to be released before proceeding. In some cases, read requests may generate latches. Multiple read latches over the same keys may be held concurrently. A read latch and a write latch over the same keys may not be held concurrently.

In some embodiments, the transaction layer may execute transactions at a serializable transaction isolation level. A serializable isolation level may not prevent anomalies in data stored by the cluster. A serializable isolation level may be enforced by requiring the client device to retry transactions if serializability violations are possible.

In some embodiments, the transaction layer may allow for one or more conflict types, where a conflict type may result from a transaction encountering and/or otherwise interacting with a write intent at a key. A write/write conflict may occur when two pending transactions create write intents for the same key. A write/read conflict may occur when a read transaction encounters an existing write intent with a timestamp less than the timestamp of the read transaction. To resolve the conflicts, the transaction layer may proceed through one or more operations. Based on a transaction within the conflicting transactions having a defined transaction priority (e.g., high priority, low priority, etc.), the transaction layer may abort the transaction with lower priority (in a write/write conflict) or advance the timestamp of the transaction having a lower priority. Based on a transaction within the conflicting transactions expired, the expired transaction may be aborted. A transaction may be considered to be expired if the transaction does not have a transaction record and the timestamp for the transaction is outside of the transaction liveness threshold. A transaction may be considered to be expired if the transaction record corresponding to the transaction has not received a "heartbeat" message from the TCS within the transaction liveness threshold. A transaction (e.g. a low priority transaction) that is required to wait on a conflicting transaction may enter the TWQ as described herein.

In some embodiments, the transaction layer may allow for one or more additional conflict types that do not involve write intents. A write after read conflict may occur when a write transaction having a lower timestamp conflicts with a read transaction having a higher timestamp. The timestamp of the write transaction may advance past the timestamp of the read transaction, such that the write transaction may execute. A read within an uncertainty window may occur when a read transaction encounters a KV with a higher timestamp and there exists ambiguity whether the KV should be considered to be in the future or in the past of the read transaction. An uncertainty window may be configured based on the maximum allowed offset between the clocks (e.g., HLCs) of any two nodes within the cluster. In an example, the uncertainty window may be equivalent to the maximum allowed offset. A read within an uncertainty window may occur based on clock skew. The transaction layer may advance the timestamp of the read transaction past the timestamp of the KV according to read refreshing as to be described herein. If the read transaction associated with a read within an uncertainty window has to be restarted, the read transaction may never encounter an uncertainty window on any node which was previously visited by the read transaction. In some cases, there may not exist an uncertainty window for KVs read from the gateway node of the read transaction.

In some embodiments, as described herein, the Transaction Wait Queue (TWQ) may track a transaction that could not advance another transaction corresponding to write intents encountered by the transaction. The transaction may wait for the blocking transaction to complete before it can execute. The structure of the TWQ may map a transaction to the one or more other transactions blocked by the transaction. The TWQ may operate on the leader replica of a range, where the leader replica includes the transaction record. Based on a blocking transaction (i.e. a transaction that blocks one or more other transactions) resolving (e.g., by committing or aborting), an indication may be sent to the TWQ that indicates the transactions blocked by the blocking transaction may begin to execute. A blocked transaction (i.e. a transaction blocked by a blocking transaction) may examine their transaction status to determine whether they are active. If the transaction status for the blocked transaction indicates the blocked transaction is aborted, the blocked transaction may be removed by the transaction layer. In some cases, deadlock may occur between transactions, where a first transaction may be blocked by write intents of a second transaction and the second transaction may be blocked by write intents of the first transaction. If transactions are deadlocked, one transaction of the deadlocked transactions may randomly abort, such that the active (i.e. alive) transaction may execute and the deadlock may be removed.

In some embodiments, the transaction layer may enable read refreshing. When a timestamp of a transaction has been advanced, additional considerations may be required before the transaction may commit at the advanced timestamp. Considerations may include checking KVs previously read by the transaction to verify that other write transactions have not occurred at the KVs between the original transaction timestamp and the advanced transaction timestamp. This consideration may prevent serializability violations. The check may be executed by tracking each read using a Refresh Request (RR). If the check succeeds (e.g., write transactions have not occurred between the original transaction timestamp and the advanced transaction timestamp), the transaction may be allowed to commit. A transaction may perform the check at a commit time if the transaction was advanced by a different transaction or by the timestamp cache. A transaction may perform the check based on encountering a read within an uncertainty interval. If the check is unsuccessful, then the transaction may be retried at the advanced timestamp.

In some embodiments, the transaction layer may enable transaction pipelining. Write transactions may be pipelined when being replicated to follower replicas and when being written to storage. Transaction pipelining may reduce the latency of transactions that perform multiple writes. In transaction pipelining, write intents may be replicated from leaseholders to follower replicas in parallel, such that waiting for a commit occurs at transaction commit time. Transaction pipelining may include one or more operations. In transaction pipelining, for each statement, the gateway node corresponding to the transaction may communicate with the leaseholders ($L_1, L_2, L_3, \ldots, L_i$) for the ranges indicated by the transaction. Each leaseholder $L_i$ may receive the communication from the gateway node and may perform one or more operations in parallel. Each leaseholder $L_i$ may create write intents and may send the write intents to corresponding follower nodes for the leaseholder $L_i$. Each $L_i$ may respond to the gateway node that the write intents have been sent. Note that replication of the intents is still in-flight at this stage. Before committing the transaction, the gateway node may wait for the write intents to be replicated in parallel to each of the follower nodes of the leaseholders. Based on receiving responses from the leaseholders that the write intents have propagated to the follower nodes, the gateway node may commit the transaction.

In some embodiments, the transaction layer may enable parallel commits. Parallel commits may be an atomic commit protocol that reduces the commit latency of a transaction (e.g., in half, from two rounds of consensus down to one). In some cases, the latency incurred by transactions may be substantially close to the sum of all read latencies plus one round of consensus latency. For parallel commits, a transaction coordinator may return a commit acknowledgment to a client device based on determining the writes in the transaction have succeeded. Based on determining the writes in the transaction have succeeded, the transaction coordinator may set the state of the transaction record state to committed and resolve the write intents of the transaction (e.g., asynchronously).

In some embodiments, a parallel commits protocol may occur based on one or more operations. A client device may initiate a write transaction. A transaction coordinator may be created by the transaction layer to manage the state of the write transaction. The client device may issue a write to a key "Alpha" of a range. The transaction coordinator may generate a write intent on the "Alpha" key where the data from the write will be written. The write intent may include a timestamp and a pointer to a currently nonexistent transaction record for the write. Each write intent in the write transaction may be assigned a unique sequence number. The unique sequence number may uniquely identify the write intent. The client device may issue a write to a key "Beta" of the range as a part of the same write transaction as the write to the "Alpha" key. The transaction coordinator may generate a write intent on the "Beta" key where the data from the write transaction will be written. The write intent may include a timestamp and a pointer to the same nonexistent transaction record as for the "Alpha" key, based on each write intent being a part of the same transaction. The client device may issue a request to commit the writes for the write transaction. The transaction coordinator may create the transaction record and may set the state of the transaction record to staging. The transaction coordinator may record the keys of each write being executed by replicas among the range. Based on receiving the commit request from the client device, the transaction coordinator may wait for the pending rights to be replicated across the cluster. Based on the pending writes being replicated, the transaction coordinator may return indication to the client device that the transaction was committed successfully.

In some embodiments, the write transaction may be considered atomically committed while the state of the corresponding transaction record is staging. A transaction may be considered to be committed (e.g., atomically committed) based on one or more logically equivalent states. A logically equivalent state may include the state of the transaction record being staging and successful replication of writes across the cluster (e.g., according to consensus). Transactions in such a state may be considered implicitly committed. A logically committed state may include the state of the transaction record being committed. Transactions in such a state may be considered explicitly committed. For an implicitly committed state, the transaction coordinator may modify the state of the transaction record from staging to committed, such that other transactions do not encounter the transaction in the staging state (e.g., due to being time intensive).

In some embodiments, a transaction in the transaction layer may be considered to be a child transaction of a second transaction. A child transaction's parent may itself be a child of a third transaction. The second transaction, the third transaction may be considered to be an ancestor of the child transaction. All ancestor transactions of a transaction's ancestors may be considered to be an ancestor also of the transaction. Any transaction which has a second transaction as its ancestor may be considered a descendent of the second transaction.

In some embodiments, a child transaction may commit or abort independently and prior to its ancestors. In some embodiments, ancestors may commit at a timestamp which does not precede the commit timestamp of any of the transaction's descendent transactions. In some embodiments, a parent transaction may not perform operations while it has an active child which may be performing operations.

In some embodiments, a descendent transaction may interact with the concurrency control mechanisms of the transaction layer (e.g. the concurrency manager), in ways which expose weaker isolation properties than the behavior those mechanisms enforce between transactions without an ancestor-descendent relationship. In some embodiments, the descendent transaction may bypass locks held by an ancestor transaction as though they were acting as the ancestor transaction. In some embodiments, the child transaction may be configured to read uncommitted intents written by an ancestor transaction. In some embodiments, the child transaction may be configured such that it is not allowed to read any intents written by an ancestor transaction. In some embodiments, the child transaction may not be permitted to write to any key which was previously read by any of its ancestor transactions.

Distribution Layer

In some embodiments, the database architecture for the cluster may include a distribution layer. The distribution layer may provide a unified view of the data stored by the cluster. To enable the ability to access data stored by the cluster from any single node of the cluster, the distribution layer may enable storage of data in a monolithic sorted map of KV pairs. As described herein, the key-space comprising the sorted map of KV pairs may be divided into one or more contiguous chunks, known as ranges, such that every key may be located in a single range of the sorted map. The sorted map may enable simple lookups and efficient scans for data stored by the cluster. Simple lookups may be enabled based on the ability to identify nodes responsible for certain portions (i.e. ranges) of data. Efficient scans may be enabled based on the defining the order of data within ranges. The distribution layer may receive requests (e.g., transactions) from the transaction layer on the same node. The distribution layer may identify which node should receive the request (from the transaction layer) and send the request to the replication layer of the node corresponding to the request.

In some embodiments, the monolithic sorted map structure of the distribution layer may be comprised of two fundamental elements. A first fundamental element may be system data, where system data includes meta ranges that describe the location of user data (i.e. client data) within the cluster. A second fundamental element may be user data, where user data is the client data stored by the cluster for access via one or more client devices.

In some embodiments, the location of each range stored by the cluster may be stored in one or more meta ranges. A meta range may be a two-level index at the beginning of the key-space, where the first level (known hereinafter as "meta1") may address the second level, and the second (known as "meta2") may address user data stored by the cluster. Each node of the cluster may include information indicative of the location of the meta1 range (known as a range descriptor for the cluster). In some cases, the meta range may not be split by exceeding a threshold storage size (e.g., in contrast to other ranges stored by the cluster). Otherwise, in most embodiments, meta ranges may be configured as ranges as described herein and may be replicated and/or otherwise accessed as KV data (i.e. user data) stored by the cluster.

In some embodiments, to optimize data access, each node of the cluster may cache values of the meta2 range that were previously accessed by the node, which may optimize access to meta2 range data. Based on determining that a meta2 cache is invalid for a KV, the node may update the meta2 cache by performing a read transaction on the corresponding meta2 range.

In some embodiments, user data may be stored after and/or otherwise below the meta ranges (e.g., the meta1 range and meta2 range) in each node of the cluster. User data may also be known as "table data". Each table and secondary indexes (of user data) may initially be mapped to a single range. The single range may be the initial mapping for the user data based on the user data being below a threshold storage size for a range. In some cases, the threshold storage size may be 512 MiB as described herein. Each key in a range may represent a single row of a table or a single row of a secondary index. Each key in a range representing a single row of a table may be known as a "primary index" based on the table being sorted by a primary key. Based on exceeding a threshold storage size, a range may split into two ranges. Ranges as described herein may be replicated (by a replication layer as to be described herein), with addresses of each replicated range stored in a meta2 range.

In some embodiments, based on receiving a request (e.g., a read transaction, a write transaction, etc.), a node may determine where the request should be routed (e.g., which node of the cluster the request should be routed to). The node may compare key(s) indicated by the request to keys stored by the meta2 range to determine a node to which the route the request. The node may route the request to a node that stores the keys indicated by the request. If the node has cached a subset of the meta2 range corresponding to the key(s) indicated by the request, the node may compare the key(s) indicated by the request to the cached meta2 range. Alternatively, If the node has not cached a subset of the meta2 range corresponding to the key(s) indicated by the request, the node may send an RPC to the node including the meta2 range. Based on determining the node storing the key(s) indicated by the request, the node may send the KV operations of the request to the node storing the key(s) indicated by the request.

In some embodiments, the distribution layer may include communication software (e.g., gRPC) that enables communication between one or more nodes of the cluster. The communication software may require inputs and outputs to be formatted as protocol buffers. KV operation requests may be included and/or otherwise incorporated into protocol buffers, where a KV operation requests included in a protocol buffer may be known as Batch Request. The destination of the Batch Request may be identified in a header of the Batch Request and/or in a pointer to the transaction record corresponding to the request(s) included in the Batch Request. A Batch Request may be used to send requests between nodes of the cluster. A response to a Batch Request may be included in a protocol buffer known as a Batch Response.

In some embodiments, the distribution layer may include a Distribution Sender (DistSender). A DistSender of a gateway and/or coordinating node may receive Batch Requests from a TCS of the same node. The DistSender may separate Batch Requests into one or more separated Batch Requests. The one or more separated Batch Requests may be routed by the DistSender to the nodes that contain the keys indicated by the separated Batch Requests. The DistSender may determine the nodes based on the meta2 ranges stored on the gateway node. The DistSender may send the Batch Requests to the leaseholder(s) for the keys indicated by the Batch Requests based on the cached meta2 ranges. In some cases, the DistSender may send the Batch Requests to other replicas of ranges for the keys indicated by the Batch Requests based on the proximity of the replicas to the gateway node. Batch Requests received by non-leaseholder replicas may reply to the Batch Requests with an error including an indication of the last-known leaseholder for the range known the replica. Based on received Batch Responses to Batch Requests, the DistSender may aggregate the responses (e.g., to prepare the responses for a return to the client).

In some embodiments, as described herein, the meta ranges may be structured as KV pairs. The meta1 range and the meta2 range may be structurally similar. The meta1 range may include the addresses of nodes within the cluster that include replicas of the meta2 range. The meta2 range may include addresses for the nodes that include replicas of each range stored by the cluster. KV data stored by ranges may include a table identifier, an index identifier, and an indexed column value. Each range stored by a cluster may include metadata. The metadata for a particular range may be known as a range descriptor. Each range descriptor may include a sequential range identifier, the key space (i.e. the set of keys) included in the range, and addresses of nodes that store replicas of the range. The key space included in the range as described herein may determine the keys of the meta2 range. The addresses of nodes that store the replica of the range as described herein may determine the values for the keys of the meta2 range. A range descriptor may be updated based on one or more instances. The one or more instances may include a membership change to a consensus group for a range, a range merge, and/or a range split. Updates to a range descriptor may occur locally at a node and may propagate to the meta2 range. As described herein, a range split may occur when a range reaches and/or exceeds a threshold size. In an example, the threshold size for a range may be 512 MiB. Based on reaching or exceeding the threshold size, a range may be split into two ranges. The node that includes the split ranges may create a new consensus (i.e. Raft) group that include the nodes that were included in the previous consensus group before the range was split into two ranges. The distribution layer may generate a transaction for the meta2 range, where the transaction may be configured to update the meta2 range with the updated key space boundaries and the addresses of the nodes using the range descriptor.

Replication Layer

In some embodiments, the database architecture for the cluster may include a replication layer. The replication layer may copy data (e.g., ranges) between nodes of the cluster and enable consistency between the copied data based on a consensus algorithm as described herein. The replication layer may allow the cluster to tolerate a subset of nodes going offline and/or otherwise being unavailable, such that the range data stored by the cluster is still available to client devices. The replication layer may receive requests from the distribution layer (e.g., from the DistSender as described herein). The replication layer may send responses (e.g., Batch Responses) to the distribution layer (e.g., the DistSender). In the replication layer, if the node receiving a request is the leaseholder for the range, the node may accept the request. If the node receiving a request is not the leaseholder for the range, the node may return an error to the source of the request, where the error may include an indication of a pointer to the leaseholder (or node last known to be the leaseholder). The KV requests may be converted to Raft commands. The replication layer may write accepted requests to a storage layer as to be described herein. Committed Raft commands may be written to the Raft log and stored on a storage medium of a node via the storage layer. The leaseholder may serve reads from the storage layer.

In some embodiments, the replication layer may apply a consensus algorithm. The consensus algorithm may require a threshold number (e.g., a quorum or a majority) of replicas of a range to confirm a modification (e.g., a write transaction) to the range prior to committing the modification. Based on the consensus algorithm, the replication layer may require at least 3 nodes to include replicas of a range, such that a threshold number of replicas may agree to a modification to the range. In some cases, if the threshold number of replicas required to confirm a modification is a majority of the replicas, the replication layer may enable the database to tolerate a number of node failures as described by Equation 1:

$$\text{Tolerable Node Failures} = \frac{\text{Replication Factor} - 1}{2} \quad \text{Equation 1}$$

As described in Equation 1, a "Replication Factor" may be a number of replicas of a range stored by the cluster. For example, based on a "Replication Factor" equal to 5, the replication layer may tolerate node failure for two nodes of a cluster, where the failed nodes each store a replica of a range and three other nodes that are online store replicas of the range. In some cases, the "Replication Factor" may be configured at the cluster, database, and/or table level, where a cluster may comprise one or more databases and a database may comprise one or more ranges distributed among the nodes of the cluster.

In some embodiments, as described herein, the replication layer may include a consensus protocol (known as Raft). Raft may be an algorithm that stores data among one or more nodes of the cluster, such that the nodes may approve of the state of the data based on reaching consensus. Raft may organize the nodes storing a replica of a range in a group known as a Raft group as described herein. Each replica of a Raft group may be classified as a leader replica or a follower replica as described herein. The leader replica may coordinate writes to the follower replicas of the Raft group. The leader replica may send "heartbeat" messages to the follower replicas (e.g., periodically). The leader replica may be elected by follower replicas as to be described herein. Based on the absence of "heartbeat" messages from the leader replica, follower replicas may become candidates for the leader replica. Based on receiving a Batch Request for a range, a node may convert the KV operations indicated by the Batch Request into one or more Raft commands. The node may send the Raft commands to the Raft leader (e.g., if the node that received the Batch Request is not the leader replica). Based on receiving the Raft commands, the leader node may write the Raft commands to the Raft log as to be described herein.

In some embodiments, based on a threshold (e.g., a majority) of nodes writing a transaction and the writes being committed by the leader replica, the writes may be appended to the Raft log as described herein. The Raft log may be an ordered set of commands agreed on by a threshold number of replicas of the range. The Raft log may be a source of truth for consistent replication among nodes of the cluster. In some cases, each replica can be "snapshotted", such that a copy of the data stored by the replica may be generated for a specific applied log index. This copy of the data (i.e. a snapshot) may be sent to other nodes during a rebalance event to enable and/or expedite replication. A rebalance event may update data stored by a node to a specific log index based on the snapshot. Based on loading the snapshot, a node may be updated based on executing operations (e.g., indicated by the Raft log) that have occurred since the snapshot was taken.

In some embodiments, as described herein, a single node in the Raft group may be configured as the leaseholder. The leaseholder may be the only node that can serve reads to a client device or propose writes to the Raft group leader (e.g., both actions may be received as Batch Requests from DistSender as described herein with respect to "Distribution Layer"). When serving reads, the leaseholder may bypass the Raft protocol. The leaseholder may bypass the Raft protocol based on the consensus previously achieved for the values stored by the range. In most embodiments, the leaseholder and the leader replica may be the same replica stored on a node of the range, such that write requests may be proposed directly to the leaseholder/leader replica. The replication layer may attempt to collocate the leaseholder and leader replica during each lease renewal or transfer. If a leaseholder is not configured for a range, any node receiving a request may send a request to become the leaseholder for the range. The request may be sent to each replica to reach consensus. A node that sends a request to become the leaseholder may include a copy of the last valid lease stored by the node. If the last valid lease is equivalent to the current configured leaseholder, the request may be granted by a replica in response to receiving the request. Alternately, if the last valid lease is not equivalent to the current configured leaseholder, the request may be ignored and/or otherwise denied by a replica.

In some embodiments, to manage leases for table data, the replication layer may use "epochs". An epoch may be a period between a node joining a cluster and a node disconnecting from a cluster. To extend a lease (e.g., to remain leaseholder for a range), each node must periodically update a liveness record corresponding to the node. The liveness record may be stored on a system range key. Based on disconnecting from the cluster, a node may fail to update the liveness record. An epoch may be considered to be changed based on a node disconnecting from the cluster and/or failing to update the liveness record. The replication layer may cause a leaseholder node to lose the lease for a range based on the leaseholder node disconnecting from the cluster. In some cases, a leaseholder may not be required to renew a lease for a range. The leaseholder may lose the lease for a range based on disconnecting from the cluster.

In some embodiments, as described herein, meta ranges and/or system ranges may be stored as KV data. System ranges may be restricted from epoch-based leases. System ranges may use expiration-based leases. An expiration-based lease may expire at (or substantially close to) a timestamp. In some cases, a leaseholder for a system range may retain the expiration-based lease after the timestamp at which the expiration-based lease was configured to expire. The leaseholder for the system range may retain the expiration-based lease based on the leaseholder continuing to generate and/or otherwise propose Raft commands to a Raft group.

In some embodiments, the replication layer may enable leaseholder rebalancing. Each leaseholder for a cluster may consider (e.g., periodically consider) whether to transfer the lease to another replica of the range. In an example, a leaseholder may periodically determine whether to transfer the lease to another replica of the range every 10 minutes. Each leaseholder may be configured to transfer the lease for a range based on the number of requests from each locality (i.e. region) for the range, the number of leases on each node comprising the range, and/or the latency between localities. If replicas for a range are distributed among different localities, the replication layer may determine which replica of the cluster is optimized to be the leaseholder. In some cases, a replica may be suited to be the leaseholder based on providing the lowest latency to requests from client devices.

For leaseholder rebalancing, a leaseholder may track the number of requests received by the leaseholder from each locality of the cluster. The number of requests received by the leaseholder from each locality of the cluster may be tracked as an average (e.g., an exponentially weighted moving average). The average may determine the localities that most frequently send requests to the range. In some cases, for an exponentially weighted moving average, the locality that has recently requested the range most often may be assigned the greatest weight. Based on another locality requesting the range frequently, the moving average may cause the locality to be assigned the greatest weight.

For leaseholder rebalancing, the leaseholder may correlate each requesting locality's weight (i.e., the proportion of recent requests) to the locality of each replica by determining a similarity (e.g., similarity between country and/or region) between localities. For example, if the leaseholder received requests from gateway nodes in a region defined as the Central United States (e.g., Country=United States, Region=Central), the replication layer (or leaseholder) may assign the following weights to replicas as described in Table 1 as follows:

TABLE 1

| Replica # | Replica Locality | Replica Leaseholder Rebalancing Weight |
|---|---|---|
| 1 | Country = United States, Region = Central | 100% |
| 2 | Country = United States, Region = East | 50% |
| 3 | Country = Australia, Region = Central | 0% |

As shown in Table 1, the "Replica #" 1, with a "Replica Locality" of the Central United States may be configured as 100% for "Replica Leaseholder Rebalancing Weight" based on having a match (e.g., a complete match) to the Country and the Region of the "Replica Locality". The "Replica #" 2, with a "Replica Locality" of the East United States may be configured as 50% for "Replica Leaseholder Rebalancing Weight" based on having a match (e.g., a partial match) to the Country of the "Replica Locality". The "Replica #" 3, with a "Replica Locality" of Central Australia may be configured as 0% for "Replica Leaseholder Rebalancing Weight" based on lacking a match with the Country and the Region of the "Replica Locality". Based on the assignment of rebalancing weights to the replicas of the range, the leaseholder may determine a rebalancing weight and latency corresponding to the leaseholder. The rebalancing weight and latency may be compared to the rebalancing weight and latency corresponding to the other replicas (e.g., as shown in Table 1) to determine an adjustment factor for each replica. In an example, the greater the disparity between weights and the larger the latency between localities, the more the replication layer may favor the node including the replica from the locality with the larger weight.

For leaseholder rebalancing, the leaseholder may evaluate each replica's rebalancing weight and adjustment factor for the localities with the largest weights. The leaseholder may transfer the lease to another replica (e.g., of the node having the largest weight and/or adjustment factor). The leaseholder may transfer the lease to the replica if transferring the lease is beneficial and/or viable.

In some embodiments, based on a change to the number of nodes of a cluster, replicas for a range may require rebalancing. The replicas may require rebalancing based on changing of the members of a Raft group (e.g., due to the change to the number of nodes of a cluster). Rebalancing may enable optimal survivability and performance. Rebalancing may vary based on whether nodes are added to the cluster or removed from the cluster for the change to the number of nodes of the cluster. Based on nodes being added to the cluster, the added node(s) may communicate identifying information to the existing nodes of the cluster. The identifying information may include an indication that the added node(s) have available storage capacity. The cluster may rebalance replicas stored by the existing nodes to the added node(s). A node may be removed from a Raft group of a cluster based on a lack of a response to the Raft group after a period of time. In an example, the period of time may be 5 minutes. Based on nodes being removed from the cluster (e.g., due to a lack of a response to the Raft group), nodes of the cluster may rebalance data stored by the removed node(s) to the remaining nodes of the cluster. Rebalancing may be enabled based on using a snapshot of a replica from the leaseholder. The snapshot may be sent to another node (e.g., over gRPC as described herein). Based on receiving and/or replicating the snapshot, the node with a replica (e.g., a replicated replica from the snapshot) may join the Raft group of the range corresponding to the replica. The node may determine the index of the added replica to lag one or more entries (e.g., the most recent entries) in the Raft log. The node may execute the actions indicated in the Raft log to update the replica to the state indicated by the most recent index of the Raft log. In some cases, replicas may be rebalanced based on the relative load stored by the nodes within a cluster.

Storage Layer

In some embodiments, the database architecture for the cluster may include a storage layer. The storage layer may enable the cluster to read and write data to storage device(s) of each node. As described herein, data may be stored as KV pairs on the storage device(s) using a storage engine. In some cases, the storage engine may be a Pebble storage engine. The storage layer may serve successful read transactions and write transactions from the replication layer.

In some embodiments, each node of the cluster may include at least one store, which may be specified when a node is activated and/or otherwise added to a cluster. Read transactions and write transactions may be processed from the store. Each store may contain two instances of the storage engine as described herein. A first instance of the storage engine may store temporary distributed SQL data. A second instance of the storage engine may store data other than the temporary distributed SQL data, including system data (e.g., meta ranges) and user data (i.e. table data, client data, etc.). For each node, a block cache may be shared between each store of the node. The store(s) of a node may store a collection of replicas of a range as described herein, where a particular replica may not be replicated among stores of the same node (or the same node), such that a replica may only exist once at a node.

In some embodiments, as described herein, the storage layer may use an embedded KV data store (i.e. Pebble). The KV data store may be used with an application programming interface (API) to read and write data to storage devices (e.g., a disk) of nodes of the cluster. The KV data store may enable atomic write batches and snapshots.

In some embodiments, the storage layer may use MVCC to enable concurrent requests. In some cases, the use of MVCC by the storage layer may guarantee consistency for the cluster. As described herein, HLC timestamp may be used to differentiate between different versions of data by tracking commit timestamps for data. HLC timestamps may be used to identify a garbage collection expiration for a value as to be described herein. In some cases, the storage layer may support time travel queries. Time travel queries may be enabled by MVCC.

In some embodiments, the storage layer may aggregate MVCC values (i.e. garbage collect MVCC values) to reduce the storage size of the data stored by the storage (e.g., the disk) of nodes. The storage layer may compact MVCC values (e.g., old MVCC values) based on the existence of a newer MVCC value with a timestamp that is older than a garbage collection period. A garbage collection period may be configured for the cluster, database, and/or table. Garbage collection may be executed for MVCC values that are not configured with a protected timestamp. A protected timestamp subsystem may ensure safety for operations that rely on historical data. Operations that may rely on historical data may include imports, backups, streaming data using change feeds, and/or online schema changes. Protected timestamps may operate based on generation of protection records by the storage layer. Protection records may be stored in an internal system table. In an example, a long-running job (e.g., such as a backup) may protect data at a certain timestamp from being garbage collected by generating a protection record associated with that data and timestamp. Based on successful creation of a protection record, the MVCC values for the specified data at timestamps less than or equal to the protected timestamp may not be garbage collected. When the job (e.g., the backup) that generated the protection record is complete, the job may remove the protection record from the data. Based on removal of the protection record, the garbage collector may operate on the formerly protected data.

Database Architecture

Referring to FIG. 1, an illustrative distributed computing system 100 is presented. The computing system 100 may include a cluster 102. The cluster 102 may include one or more nodes 120 distributed among one or more geographic regions 110. A node 120 may be a computing device, including the computing system as described herein with respect to FIG. 4. As an example, a node 120 may be a server computing device. A region 110 may correspond to a particular building (e.g., a data center), city, state/province, country, and/or a subset of any one of the above. A region 110 may include multiple elements, such as a country and a geographic identifier for the country. For example, a region 110 may be indicated by Country=United States and Region=Central (e.g., as shown in Table 1), which may indicate a region 110 as the Central United States. As shown in FIG. 1, the cluster 102 may include regions 110a, 110b, and 110c. In some cases, the cluster 102 may include one region 110. In an example, the region 110a may be the Eastern United States, the region 110b may be the Central United States, and the region 110c may be the Western United States. Each region 110 of the cluster 102 may include one or more of the nodes 120. The region 110a may include nodes 120a, 120b, and 120c. The region 110b may include the nodes 120d, 120e, and 120f. The region 110c may include nodes 120g, 120h, and 120i.

Each node 120 of the cluster 102 may be communicatively coupled via one or more networks 112 and 114. In some cases, the cluster 102 may include networks 112a, 112b, and 112c, as well as networks 114a, 114b, 114c, and 114d. The networks 112 may include a local area network (LAN) and/or a wide area network (WAN). In some cases, the one or more networks 112 may connect nodes 120 of different regions 110. The nodes 120 of region 110a may be connected to the nodes 120 of region 110b via a network 112a. The nodes 120 of region 110a may be connected to the nodes 120 of region 110c via a network 112b. The nodes 120 of region 110b may be connected to the nodes 120 of region 110c via a network 112c. The networks 114 may include a LAN and/or a WAN. In some cases, the networks 114 may connect nodes 120 within a region 110. The nodes 120a, 120b, and 120c of the region 110a may be interconnected via a network 114a. The nodes 120d, 120e, and 120f of the region 110*b* may be interconnected via a network 114*b*. In some cases, the nodes 120 within a region 110 may be connected via one or more different networks 114. The node 120*g* of the region 110*c* may be connected to nodes 120*h* and 120*i* via a network 114*c*, while nodes 120*h* and 120*i* may be connected via a network 114*d*. In some cases, the nodes 120 of a region 110 may be located in different geographic locations within the region 110. For example, if region 110*a* is the Eastern United States, nodes 120*a* and 120*b* may be located in New York, while node 120*c* may be located in Massachusetts.

In some embodiments, the computing system 100 may include one or more client devices 106. The one or more client devices 106 may include one or more computing devices, including the computing system as described herein with respect to FIG. 4. In an example, the one or more client devices 106 may include laptop computing devices, desktop computing devices, mobile computing devices, tablet computing devices, and/or server computing device. As shown in FIG. 1, the computing system 100 may include client devices 106*a*, 106*b*, and one or more client devices 106 up to client device 106N, where N is a number of client devices 106 included in the computing system 100. The client devices 106 may be communicatively coupled to the cluster 102, such that the client devices 106 may access and/or otherwise communicate with the nodes 120. One or more networks 111 may couple the client devices 106 the nodes 120. The one or more networks 111 may include a LAN or a WAN as described herein.

Transaction Execution

In some embodiments, as described herein, distributed transactional databases stored by the cluster of nodes may enable one or more transactions. Each transaction may include one or more requests and/or queries. A query may traverse one or more nodes of a cluster to execute the request. A request may interact with (e.g., sequentially interact with) one or more of the following: a SQL client, a load balancer, a gateway, a leaseholder, and/or a Raft Leader as described herein. A SQL client may send a query to a cluster. A load balancer may route the request from the SQL client to the nodes of the cluster. A gateway may be a node that processes the request and/or responds to the SQL client. A leaseholder may be a node that serves reads and coordinates writes for a range of keys (e.g., keys indicated in the query) as described herein. A Raft leader may be a node that maintains consensus among the replicas for a range.

A SQL client (e.g., operating at a client device 106*a*) may send a request (e.g., a SQL request to a cluster (e.g., cluster 102). The request may be sent over a network (e.g., the network 111). A load balancer may determine a node of the cluster to which to send the request. The node may be a node of the cluster having the lowest latency and/or having the closest geographic location to the computing device on which the SQL client is operating. A gateway node (e.g., node 120*a*) may receive the request from the load balancer. The gateway node may parse the request to determine whether the request is valid. The request may be valid based on conforming to the SQL syntax of the database(s) stored by the cluster. The gateway node may generate a logical SQL plan based on the request. The logical plan may be converted to a physical plan to traverse the nodes indicated by the request. Based on the completion of request parsing, a SQL executor may execute the logical SQL plan and/or physical plan using the TCS as described herein. The TCS may perform KV operations on a database stored by the cluster. The TCS may account for keys indicated and/or otherwise involved in a transaction. The TCS may package KV operations into a Batch Request as described herein, where the Batch Request may be forwarded on to the DistSender of the gateway node.

The DistSender of the gateway node may receive the Batch Request from the TCS. The DistSender may determine the operations indicated by the Batch Request and may determine the node(s) (i.e. the leaseholder node(s)) that should receive requests corresponding to the operations for the range. The DistSender may generate one or more Batch Requests based on determining the operations and the node(s) as described herein. The DistSender may send a first Batch Request for each range in parallel. Based on receiving a provisional acknowledgment from a leaseholder node's evaluator (as to be described herein), the DistSender may send the next Batch Request for the range corresponding to the provisional acknowledgement. The DistSender may wait to receive acknowledgments for write operations and values for read operations corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write operation in the Batch Request may compare a timestamp of the write operation to the timestamp cache. A timestamp cache may track the highest timestamp (i.e., most recent) for any read operation that a given range has served. The comparison may ensure that the write operation has a higher timestamp than the timestamp cache. If a write operation has a lower timestamp than the timestamp cache, the write operation may be restarted at a timestamp higher than the value of the timestamp cache.

In some embodiments, operations indicated in the Batch Request may be serialized by a latch manager of a leaseholder. For serialization, each write operation may be given a latch on a row. Any read and/or write operations that arrive after the latch has been granted on the row may be required to wait for the write to complete. Based on completion of the write, the latch may be released and the subsequent operations can continue. In some cases, a batch evaluator may ensure that write operations are valid. The batch evaluator may determine whether the write is valid based on the leaseholder's data. The leaseholder's data may be evaluated by the batch evaluator based on the leaseholder coordinating writes to the range. If the batch evaluator determines the write to be valid, the leaseholder may send a provisional acknowledgement to the DistSender of the gateway node, such that the DistSender may begin to send subsequent Batch Requests for the range to the leaseholder.

In some embodiments, operations may read from the local instance of the storage engine as described herein to determine whether write intents are present at a key. If write intents are present, an operation may resolve write intents as described herein. If the operation is a read operation and write intents are not present at the key, the read operation may read the value at the key of the leaseholder's storage engine. Read responses corresponding to a transaction may be aggregated into a Batch Response by the leaseholder. The Batch Response may be sent to the DistSender of the gateway node. If the operation is a write operation and write intents are not present at the key, the KV operations included in the Batch Request that correspond to the write operation may be converted to Raft operations and write intents, such that the write operation may be replicated to the replicas of the range. The leaseholder may propose the Raft operations to the leader replica of the Raft group (e.g., which is typically the leaseholder). Based on the received Raft operations, the leader replica may send the Raft operations to the follower replicas of the Raft group. If a threshold number of the replicas acknowledge the Raft operations (e.g., the write operations), consensus may be achieved such that the Raft operations may be committed to the Raft log of the leader replica and written to the storage engine. The leader replica may send a command to the follower replicas to write the Raft operations the Raft log corresponding to each of the follower replicas. Based on the leader replica committing the Raft operations to the Raft log, the Raft operations (e.g., the write transaction) may be considered to be committed (e.g., implicitly committed as described herein). The gateway node may configure the status transaction record for the transaction corresponding to the Raft operations to committed (e.g., explicitly committed as described herein).

In some embodiments, based on the leader replica appending the Raft operations to the Raft log, the leader replica may send a commit acknowledgement to the DistSender of the gateway node. The DistSender of the gateway node may aggregate commit acknowledgements from each write operation included in the Batch Request. In some cases, the DistSender of the gateway node may aggregate read values for each read operation included in the Batch Request. Based on completion of the operations of the Batch Request, the DistSender may record the success of each transaction in a corresponding transaction record. To record the success of a transaction, the DistSender may check the timestamp cache of the range where the first write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the TCS. The TCS may send the values to the SQL layer. In some cases, the TCS may also send a request to the DistSender, wherein the request includes an indication for the DistSender to convert write intents to committed values (e.g., MVCC values). The SQL layer may send the values as described herein to the SQL client that initiated the query.

Read Transaction Execution

Figure 2A:
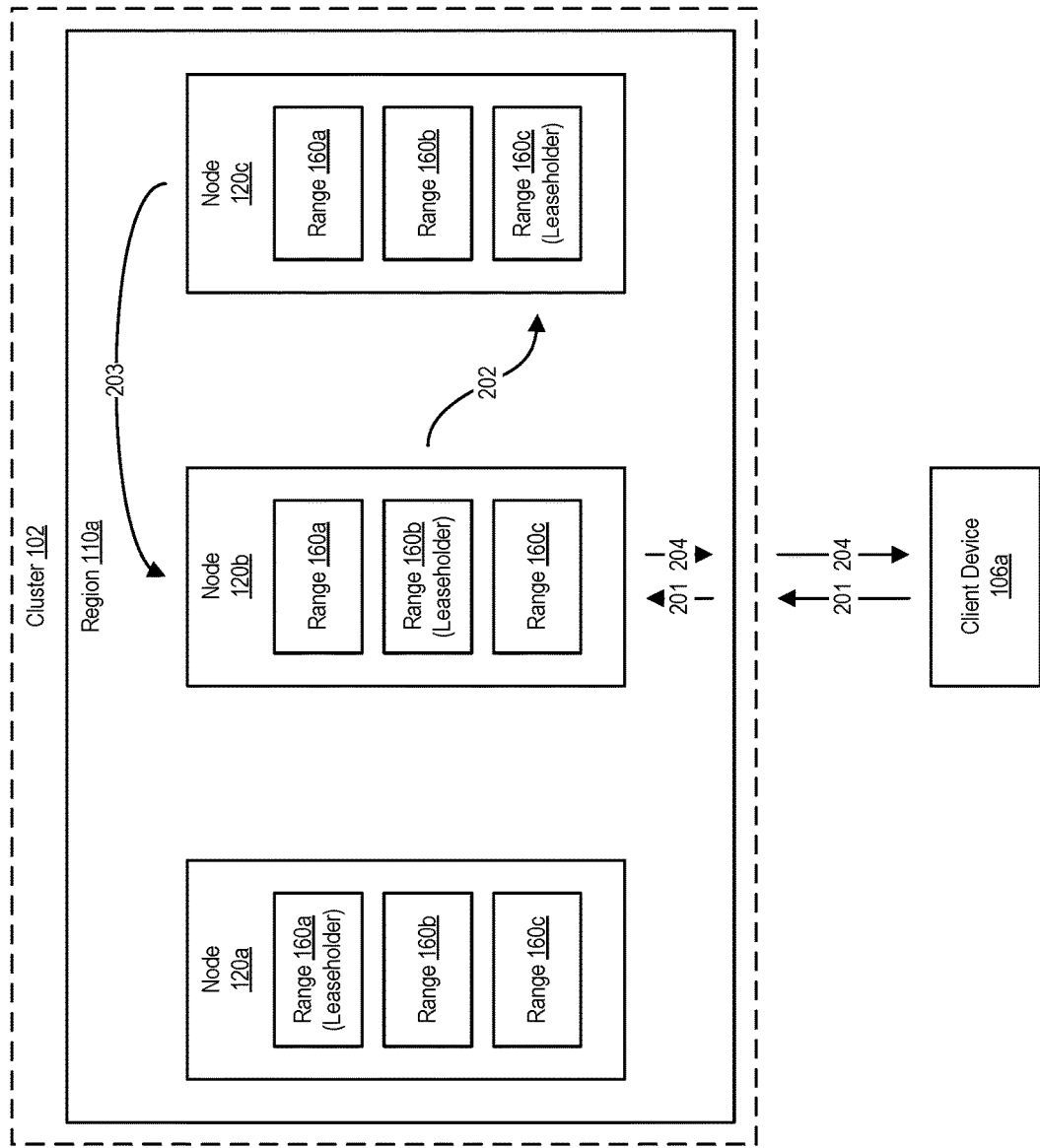
FIG. 2A shows an example of execution of a read transaction at the computing system, according to some embodiments.

Referring to FIG. 2A, an example of execution of a read transaction at the computing system 100 is presented. In some cases, the nodes 120a, 120b, and 120c, of region 110a may include one or more replicas of ranges 160. The node 120a may include replicas of ranges 160a, 160b, and 160c, wherein ranges 160a, 160b, and 160c are different ranges.

The node 120a may include the leaseholder replica for range 160a (as indicated by "Leaseholder" in FIG. 2A). The node 120b may include replicas of ranges 160a, 160b, and 160c. The node 120b may include the leaseholder replica for range 160b (as indicated by "Leaseholder" in FIG. 2A). The node 120c may include replicas of ranges 160a, 160b, and 160c. The node 120c may include the leaseholder replica for range 160c (as indicated by "Leaseholder" in FIG. 2A).

In some embodiments, a client device 106 may initiate a read transaction at a node 120 of the cluster 102. Based on the KVs indicated by the read transaction, the node 120 that initially receives the read transaction (i.e. the gateway node) from the client device 106 may route the read transaction to a leaseholder of the range 160 comprising the KVs indicated by the read transaction. The leaseholder of the range 160 may serve the read transaction and send the read data to the gateway node. The gateway node may send the read data to the client device 106.

As shown in FIG. 2A, at step 201, the client device 106 may send a read transaction to the cluster 102. The read transaction may be received by node 120b as the gateway node. The read transaction may be directed to data stored by the range 160c. At step 202, the node 120b may route the received read transaction to node 120c. The read transaction may be routed to node 120c based on the node 120c being the leaseholder of the range 160c. The node 120c may receive the read transaction from node 120b and serve the read transaction from the range 160c. At step 203, the node 120c may send the read data to the node 120b. The node 120c may send the read data to node 120b based on the node 120b being the gateway node for the read transaction. The node 120b may receive the read data from node 120c. At step 204, the node 120b may send the read data to the client device 106a to complete the read transaction. If node 120b had been configured to include the leaseholder for the range 160c, the node 120b may have served the read data to the client device directly after step 201, without routing the read transaction to the node 120c.

Write Transaction Execution

Figure 2B:
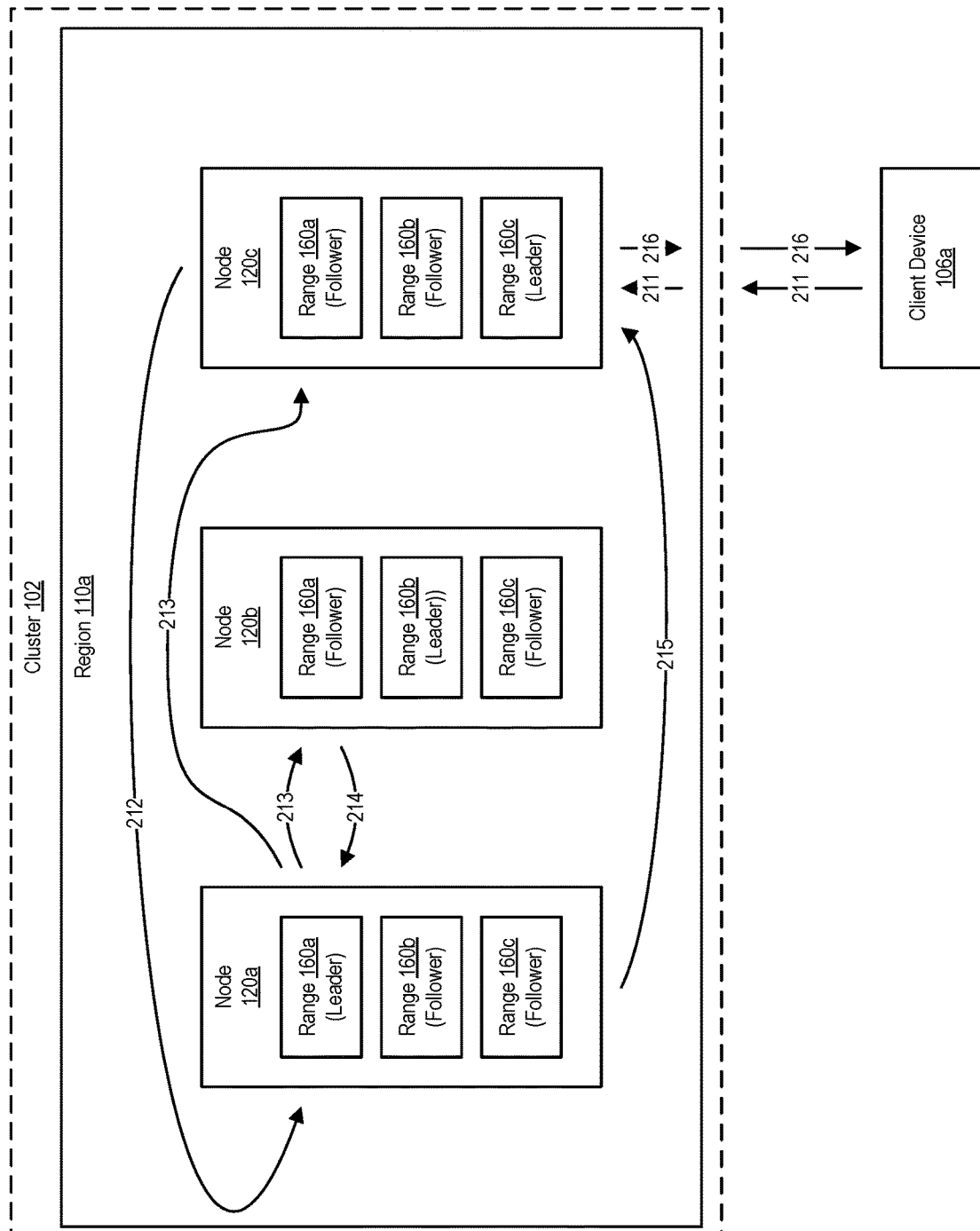
FIG. 2B shows an example of execution of a write transaction at the computing system, according to some embodiments.

Referring to FIG. 2B, an example of execution of a write transaction at the computing system 100 is presented. In some cases, as described herein, the nodes 120a, 120b, and 120c, of region 110a may include one or more replicas of ranges 160. The node 120a may include replicas of ranges 160a, 160b, and 160c, wherein ranges 160a, 160b, and 160c are different ranges. The node 120a may include the leaseholder replica and the leader replica for range 160a (as indicated by "Leaseholder" in FIG. 2A and "Leader" in FIG. 2B). The node 120b may include replicas of ranges 160a, 160b, and 160c. The node 120b may include the leader replica for range 160b (as indicated by "Leader" in FIG. 2B). The node 120c may include replicas of ranges 160a, 160b, and 160c. The node 120c may include the leader replica for range 160c (as indicated by "Leader" in FIG. 2B).

In some embodiments, a client device 106 may initiate a write transaction at a node 120 of the cluster 102. Based on the KVs indicated by the write transaction, the node 120 that initially receives the write transaction (i.e. the gateway node) from the client device 106 may route the write transaction to a leaseholder of the range 160 comprising the KVs indicated by the write transaction. The leaseholder of the range 160 may route the write request to the leader replica of the range 160. In most cases, the leaseholder of the range 160 and the leader replica of the range 160 are the same. The leader replica may append the write transaction to a Raft log of the leader replica and may send the write transaction to the corresponding follower replicas of the range 160 for replication. Follower replicas of the range may append the write transaction to their corresponding Raft logs and send an indication to the leader replica that the write transaction was appended. Based on a threshold number (e.g., a majority) of the replicas indicating and/or sending an indication to the leader replica that the write transaction was appended, the write transaction may be committed by the leader replica. The leader replica may send an indication to the follower replicas to commit the write transaction. The leader replica may send an acknowledgement of a commit of the write transaction to the gateway node. The gateway node may send the acknowledgement to the client device 106.

As shown in FIG. 2B, at step 211, the client device 106 may send a write transaction to the cluster 102. The write transaction may be received by node 120c as the gateway node. The write transaction may be directed to data stored by the range 160a. At step 212, the node 120c may route the received write transaction to node 120a. The write transaction may be routed to node 120a based on the node 120a being the leaseholder of the range 160a. Based on the node 120a including the leader replica for the range 160a, the leader replica of range 160a may append the write transaction to a Raft log at node 120a. At step 213, the leader replica may simultaneously send the write transaction to the follower replicas of range 160a on the node 120b and the node 120c. The node 120b and the node 120c may append the write transaction to their respective Raft logs. At step 214, the follower replicas of the range 160a (at nodes 120b and 120c) may send an indication to the leader replica of the range 160a that the write transaction was appended to their Raft logs. Based on a threshold number of replicas indicating the write transaction was appended to their Raft logs, the leader replica and follower replicas of the range 160a may commit the write transaction. At step 215, the node 120a may send an acknowledgement of the committed write transaction to the node 120c. At step 216, the node 120c may send the acknowledgement of the committed write transaction to the client device 106a to complete the write transaction.

Constraints

In some embodiments, one or more constraints may be added to SQL data that is stored as KV data in tables stored by the cluster 102. A constraint may be a condition for data stored by a particular column of a table. If a value of a column is modified, the value (and other values of other columns) may be checked against the constraint. If the modified value of the column violates the constraint, the modification that resulted in the modified value may be rejected (and the modification may be rolled back). Examples of constraints supported by databases stored by the cluster may include "check", "foreign key", "not null", "primary key", and "unique" constraints. For a column configured with a check constraint, values stored in the column may be required to return a "true" or "null" for a Boolean expression. For a column configured with a foreign key constraint, the values of the column must exactly match and/or otherwise correspond to the values of a second column referenced by the foreign key constraint, where the foreign key may be a reference from a table to another table. For a column configured with a not null constraint, values stored in the column may not be null. For a column configured with a unique constraint, each non-null value stored by the column must be unique. An index may be automatically created for a column with a unique constraint. For a unique constraint applied to more than one column, the collective values of the columns must be unique. For a column configured with a primary key constraint, values stored in the column must uniquely identify each row. One or more columns of a table may be configured with a primary key constraint and the database that includes the table may automatically create an index (known as a primary index) for the primary key column(s). In some cases, a default value may be configured for a particular column of a table. For a column configured with a default value, if a value is not defined for the column in an insert statement, a value configured as a default value may be written to the column.

In some embodiments, constraints may be added to one or more columns of a new and/or an existing table. For a new table, constraints may be added as a part of a create table operation. For an existing table, check, foreign key, and unique constraints may be added via add constraint operations. Not null constraints may be added to an existing table using an alter column operation. A primary key constraint may be added to an existing table using an add constraint or add primary key operation. A primary key may be added to a new table if the add constraint or add primary key operation is in the same transaction as a create table operation. A primary key may be added to an existing table if drop constraint operation precedes the add constraint or add primary key operation. A primary key may be added to an existing table if a primary key has not been explicitly defined for the table. A default value for a particular column of an existing table may be added using an alter column operation.

In some embodiments, one or more operations may be used to drop constraints from columns of a table. A check constraint may be dropped using a drop constraint operation. A foreign key constraint may be dropped using a drop constraint operation. A not null constraint may be dropped using an alter column operation. A primary key constraint may be dropped using a drop constraint operation if an add constraint operation follows the drop constraint statement in the same transaction. A unique constraint may not be directly dropped and may be dropped by dropping an index corresponding to the column subject to the unique constraint using a drop index operation. A default value for a particular column of an existing table may be dropped using an alter column operation.

In some embodiments, one or more operations may be used to change constraints of columns of a table. To change a check constraint, a user may issue a transaction that adds a new check constraint (via an add constraint operations) and drops the existing check constraint (via a drop constraint operation). To change a foreign key constraint, a user may issue a transaction that adds a new foreign key constraint to the column (via an add constraint operation) and then removes the existing foreign key constraint from the column (via a drop constraint operation). To change a primary key constraint, a user may issue a transaction with an alter primary key operation, such that the existing primary index becomes a secondary index. A user may use drop constraint and add constraint operations to change the primary key without the existing primary index becoming a secondary index. To change a unique constraint, a user may issue a transaction that adds a new unique constraint (via an add constraint operation) and the removes the existing unique constraint (via a drop constraint operation). To change a default value for a particular column of an existing table, a user may issue a transaction with an alter column operation.

Online Schema Change Architecture

In some embodiments, distributed transactional databases stored by the cluster 102 may each be configured with one or more schema to logically organize KV data as described herein. Schema objects may be organized into a hierarchy, where the hierarchy includes a plurality of levels. For example, the hierarchy may include three levels (e.g., first, second, and third levels). In some cases, a first level of the hierarchy may correspond to a database. Each database may include one or more schemas. A particular database may be stored by the cluster 102. In some cases, a second level of the hierarchy may correspond to schemas. Each schema may be a logical object that corresponds and/or otherwise belongs to a single database. Schemas may include tables to store KV data as described herein. Examples of schemas may include tables, types, views, sequences, databases, and/or roles, where schemas may be comprised of elements such as columns, indexes, constraints, column families, values, overloads, and/or default values. A type may be a particular data type. Some non-limiting examples of data types supported by the cluster 102 may include ARRAY, BIT, BOOL, BYTES, COLLATE, DATE, ENUM, DECIMAL, FLOAT, INET, INT, INTERVAL, JSONB, SERIAL, STRING, TIME, TIMETZ, TIMESTAMP, and UUID. A user may define custom types (e.g. enum types, record types). A view may be a stored and named selection query. A view may be materialized or dematerialized. A sequence may create and store sequential data (e.g., originating from a table). A role may be a group of users and/or other roles for which privileges for database(s) stored by the cluster 102 may be granted or revoked. Roles may be stored by a table or a subset of a table. In some cases, a third level of the hierarchy may correspond to tables, types, view, sequences, relations, functions, or other schema objects. Each table may correspond and/or otherwise belong to a single schema. A table may include one or more rows of KV data, where each row corresponds and/or otherwise belongs to a particular column. A particular column of table may store values of data of a single data type. In some cases, a table descriptor may correspond to each table of the database, where the table descriptor may contain the schema of the table and may include information associated with the table. Each table descriptor may be stored in a "descriptor table", where each version of a table descriptor may be accessed by nodes of the cluster 102. In some cases, a "descriptor" may correspond to any suitable schema or subset of a schema, where the descriptor may contain the schema or the subset of the schema and may include information associated with the schema (e.g., a state of the schema). Examples of a descriptor may include a table descriptor, type descriptor, database descriptor, and schema descriptor. A view and/or a sequence as described may correspond to a table descriptor. Each descriptor may be stored by nodes of the cluster 102 in a normalized or a denormalized form. Each descriptor may be stored in a KV store by nodes of the cluster 102. In some embodiments, the contents of a descriptor may be encoded as rows in a database (e.g., SQL database) stored by nodes of the cluster 102. Descriptions for a table descriptor corresponding to a table may be adapted for any suitable descriptor corresponding to any suitable schema (i.e. user-defined schema) or schema element as described herein.

In some cases, as described herein, an index may be a copy of the rows corresponding to a single table, where the rows are sorted by one or more columns (e.g., a column or a set of columns) of the table. Each index may correspond and/or otherwise belong to a single table. In some cases, an index may include a type. An example of a first type of index may be a primary index. A primary index may be an index on row-identifying primary key columns. A primary key constraint may be applied to a column of a table to uniquely identify each row of the table, such that the primary key adds structure to table data. A primary key may be defined for each table stored by the computing system 100 and may be changed is described herein. An example of a second type of index may be a secondary index. A secondary index may be defined on non-primary key columns of a table. A schema element may be a sub-element of a particular schema. Examples of schema elements may include rows, columns, indexes, constraints, etc. In some cases, schema elements may include a descriptor, where the descriptor indicates a capability of a transaction (e.g., a DML) to interact with the data stored by the schema elements. A type of descriptor corresponding to an index may be an index descriptor. A type of descriptor corresponding to a column may be a column descriptor. Examples of column descriptors and index descriptors for a respective column and index may include "public", "delete-only", "write-only", and "absent" as described herein, where each state indicator corresponds to a version of the schema with the state indicated by the state indicator. A type of descriptor corresponding to a constraint may be a constraint descriptor. Examples of constraint descriptors may include "public", "write-only" (i.e. "validating"), and "absent".

In some embodiments, executing database schema changes may correspond to using one or more operations to change and/or otherwise modify the schema included in a particular database. Examples of schema changes (e.g., DDLs) may include adding a column, index, or constraint to a table via a respective "add" or "create" operation. Additional examples of schema changes (e.g., DDLs) may include dropping a column, index, constraint from a table using a "drop" operation. In some cases, database schema changes may be initiated via a SQL client (e.g., a SQL client operating at a client device 106a) that is communicatively coupled to a database stored by the cluster 102. In other cases, database schema changes may be initiated via one or more third-party SQL migration tools that are communicatively coupled a database stored by the cluster 102. A user may initiate database schema changes via a SQL client while the database is online (as online schema changes) or offline (as offline schema changes). In particular, online schema changes may be useful for enabling schema changes to a database without forcing the database offline.

In some embodiments, as described herein, a particular schema element (e.g., an index, a column, etc.) may have associated data that can be deleted, read, or written using one or more DMLs (e.g., insert, update, delete, and select operations). To execute a schema change operation, schema may step through multiple states corresponding to different schema versions (e.g., as indicated by a table descriptor), where each state (e.g., public, write-only, delete-only) may correspond to a different schema version during the schema change operation. Each state for a schema or schema element may correspond a different delete, read, and/or write capability for DMLs that interact with the corresponding schema during the schema change operation. Each state may correspond to a state indicator as described herein, where each schema version may be correspond to the schema having "public", "delete-only", or "write-only" capabilities. For schema having a public state, a transaction may read, add to, and/or delete the data stored within the schema using any suitable operations (e.g., DMLs). For schema having a delete-only state, a transaction (e.g., a transaction including a DMLs) may delete the data stored within the schema using operations such as "update" and "delete". For schema having a write-only state, a transaction may add to and/or delete the data stored within the schema using operations such as "insert", "update", and "delete".

In some embodiments, a table descriptor for a particular table may include a version V (e.g., a version number). The version may be incremented for each change to the table descriptor. For example, based on a column of a table changing from "delete-only" to "write-only", a version indicator included in a table descriptor may increment from version (V) to version (V+1). Versions of table descriptors may be used to distinguish different versions of a particular schema (e.g., table) within the database. In some cases, a single version of a particular schema may be active and/or otherwise leased by nodes in a cluster. The single version of the schema may be the latest (i.e. most recent) version of the schema. In other cases (e.g., during a schema change operation), a maximum of two versions of a particular schema may be active and/or otherwise leased by nodes of a cluster at any given time. In some cases, the two schema versions may be the two latest (e.g., most recent) versions of a table leased by nodes of the cluster, such that particular DMLs (e.g., delete, insert, update, etc.) may operate on either the latest version (V+1) of the table or the second latest version (V) of the table as the latest version of the table propagates to nodes releasing leases on the second latest version of the table. Each table descriptor (and corresponding version of each respective table descriptor) may be stored in a descriptor table as described herein.

In some embodiments, a particular version of a schema (as indicated by the version included in the table descriptor) may be valid for a duration of time (known as a "validity period"). A table descriptor (and corresponding table) may have a version V. Because only two versions of a table descriptor may be active (e.g. where a validity period of a version includes a present time) at a given time, a validity period for a table descriptor with a version V may span from the table descriptor's modification time until the modification time of the table descriptor at version V+2. A "modification time" may be a time where a table descriptor is modified (e.g., to increment a version corresponding to a state change for the table). A modification to a state of a a column or an index may correspond to a modification of the corresponding table descriptor. Accordingly, a table descriptor at a version V may have a validity period equivalent to: [modification time (V), modification time (V+2)). Based on a validity period corresponding to each version of a table descriptor, a transaction (e.g., a DML) with a timestamp of time "t" can use versions of table descriptors having modification times that are less than or equal to t. Further, after a table descriptor at a version V is modified (e.g., written), a validity period for version V−2 is fixed as: [modification time (V−2), modification time (V)). A validity period having a fixed start time and end time may be known as a fixed validity period. A validity period having a fixed start time and an undefined end time (e.g., due to the lack of incrementing a new version V) may be known as a temporary validity period. A most recent version V of a table descriptor may always have a temporary validity period.

In some embodiments, due to validity periods corresponding to versions of table descriptors (and corresponding tables stored by nodes of a cluster), nodes may acquire and release leases (e.g., as described herein with respect to ranges) for particular versions of table descriptors and corresponding tables. A node's lease for a particular version of a table descriptor may be a claim to the version of a table descriptor paired with a failure detection mechanism to detect when a node should release the lease. A lease for a particular version of a table descriptor may valid and/or otherwise granted based on any suitable technique. In a first technique, a lease (i.e. expiration-based lease) for a particular version of a table descriptor may be granted for a period of time known as a "lease duration", where the lease may expire at the end of the lease duration. The lease duration may be equivalent to the duration of the transaction or a maximum configured duration, where the duration of the transaction may not exceed the maximum configured duration. An example of a lease duration may be 1-10 minutes (e.g., 5 minutes). Based on an expiration of the lease duration, the node's lease on the particular version of the table descriptor may be released. In a second technique, a lease (i.e. epoch-based lease) for a particular version of a table descriptor may be granted using epochs. After acquiring a lease on a version of a table descriptor (e.g., using a transaction), to maintain a lease on the particular version of the table descriptor, a node may be required to periodically update a record to which leases correspond. As an example, to maintain a lease on the particular version of the table descriptor, a node may be required to periodically update a liveness record corresponding to the node. As an example, the liveness record may be stored on a system range key accessible by each and/or any node of the cluster. Based on disconnecting from the cluster, a node may fail to update the liveness record. Based on failing to update its liveness record, the node may release its lease on the version of the table descriptor.

In some cases, leases may be recorded in a system lease table, where entries in the system lease table can be added and removed as leases are respectively acquired and released by nodes of a cluster. A node may acquire a lease for a particular table descriptor before using and/or otherwise operating with the table descriptor and corresponding table in a transaction (e.g., a DDL of a schema change operation). A node may acquire a lease for a particular table descriptor using a transaction, which may be separate and distinct from the transaction that triggered the node to acquire the lease. As an example, based on receiving a transaction including an add column operation, a node including the table subject to the transaction may execute a transaction to acquire a lease on a table descriptor corresponding to the table.

In some embodiments, a node may release a lease based on completion of operations corresponding to the leased table descriptor and based on the existence of a new version of a table descriptor. A node may release a lease for a particular table descriptor using a transaction. New versions of table descriptors may propagate (e.g., asynchronously propagate) to nodes within a cluster. As an example, a node may periodically read the descriptor table to identify whether a new version of a particular table descriptor leased by the node is present. Based on determining that a new version of a table descriptor exists and/or is otherwise present in the descriptor table, a node of the cluster may release the lease to the previous version of the table descriptor (if operations at the node corresponding to the previous table descriptor are complete).

In some embodiments, as described herein, a schema change operation (e.g., an online and a transactional schema change operation) may involve stepping particular schemas through multiple schema states corresponding to different versions of a table descriptor, where a maximum of two versions of table descriptors may be active in the cluster at a given time. Accordingly, the schema change engine (e.g., in an online and a transactional schema change operation) may determine whether a single version of a table descriptor is in use by the nodes of the cluster before incrementing the version of the table descriptor (and changing the state of the table and/or an included schema element). To ensure that a single version of a table descriptor is in use by the nodes of the cluster, the schema change engine may validate the use of a single version (V) of a table descriptor in a particular cluster. The schema change engine may analyze the system lease table to confirm the use of a single version of a table descriptor by the nodes of the cluster. In some cases, using a loop operation, the schema change engine may scan only leases on the prior version of the table descriptor (V−1) to determine whether any nodes hold leases on the prior version. Based determining that no nodes hold leases on the prior version of the table descriptor, the schema change engine may increment the version of the current table descriptor (V). Based on a change to the version of the table descriptor, the most recent table descriptor may propagate to the nodes of the cluster. The nodes of the cluster may asynchronously acquire leases for the most recent version (V+1) of the table descriptor and may release leases for the previous version (V) of the table descriptor.

In some embodiments, nodes holding a lease on a version of the table descriptor may disconnect from the cluster and/or otherwise become unresponsive. Accordingly, to increment a version of a table descriptor (and change the state of schema) that is leased by nodes that are disconnected or unresponsive, a schema change operation may wait for leases on the version of the table descriptor to expire. As an example, a schema change operation may wait for the remaining period of the lease duration to expire for each of the disconnected or unresponsive nodes. As another example, a schema change operation may wait for the remaining period of the corresponding to updating the liveness record to expire for each of the disconnected or unresponsive nodes. In some cases, the maximum time a schema change operation may be required to wait prior to incrementing a version of a table descriptor may be equivalent to the lease duration (e.g., for expiration-based leases) or the period for updating the liveness record (e.g., for epoch-based leases). An example of a lease duration may include 1-10 minutes (e.g., 5 minutes).

In some embodiments, a transaction directed to tables stored by a cluster may be required to the use the same version of the table descriptors and corresponding tables during the transaction. In particular, a multi-statement transaction (e.g., a transaction including two or more statements) may be required the use of same versions of table descriptors and corresponding tables during the transaction. In some embodiments, rather than acquiring a lease on the latest version (V+1) of a table descriptor, a transaction may utilize a lease on previous version (V) of the table descriptor. A transaction may utilize a lease on a previous version of the table descriptor if the node on which the transaction occurs had acquired a lease on the previous version of the table descriptor at a timestamp before the validity window of the latest version of the table descriptor. The lease on the previous version (V) of the table descriptor may exist until the lease is released or expired.

To illustrate the temporal interaction between a transaction and a lease of a table descriptor at particular timestamp, consider a time stamp $t_{SC}$ may correspond to the latest modification timestamp of a most recent table descriptor version and a timestamp $t_L$ may correspond to a timestamp of a transaction that has acquired a lease for that table descriptor. If $t_{SC} > t_L$, the lease may correspond to a previous table descriptor version prior to the most recent table descriptor version associated with $t_{SC}$. If $t_{SC} < t_L$, the lease may correspond to the most recent table descriptor version associated with $t_{SC}$. In some cases, if $t_{SC} = t_L$, the transaction may attempt to read the previous table descriptor version before the previous table descriptor version is modified to the most recent table descriptor version and the transaction may observe a read in a read timestamp cache, causing the transaction to restart. In other cases, if $t_{SC} = t_L$, the most recent table descriptor version may be available before the transaction attempts to read the table descriptor, such that the transaction acquires a lease for the most recent table descriptor version. Because a first transaction may read the table descriptor (e.g., previous or most recent table descriptor version) and a second transaction may write the most recent version of the table descriptor, it may not be possible for both transactions to commit at the same timestamp due to the database isolation properties.

Figure 3A:
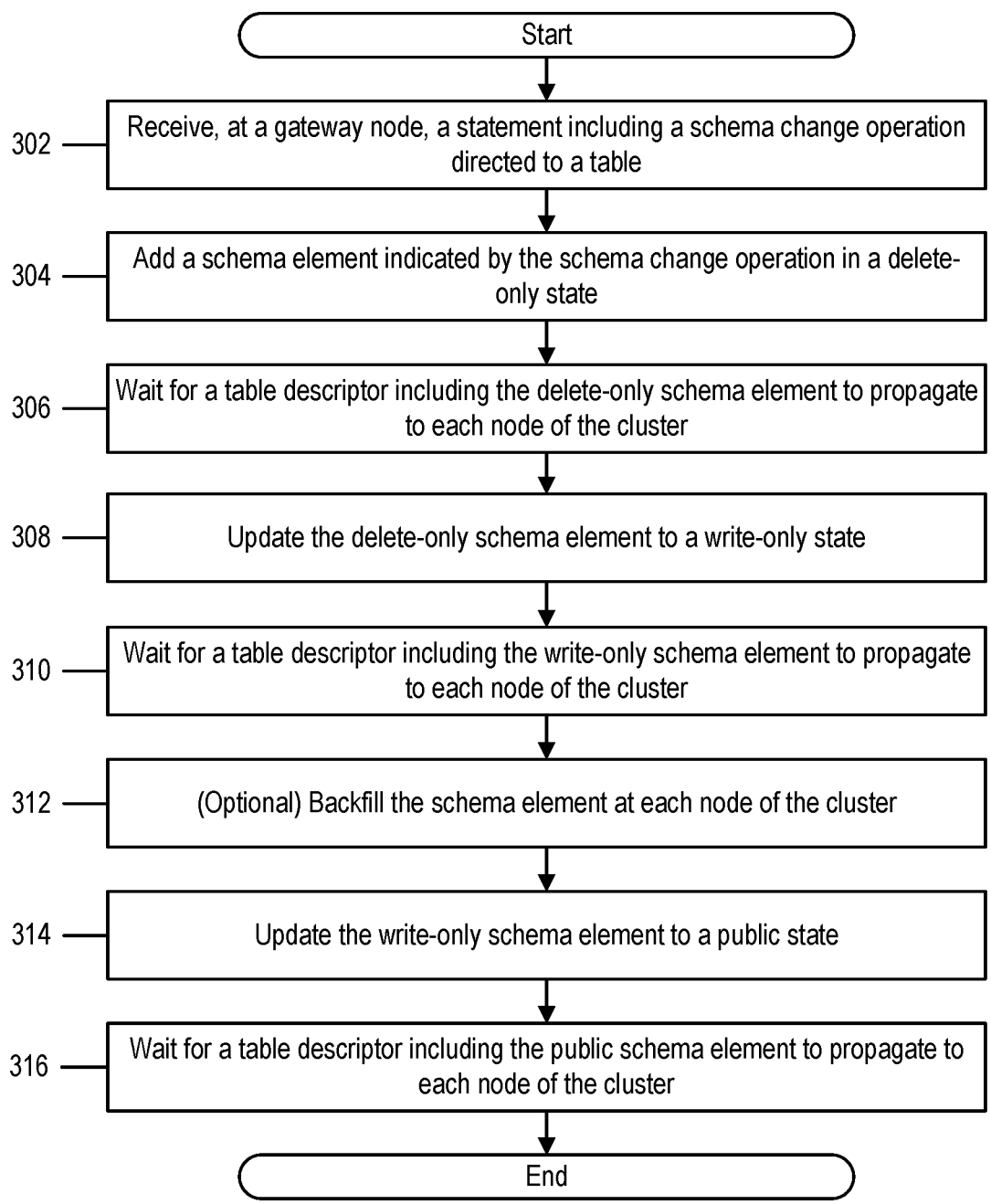
FIG. 3A shows an example flowchart of an execution method for online schema changes at the computing system, according to some embodiments.
Figure 3B:
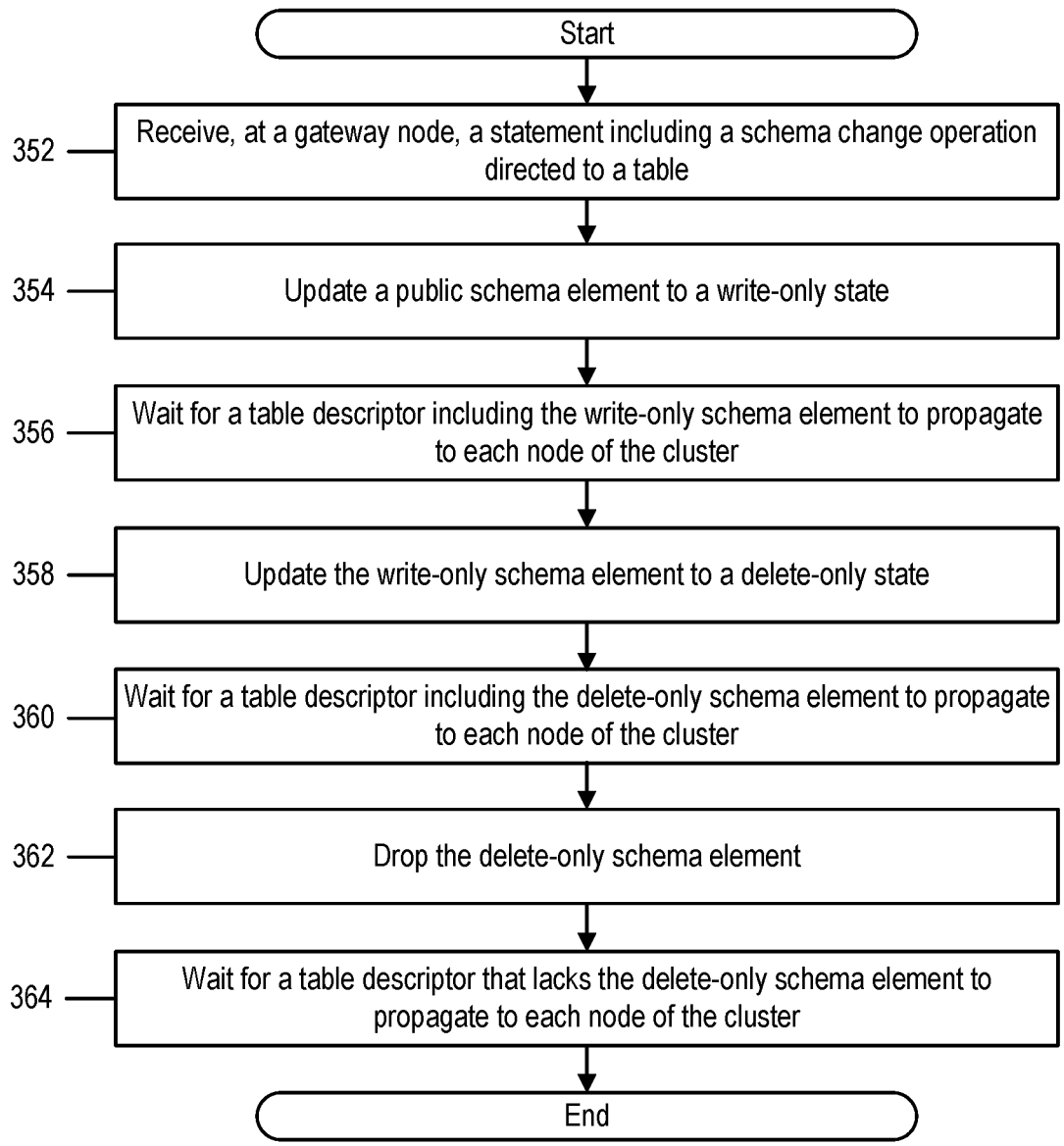
FIG. 3B shows an example flowchart of an execution method for online schema changes at the computing system, according to some embodiments.

In some embodiments, to execute schema change operations as described herein, schema elements (e.g., columns, indexes, constraints, etc.) may be configured with multiple states corresponding to different schema versions (e.g., as indicated by a table descriptor) prior to being added to or dropped from a particular table. In some cases, based on the type of schema change, schema elements may be added to or created for a table, marked as delete-only, marked as write-only, and then made public to allow for transactions (e.g., DMLs) to access the table and to prevent table data and/or index data from being inadvertently made invalid (e.g., inconsistent or unavailable) within the database. In some cases, based on the type of schema change, public schema elements of a table may be marked as write-only, marked as delete-only, and then dropped or deleted from the table to allow for transactions (e.g., DMLs) to access the table and to prevent table data and/or index data from being inadvertently made invalid. In some cases, for a schema change corresponding to a constraint change, a constraint may be added to a column of a table, marked as write-only (e.g., in a validating state), and then made public to allow for transactions (e.g., DMLs) to access the column with the constraint and to prevent transactions from violating the constraint when writing to the column. In some cases, for a schema change corresponding to a constraint change, a constraint may be marked as write-only and then dropped from a column to allow for transactions (e.g., DMLs) to access the column without the constraint and to prevent transactions from violating the constraint within the database. Referring to FIGS. 3A and 3B, example flowcharts of execution methods for online schema changes at the computing system 100 are shown, in accordance with some embodiments. FIG. 3A shows an example flowchart for an execution method 300 for adding or creating a schema element to/for a table stored by the computing system 100. The method 300 is suitable for executing online schema changes, including adding or creating schema elements (e.g., columns or indexes) to/for an existing table stored by nodes of a cluster (e.g., cluster 102). The method may be performed by one or more client devices (e.g., client device 106a, client device 106b, etc.) and one or more nodes of a cluster (e.g., cluster 102) of nodes. An output of the method 300 may include updated schema with an added or created schema element (e.g., an added column or a created index). For simplicity, the following paragraphs describe the method 300 with reference to adding a single schema element to a table while the table is online. However, one of ordinary skill in the art will appreciate that the steps 302-316 of the method 300 may be performed for any suitable number of schema element add or create operations. In an example, a schema change operation may create, drop, and/or mutate (i.e. change) multiple elements and multiple operations may be issued serially as part of the same transaction according to the method 300. The method 300 may be performed by wholly or in part by a client device, a gateway node, and/or any other suitable node that is delegated by the gateway node (e.g., using one or more nodes). In some cases, the gateway node may forward the instructions for steps of the method 300 to another node of the cluster to delegate the schema change operation. For the method 300 (and the methods 350, 400, and/or 450), a particular transaction can only cause at most one state change per descriptor, such that the particular transaction may be required to commit after causing a state change. Accordingly, more than one transaction may be required to perform the method 300 (and the methods 350, 400, and/or 450). As described herein, waiting for a version of a descriptor to propagate to the nodes of the cluster may include waiting for the nodes of the cluster to release their lease on the previous version of the descriptor (e.g., the version of the descriptor that precedes the propagating version of the descriptor).

In some embodiments, the method 300 involves (1) receiving, at a gateway node, a statement including a schema change operation; (2) adding a schema element indicated by the schema change operation to the table in a delete-only state; (3) waiting for a table descriptor including the delete-only schema element to propagate to each node of the cluster; (4) updating the delete-only schema element to a write-only state; (5) waiting for a table descriptor including the write-only schema element to propagate to each node of the cluster; if the schema element includes default data that is non-null (6) backfilling the write-only schema element with the default data at each node of the cluster; (7) updating, at the table leaseholder, the write-only schema element to a public state; and (8) waiting for a table descriptor including the public schema element to propagate to each node of the cluster.

In some embodiments, at step 302, a gateway node (e.g., node 120c) of the cluster 102 may receive a statement including a schema change operation. The gateway node may receive the statement from a SQL client. A "begin" statement may precede the statement including the schema change operation. In some cases, the begin statement, the statement including the schema change operation, and a "commit" statement may be included as a part of a transaction. The SQL client may be operating at a client device (e.g., client device 106b). The gateway node may receive the statement including the schema change operation from the SQL client via the network 111. The schema change operation may include a DDL directed to a particular table, where the table is stored by a plurality of nodes of the cluster 102 (e.g., for survivability purposes). In an example, the DDL may be an "add column" or a "create index" operation, where a column or an index is respectively added to a table (and all replicas of the table).

At step 304, the gateway node may add a delete-only schema element indicated by the schema change operation to the table. In an example, the schema element may be a column or an index. To add the delete-only schema element, the gateway node may validate that only one version of the table descriptor is active and/or otherwise in use by nodes of the cluster 102. Based on validating that only one version (V) of the table descriptor is active, the gateway node may add the schema element to the table, increment the version of the table descriptor corresponding to the updated table to an updated version (V+1), and mark a descriptor (e.g., column descriptor or index descriptor) included in the table descriptor to identify the schema element as delete-only. Marking the descriptor of the schema element as delete-only may allow operations (e.g., DMLs) that encounter the schema element to only perform delete operations for the data included in the schema element. In some cases, the gateway node may add an indication of the ongoing schema change to the table descriptor. For example, the gateway node may add an indication of an "add column" or an "add index" schema change operation to the table descriptor.

At step 306, using one or more jobs, the gateway node (or any suitable node delegated by the gateway node) may wait for the table descriptor (V+1) including the delete-only schema element to propagate to the other nodes of the cluster 102 that store the table corresponding to the table descriptor. Nodes of the cluster 102 may release their leases on the previous version (V) of the table descriptor as described herein. The node may scan the system lease table to identify whether any nodes hold leases on the previous version (V) of the table descriptor before proceeding to step 308. As such, the node may wait until leases are held for only the current version (V+1) of the table descriptor before proceeding to step 308.

At step 308, the gateway node (or any suitable node) may update the delete-only schema element to a write-only state, such that the delete-only schema element is updated to a write-only schema element in the table. To update the delete-only schema element to a write-only schema element, the node may validate that only one version (V+1) of the table descriptor is active and/or otherwise in use by nodes of the cluster 102. Based on validating that only one version (V+1) of the table descriptor is active, the gateway node may increment the version of the table descriptor corresponding to the table to an updated version (V+2) and may change a descriptor included in the table descriptor from delete-only to write-only to identify the schema element as write-only. Marking the descriptor of the schema element as write-only may allow operations (e.g., DMLs) that encounter the schema element to only perform write and delete operations for the data included in the schema element. The marking of the descriptor of the schema element as write-only may prevent operations (e.g. DMLs) that encounter the schema element from exposing the current values of that element. Operations (e.g., DMLs) that encounter the write-only schema element may not read from the write-only schema element, such that the schema element is not logically visible to the transaction leasing the table descriptor version that include the write-only schema element. After updating the delete-only schema element to a write-only state (and prior to step 310), the transaction may commit.

At step 310, the gateway node (or any suitable node) may wait for the table descriptor (V+2) including the write-only schema element to propagate to the other nodes of the cluster 102 that store the table corresponding to the table descriptor. Nodes of the cluster 102 may release their leases on the previous version (V+1) of the table descriptor as described herein. The node may scan the system lease table to identify whether any nodes hold leases on the previous version (V+1) of the table descriptor before proceeding to step 312. As such, the node may wait until leases are released for the previous version (V+1) of the table descriptor and/or until leases are held for only the current version (V+2) of the table descriptor before proceeding to step 316.

At step 312, nodes of the cluster 102 may optionally backfill the write-only schema element included in the table stored by each node. If the write-only schema element is configured with a non-null default value, the nodes of the cluster may backfill the write-only schema element with the non-null default value. In conventional embodiments, backfilling the data may include adding data to a schema element corresponding to a table during a schema change operation. Adding data to a column of a particular may be known as a "column backfill". Adding data to an index corresponding to a particular table may be known as an "index backfill". In some cases, if the schema element is a column, column backfilling may include updating the physical layout of an index "in-place", where the index corresponds to the column. Updating the physical layout of the index in-place may include transactionally overwriting each row of the table of each node to include write-only data for the column. During a column backfill, a primary index corresponding to the table may not change and/or otherwise be replaced. In some cases, if the schema element is an index, index backfilling may include reading data from a source index and filling the data of the added index using the data read from the source index. In some cases, the source index may be the added index corresponding to the table at a fixed time instant. After filling the added index with data from the source index, the added index may replace the source index in the table at each node of the cluster 102. During an index backfill, a primary index or a secondary index corresponding to the table may change due to the replacement of the source index with the added index as described herein.

At step 314, the gateway node (or any suitable node) may update the write-only schema element to a public state, such that the write-only schema element is updated to a public schema element at the table. To update the write-only schema element to a public schema element, the node may validate that only one version (V+2) of the table descriptor is active and/or otherwise in use by nodes of the cluster 102. Based on validating that only one version (V+2) of the table descriptor is active, the node may increment the version of the table descriptor corresponding to the table to an updated version (V+3) and may change a descriptor included in the table descriptor from write-only to public to identify the schema element as public. Marking the descriptor of the schema element as public may allow operations (e.g., DMLs) that encounter the schema element to normally operate (e.g., perform read, write, and delete operations) with the data included in the schema element.

At step 316, the gateway node (or any suitable node delegated by the gateway node) may wait for the table descriptor (V+3) including the public schema element to propagate to the other nodes of the cluster 102 that store the table corresponding to the table descriptor. Nodes of the cluster 102 may release their leases on the previous version (V+2) of the table descriptor as described herein. The node may scan the system lease table to identify whether any nodes hold leases on the previous version (V+2) of the table descriptor before concluding the method 300. As such, the node may wait until leases are released for the previous version (V+2) of the table descriptor and/or until leases are held for only the current version (V+3) of the table descriptor before concluding the method 300.

FIG. 3B shows an example flowchart for an execution method 350 for dropping a schema element from/for a table stored in the computing system 100. The method 300 is suitable for executing online schema changes, including dropping schema elements from/for an existing table stored by nodes of a cluster (e.g., cluster 102). The method may be performed by one or more client devices (e.g., client device 106a, client device 106b, etc.) and one or more nodes of a cluster (e.g., cluster 102) of nodes. An output of the method 350 may include updated schema with a dropped schema element (e.g., a dropped column or a dropped index). For simplicity, the following paragraphs describe the method 350 with reference to dropping a single schema element from a table while the table is online. However, one of ordinary skill in the art will appreciate that the steps 352-364 of the method 350 may be performed for any suitable number of schema element drop operations. In an example, a schema change operation may create, drop, and/or mutate (i.e. change) multiple elements and multiple operations may be issued serially as part of the same transaction according to the method 350. The method 350 may be performed by wholly or in part by a client device, a gateway node, and/or any other suitable node that is delegated by the gateway node (e.g., using one or more nodes). In some cases, the gateway node may forward the instructions for steps of the method 350 to another node of the cluster to delegate the schema change operation.

In some embodiments, the method 350 involves (1) receiving, at a gateway node, a statement including a schema change operation directed to a table; (2) updating the public schema element to a write-only state, (3) waiting for a table descriptor including the public-only schema element to propagate to each node of the cluster, (4) updating the write-only schema element to a delete-only state, (5) waiting for a table descriptor including the delete-only schema element to propagate to each node of the cluster, (6) dropping the delete-only schema element from the table, and (7) waiting for a table descriptor lacking the dropped schema element to propagate to each node of the cluster.

In some embodiments, at step 352, a gateway node (e.g., node 120c) of the cluster 102 may receive a statement including a schema change operation. The gateway node may receive the statement from a SQL client. A "begin" statement may precede the statement including the schema change operation. In some cases, the begin statement, the statement including the schema change operation, and a "commit" statement may be included as a part of a transaction. The SQL client may be operating at a client device (e.g., client device 106b). The gateway node may receive the statement from the SQL client via the network 111. The schema change operation may include a DDL directed to a particular table, where the table is stored by a plurality of nodes of the cluster 102 (e.g., for survivability purposes). In an example, the DDL may be a "drop column" or a "drop index" operation, where a column or an index is respectively dropped from a table (and all replicas of the table).

At step 354, the gateway node may update a public schema element to a write-only state, such that the public schema element is updated to a write-only schema element at the table. The public schema element subject to the update may be indicated by the schema change operation. In an example, the public schema element may be a column or an index. To update the public schema element, the gateway node may validate that only one version of the table descriptor is active and/or otherwise in use by nodes of the cluster 102. Based on validating that only one version (V) of the table descriptor is active, the gateway node may increment the version of the table descriptor corresponding to the updated table to an updated version (V+1) and change a descriptor (e.g., column descriptor or index descriptor) included in the table descriptor from public to write-only to identify the schema element as write-only. Marking the descriptor of the schema element as write-only may allow operations (e.g., DMLs) that encounter the schema element to only perform delete and write operations for the data included in the schema element. In some cases, the gateway node may add an indication of the ongoing schema change to the table descriptor. For example, the gateway node may add an indication of a "drop column" or a "drop index" schema change operation to the table descriptor.

At step 356, using one or more jobs, the gateway node (or any suitable) may wait for the table descriptor (V+1) including the write-only schema element to propagate to the other nodes of the cluster 102 that store the table corresponding to the table descriptor. Nodes of the cluster 102 may release their leases on the previous version (V) of the table descriptor as described herein. The node may scan the system lease table to identify whether any nodes hold leases on the previous version (V) of the table descriptor before proceeding to step 358. As such, the node may wait until leases are released for the previous version (V) of the table descriptor and/or until leases are held for only the current version (V+1) of the table descriptor before proceeding to step 358.

At step 358, the gateway node (or any suitable node delegated by the gateway node) may update the write-only schema element to a delete-only state, such that the write-only schema element is updated to a delete-only schema element at the table. To update the write-only schema element to a delete-only schema element, the gateway node may validate that only one version (V+1) of the table descriptor is active and/or otherwise in use by nodes of the cluster 102. Based on validating that only one version (V+1) of the table descriptor is active, the node may increment the version of the table descriptor corresponding to the table to an updated version (V+2) and may change a descriptor included in the table descriptor from delete-only to write-only to identify the schema element as write-only. Marking the descriptor of the schema element as delete-only may allow operations (e.g., DMLs) that encounter the schema element to only perform delete operations for the data included in the schema element.

At step 360, the gateway node (or any suitable node delegated by the gateway node) may wait for the table descriptor (V+2) including the delete-only schema element to propagate to the other nodes of the cluster 102 that store the table corresponding to the table descriptor. Nodes of the cluster 102 may release their leases on the previous version (V+1) of the table descriptor as described herein. The node may scan the system lease table to identify whether any nodes hold leases on the previous version (V+1) of the table descriptor before proceeding to step 362. As such, the node may wait until leases are released for the previous version (V+1) of the table descriptor and/or until leases are held for only the current version (V+2) of the table descriptor before proceeding to step 362.

At step 362, the gateway node (or any suitable node delegated by the gateway node) may drop the delete-only schema element as indicated by the schema change operation from the table stored by the node. To drop the delete-only schema element from the table, the node may validate that only one version (V+2) of the table descriptor is active and/or otherwise in use by nodes of the cluster 102. Based on validating that only one version (V+2) of the table descriptor is active, the node may increment the version of the table descriptor corresponding to the table to an updated version (V+3), such that the updated version corresponds to the table without the delete-only schema element. In conventional embodiments, dropping the delete-only schema element may include a column back delete operation or an index drop operation. In some cases, after incrementing the version of the table descriptor, if the schema element is a column, a column back delete operation may iteratively delete column keys corresponding to the column for each primary key of the table. Deleting the column keys may correspond to rewriting each row corresponding to a primary key in the table, such that each row no longer includes the column. A column back delete operation may include one or more steps corresponding to each primary key of the table that requires rewriting to remove the column. In some cases, after incrementing the version of the table descriptor, if the schema element is an index, an index drop operation may include dropping the index from the table and deleting the table data from the index. In an example, an index drop operation may be a single step.

At step 364, the gateway node (or any suitable node delegated by the gateway node) may wait for the table descriptor (V+3) that lacks the dropped delete-only schema element to propagate to the other nodes of the cluster 102 that store the table corresponding to the table descriptor. Nodes of the cluster 102 may release their leases on the previous version (V+2) of the table descriptor as described herein. The node may scan the system lease table to identify whether any nodes hold leases on the previous version (V+2) of the table descriptor before concluding the method 350. As such, the node may wait until leases are released for the previous version (V+2) of the table descriptor and/or until leases are held for only the current version (V+3) of the table descriptor before concluding the method 350. Based on the updated version (V+3) of the table descriptor lacking the delete-only schema element, the table corresponding to the table descriptor may be public, such that operations (e.g., DMLs) may normally interact with the data stored by the table.

Figure 4A:
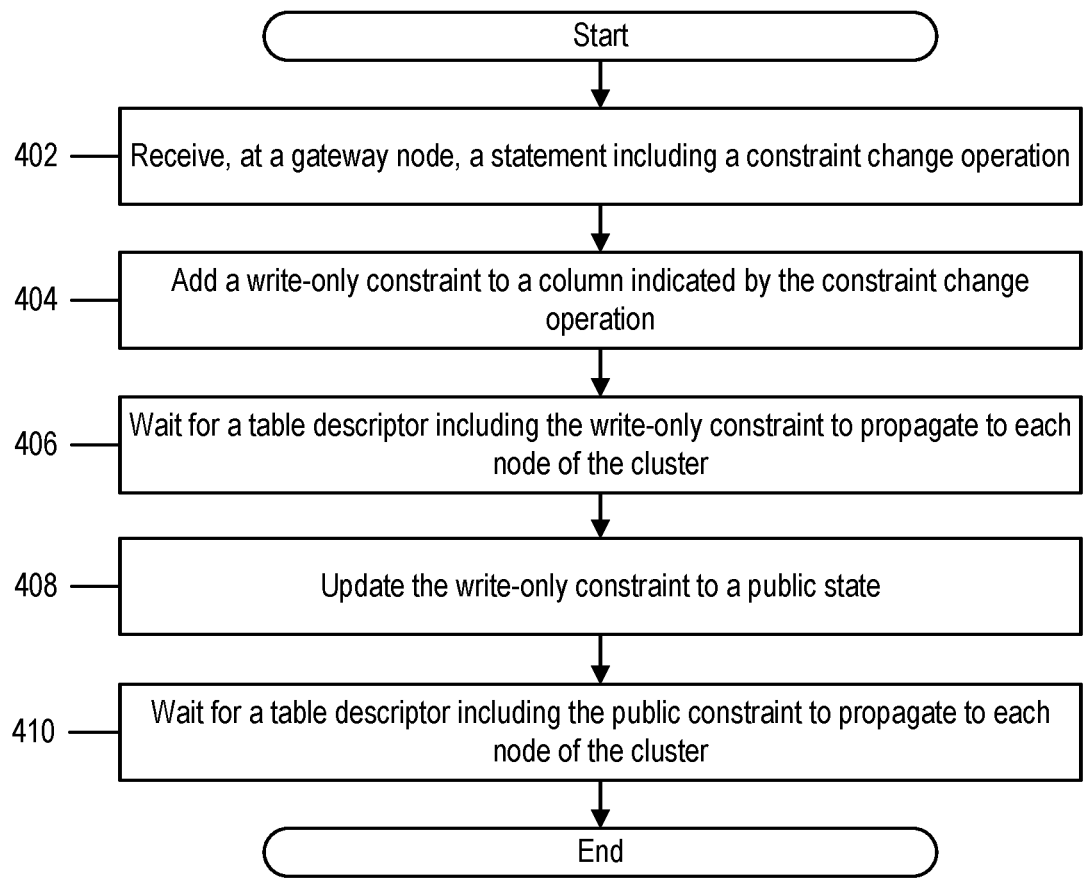
FIG. 4A shows an example flowchart of an execution method for online schema changes at the computing system, according to some embodiments.
Figure 4B:
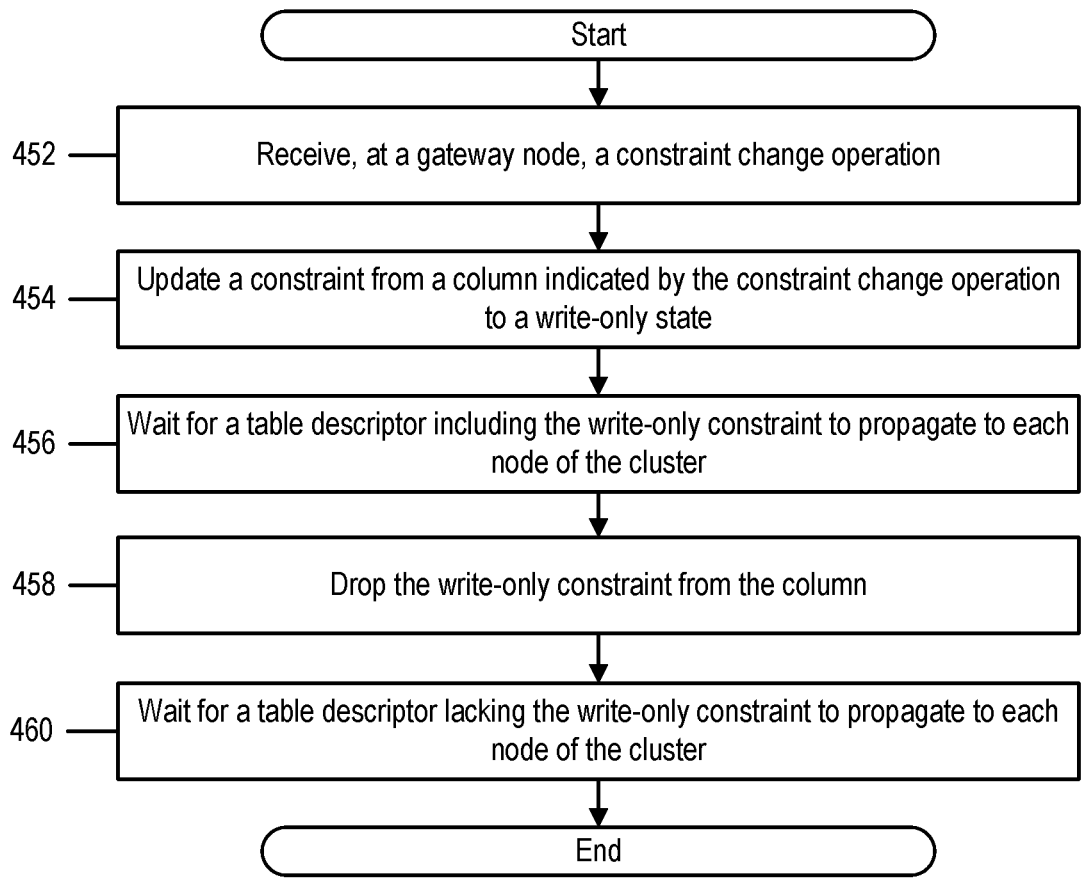
FIG. 4B shows an example flowchart of an execution method for online schema changes at the computing system, according to some embodiments.

Referring to FIGS. 4A and 4B, example flowcharts of execution methods for online constraint changes at the computing system 100 are shown, in accordance with some embodiments. FIG. 4A shows an example flowchart for an execution method 400 for adding a constraint to a column of a table stored by the computing system 100. The method 400 may be performed by one or more client devices (e.g., client device 106a, client device 106b, etc.) and one or more nodes of a cluster (e.g., cluster 102) of nodes. An output of the method 400 may include an updated table with an added constraint to a column. For simplicity, the following paragraphs describe the method 400 with reference to adding a constraint to a single column of a table while the table is online. However, one of ordinary skill in the art will appreciate that the steps 402-410 of the method 400 may be performed for any suitable number of add constraint operations. In an example, a schema change operation create, drop, and/or mutate (i.e. change) multiple elements and multiple operations may be issued serially as part of the same transaction according to the method 400. The method 400 may be performed by wholly or in part by a client device, a gateway node, and/or any other suitable node that is delegated by the gateway node (e.g., using one or more nodes). In some cases, the gateway node may forward the instructions for steps of the method 400 to another node of the cluster to delegate the schema change operation.

In some embodiments, the method 400 involves (1) receiving, at a gateway node, a statement including a constraint change operation; (2) adding a write-only constraint to a column indicated by the constraint change; (3) validating the constraint is upheld by the column data and waiting for a table descriptor including the write-only constraint for the column to propagate to each node of the cluster, (4) updating the write-only constraint to a public state, and (5) waiting for a table descriptor including the public constraint for the column to propagate to each node of the cluster.

In some embodiments, at step 402, a gateway node (e.g., node 120c) of the cluster 102 may receive a statement including a constraint change operation. The gateway node may receive the statement from a SQL client. A "begin" statement may precede the statement including the constraint change operation. In some cases, the begin statement, the statement including the constraint change operation, and a "commit" statement may be included as a part of a transaction. The constraint change operation may include a DDL corresponding to adding a constraint to a column of a table, where the table is stored by a plurality of nodes of the cluster 102 (e.g., for survivability purposes). In an example, the DDL may be an "add constraint" operation, where a constraint is respectively added to a column of a table (and all replicas of columns of the table).

At step 404, the gateway node may add a constraint to a column in a write-only state, where the column subject to the constraint is indicated by the constraint change operation and is included in the table. To add the constraint to the write-only column, the gateway node validate that only one version of the table descriptor is active and/or otherwise in use by nodes of the cluster 102. Based on validating that only one version (V) of the table descriptor is active, the gateway node may add the constraint to the column, increment the version of the table descriptor corresponding to the updated table to an updated version (V+1), and mark a descriptor included in the table descriptor to identify the constraint as write-only with a validating state. Marking the descriptor of the constraint as write-only with a validating state may enable the constraint change operation to validate that existing data in the column meets the condition of the constraint. If any existing data does not meet the condition of the constraint, the constraint change operation may be rolled back and its changes may be reversed to result in the version of the schema prior to initiating the constraint change operation. In some cases, the gateway node may add an indication of the ongoing schema change to the table. For example, the gateway node may add an indication of an "add constraint" schema change operation to the table descriptor. After adding a constraint to a column in a write-only state (and prior to step 406) and incrementing the version of the table descriptor, the transaction may commit.

At step 406, using one or more jobs, the gateway node (or any suitable) may validate that the constraint is upheld by the data included in the write-only column. If the constraint is upheld by the data included in the write-only column, the node may wait for the table descriptor (V+1) including the column with the write-only constraint to propagate to the other nodes of the cluster 102 that store the table corresponding to the table descriptor. If the constraint is not upheld by the data included in the write-only column, the node may roll back the constraint change operation. Nodes of the cluster 102 may release their leases on the previous version (V) of the table descriptor as described herein. The node may scan the system lease table to identify whether any nodes hold leases on the previous version (V) of the table descriptor before proceeding to step 408. As such, the node may wait until leases are released for the previous version (V) of the table descriptor and/or until leases are held for only the current version (V+1) of the table descriptor before proceeding to step 408.

At step 408, the gateway node (or any suitable node delegated by the gateway node) may update the write-only constraint to a public state, such that the write-only constraint is updated to a public constraint at the column of the table. To update the write-only constraint to a public constraint, the node may validate that only one version (V+1) of the table descriptor is active and/or otherwise in use by nodes of the cluster 102. Based on validating that only one version (V+1) of the table descriptor is active, the node may increment the version of the table descriptor corresponding to the table to an updated version (V+2) and may change a descriptor included in the table descriptor from write-only to public to identify the constraint for the column as public. Marking the descriptor of the constraint as public may allow operations (e.g., DMLs) that encounter the constrained column to normally operate (e.g., perform read, write, and delete operations) with the data included in the column (while subject to the added constraint).

At step 410, the gateway node (or any suitable node delegated by the gateway node) may wait for the table descriptor (V+2) including the public constraint to propagate to the other nodes of the cluster 102 that store the table corresponding to the table descriptor. Nodes of the cluster 102 may release their leases on the previous version (V+1) of the table descriptor as described herein. The node may scan the system lease table to identify whether any nodes hold leases on the previous version (V+1) of the table descriptor before concluding the method 400. As such, the node may wait until leases are released for the previous version (V+1) of the table descriptor and/or until leases are held for only the current version (V+2) of the table descriptor before concluding the method 400.

FIG. 4B shows an example flowchart for an execution method 450 for dropping a constraint from a column of a table stored by the computing system 100. The method 450 may be performed by one or more client devices (e.g., client device 106a, client device 106b, etc.) and one or more nodes of a cluster (e.g., cluster 102) of nodes. An output of the method 450 may include updated table with a dropped constraint from a column. For simplicity, the following paragraphs describe the method 450 with reference to dropping a constraint from a single column of a table while the table is online. However, one of ordinary skill in the art will appreciate that the steps 452-460 of the method 450 may be performed for any suitable number of drop constraint operations. In an example, a schema change operation may create, drop, and/or mutate (i.e. change) multiple elements and multiple operations may be issued serially as part of the same transaction according to the method 400. The method 450 may be performed by wholly or in part by a client device, a gateway node, and/or any other suitable node that is delegated by the gateway node (e.g., using one or more nodes). In some cases, the gateway node may forward the instructions for steps of the method 450 to another node of the cluster to delegate the schema change operation.

In some embodiments, the method 450 involves (1) receiving, at a gateway node, a statement including a constraint change operation; (2) updating a constraint in a column indicated by the constraint change operation to a write-only state; (3) waiting for a table descriptor including the write-only column to propagate to each node of the cluster, (4) dropping the write-only constraint from the column; and (5) waiting for a table descriptor including the public column to propagate to each node of the cluster.

In some embodiments, at step 452, a gateway node (e.g., node 120c) of the cluster 102 may receive a statement including a constraint change operation. The gateway node may receive the statement from a SQL client. A "begin" statement may precede the statement including the constraint change operation. In some cases, the begin statement, the statement including the constraint change operation, and a "commit" statement may be included as a part of a transaction. The constraint change operation may include a DDL corresponding to dropping a constraint from a column of a table, where the table is stored by a plurality of nodes of the cluster 102 (e.g., for survivability purposes). In an example, the DDL may be a "drop constraint" operation, where a constraint is respectively dropped from a column of a table (and all replicas of columns of the table).

At step 454, the gateway node may update a public constraint of column subject to the constraint change operation to a write-only state, such that the public constraint is updated to a write-only constraint at the table. The column including the public constraint subject to the update may be indicated by the schema change operation. To update the public constraint, the gateway node may validate that only one version of the table descriptor is active and/or otherwise in use by nodes of the cluster 102. Based on validating that only one version (V) of the table descriptor is active, the gateway node may increment the version of the table descriptor corresponding to the updated table to an updated version (V+1) and change a descriptor included in the table descriptor from public to write-only to identify the constraint as write-only. Marking the descriptor of the constraint as write-only may allow operations (e.g., DMLs) that encounter the column to only perform delete and write operations for the data included in the column. In some cases, the gateway node may add an indication of the ongoing schema change to the table. For example, the gateway node may add an indication of a "drop constraint" schema change operation to the table descriptor.

At step 456, using one or more jobs, the gateway node (or any suitable node delegated by the gateway node) may wait for the table descriptor (V+1) including the write-only constraint to propagate to the other nodes of the cluster 102 that store the table corresponding to the table descriptor. Nodes of the cluster 102 may release their leases on the previous version (V) of the table descriptor as described herein. The node may scan the system lease table to identify whether any nodes hold leases on the previous version (V) of the table descriptor before proceeding to step 458. As such, the node may wait until leases are released for the previous version (V) of the table descriptor and/or until leases are held for only the current version (V+1) of the table descriptor before proceeding to step 458.

At step 458, the gateway node (or any suitable node delegated by the gateway node) may drop the write-only constraint from the column. To drop the write-only constraint from the column, the node may validate that only one version (V+1) of the table descriptor is active and/or otherwise in use by nodes of the cluster 102. Based on validating that only one version (V+1) of the table descriptor is active, the node may increment the version of the table descriptor corresponding to the table to an updated version (V+2) and may drop the write-only constraint from the column.

At step 460, the gateway node (or any suitable node delegated by the gateway node) may wait for the table descriptor (V+2) lacking the write-only constraint (e.g., the table descriptor that dropped the constraint) to propagate to the other nodes of the cluster 102 that store the table corresponding to the table descriptor. Nodes of the cluster 102 may release their leases on the previous version (V+1) of the table descriptor as described herein. The node may scan the system lease table to identify whether any nodes hold leases on the previous version (V+1) of the table descriptor before concluding the method 450. As such, the node may wait until leases are released for the previous version (V+1) of the table descriptor and/or until leases are held for only the current version (V+2) of the table descriptor before concluding the method 450.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Transactional Schema Changes

In some embodiments, online schema changes as described herein with respect to FIGS. 3A-3B and 4A-4B may involve one or more DDL operations. Examples of DDL operations may include add column, drop column, create index, drop index operations, etc., which may be applied to schema asynchronously using different versions of table descriptors (or any other suitable descriptor) corresponding to multiple states (e.g., public, write-only, delete-only) of schemas or schema elements. Further examples of DDL operations may include create user, create role, create view, create sequence, create table (no constraints), create table (with constraints), create table as, create index (non-unique), crate unique index, create statistics, truncate table, drop user, drop role, drop database restrict, drop view restrict, drop table restrict, drop index restrict, drop sequence restrict, drop view cascade, drop table cascade, drop index cascade, drop sequence cascade, drop database cascade, alter table rename, alter table rename column, alter table rename constraint, alter table drop column, alter table drop constraint, alter table alter drop default, alter table alter drop not null, alter table alter drop stored, alter table alter type (no cony), alter table audit set, alter table add column null, alter table add constraint not null not valid, alter table add constraint default not valid, alter table add constraint unique not valid, alter table add constraint check not valid, alter table add constraint fk not valid, alter table add column default, alter table add constraint not null, alter table add constraint default, alter table add constraint unique, alter table add constraint check, alter table add constraint fk, alter table alter set default, alter table alter type (w/ data cony), alter table partition by, alter table validate constraint, alter table split at, alter table relocate, alter table unsplit at, alter table unsplit all, alter table scatter, alter table inject statistics, alter table configure zone, alter sequence, alter index rename, alter index split at, alter index relocate, alter index unsplit at, alter index unsplit all, alter index scatter, alter index configure zone, alter type add value, and alter type rename value.

But, due to the conventional configuration of online schema changes, some DMLs (e.g., update or insert operations) corresponding to a transaction may not operate on schema elements that are changed by transaction's DDLs. For example, a column added to a table as described herein with respect to FIG. 3A may not be written to during the transaction that added the column, as only the physical layout or the logical layout (but not both) may change between consecutive versions of table descriptors. To enable transactional schema changes, a database stored by the system 100 may be configured to execute schema changes during (rather than after) the execution of a transaction, where adjacent versions of table descriptors are configured to be remain compatible (e.g., logically and physically compatible) and at most two versions of table descriptors are active (i.e., leased) at a given time. Physical compatibility between versions of descriptors may imply that readers of the data in the prior descriptor version can read data written in the current descriptor version. Logical equivalence may imply that query semantics exposed to clients (e.g., client devices and corresponding SQL clients) remains identical between the prior descriptor version and the current descriptor version. Physical compatibility may imply that readers of the data in the prior version can read data written in the current version. Logical equivalence may imply that query semantics as exposed to client devices remains identical under both versions. In some cases, there may be one or more degrees of logical compatibility, such that query semantics may be partially (but not fully) maintained. For example, constraint enforcement may be exposed to concurrent transactions before the transaction corresponding to the constraint commits, such isolation is upheld for all data written (though not on all constraints enforced). While schema changes are implemented during execution of the transaction, the schema subject to the schema changes may be available for concurrent transactional DML, operations. Transactional schema changes as described herein may maintain serializable isolation, which guarantees that even though transactions may execute in parallel, the result of the transactions is the same as if the transactions had executed one at a time, without any concurrency.

In some embodiments, to implement transactional schema changes, column backfills as described herein may be modified to use an index backfill technique. Conventional column backfilling as described herein with respect to FIG. 3A can update the physical layout of particular indexes subject to a schema change, such that each row of the column is transactionally overwritten to a write-only state during the backfill operation. Such column backfilling can occur while concurrent transactional (e.g., read and write) operations operate using the indexes. But, conventional column backfilling is slow relative to similar index backfilling operations, while also being more difficult to clean up in the case of rollbacks for failed schema changes. As described herein, index backfilling instead reads from a source index (e.g., a fixed timestamp or varying timestamps), populates a new index using the data read from the source index, and swaps the new index for the source index in a final table descriptor update for the schema change. Both the source and new indexes may be available for write transactions during an index backfill, such that write operations (e.g., write operations occurring after the fixed timestamp) directed to the source index are also written to the new index as the new index is added to the table. The source index and new index may not be available for read transactions during an index backfill.

In some embodiments, as a part of enabling transaction schema changes, a modified column backfill may be configured to operate according to (e.g., with one or more features of) an index backfill. A modified column backfill may include (1) adding a new primary index to the table subject to the schema change; (2) backfilling the new primary index using data read from the source primary index at a particular timestamp; (3) writing data to the new primary index, where the data corresponds to write transactions operating with the source primary index after the particular timestamp or range of timestamps; and (4) swapping the new primary index with the source primary index in the final table descriptor update for the schema change, such that the primary index includes the added column corresponding to the schema change. The primary index may correspond to the primary index of a table subject to a transactional schema change as a part of a transaction, such that the transaction's write intents prior to the schema change operation are observed and used during the modified column backfill (and index backfill). To rollback such a column backfill in the case of a failure, the source primary index may be kept in the table and the added primary index may be dropped from the table, thereby avoiding a conventional back delete operation as described herein.

In some embodiments, child transactions may be used to implement transactional schema changes. In some embodiments, a child transaction may be a transaction affiliated with a parent transaction such that for the purposes of concurrency control, the child transaction and parent transaction are related. One or more child transactions may be used to maintain serializable isolation between transactions within the database. The child transaction may commit independently from its parent transaction. The parent transaction may not commit at a timestamp preceding the commit timestamp of any of its child transactions. A transaction (i.e. parent transaction) may include one or more child transactions, where each child transaction may observe write intents corresponding to the parent transaction. A child transaction may be committed independently of a parent transaction, where the effect of the committed child transaction may be observed by other transactions after the child transaction commits. For example, if a child transaction updates a table descriptor version, other nodes may acquire leases on the updated table descriptor version for their respective transactions. A child transaction may be used to (1) read descriptors (e.g., table descriptors, column descriptors, index descriptors) during execution of the parent transaction; and (2) commit writes to descriptors (excluding a final write to a table descriptor that makes a schema change visible). In some cases, a child transaction may include a type. A first type of a child transaction may be a child transaction configured to read (e.g., observe) write intents (i.e. provisional written values) corresponding to their parent transaction. A second type of a child transaction may be a child transaction configured to never read write intents corresponding to their parent transaction.

In some embodiments, a transaction including a schema change operation may write to a descriptor coordination table. The descriptor coordination table may be used by a transaction performing transactional schema changes to prevent concurrent transactional schema changes to the same table. Writes to the descriptor coordination table may enable exclusive locking on a particular table descriptor corresponding to a transactional schema change. A transaction including a transactional schema change operation may write to the descriptor coordination table prior to (and during) the transactional schema change operation. For example, a first transactional schema change may (1) read the descriptor coordination table; (2) observe no lock on the table subject to the transactional schema change; and (3) write to the descriptor coordination table to lock the table descriptor (and corresponding table) subject to the first transactional schema change. The written lock may indicate that the table descriptor is being modified by the first transactional schema change. Accordingly, a second transactional schema change may encounter the lock on the table descriptor and may be prevented from executing a transactional schema change for the table descriptor (and corresponding table) until the lock is removed from the descriptor coordination table. Locks on the descriptor coordination table may imply the existence of a transaction that is attempting to perform a schema change on the table descriptor with an identifier corresponding to the address of the lock, such that transactional schema change operations may observe ongoing transactional schema change operations and may adhere to serializability in the database.

In some embodiments, to enable transactional schema changes, a transaction (and/or one or more of its child transactions) may use synthetic descriptors. A synthetic descriptor may be a descriptor used within a transaction that does not correspond to a written or/otherwise committed descriptor state. A synthetic descriptor may be "in-memory" for a parent transaction, such that other transactions may not observe and/or otherwise interact with the synthetic descriptor. As an example, a synthetic descriptor may be an in-memory, synthetic version of a particular table descriptor. A parent transaction may operate using a synthetic descriptor, such that the parent transaction may read, write, and/or delete data included in the table corresponding to the synthetic descriptor. For example, after adding a column to a table, an insert operation directed to the added column within a parent transaction may insert the specified data to the added column prior to committing the parent transaction.

In some embodiments, child transactions may commit new versions of a table descriptor corresponding to the table descriptor modified by a transactional schema change. Child transactions may modify schema elements during a transaction (e.g., rather than after the transaction as described herein with respect to online schema changes). Accordingly, a child transaction of a parent transaction corresponding to a transactional schema change may commit a new version (V+1) of a table descriptor for a particular table and may wait for the new version of the table descriptor to propagate to each node of a cluster. Conventionally, waiting for the new version of the table descriptor to propagate may be known as "condition observation" and can expose the table (and database) to deadlock as described herein. For transactional schema changes, concurrent transactions may be blocked on the transaction corresponding to the transactional schema change. Such concurrent transactions may hold leases on the prior version (V) of the table descriptor, resulting in deadlock due to the inability for the new version (V+1) of the table descriptor to propagate to each node of the cluster. In some cases, a blocking transaction may be attempting to write to the table subject to the transactional schema change, such that the blocking transaction is placed in the transaction wait queue (TWQ) as described herein with a push abort request. In some cases, a blocking transaction may attempt to read the table subject to the transactional schema change, such that the blocking transaction is placed in the TWQ as described herein with a push timestamp request. Accordingly, child transactions of a transactional schema change operation may operate according to a condition observation method to update a table descriptor (e.g. corresponding to a change between delete-only, write-only, and public states) as a part of transactional schema change. The condition observation method may include (1) committing a new version (V+1) of a table descriptor using a first child transaction; (2) committing the first child transaction; (3) dropping leases at each node for the previous version (V) of the table descriptor originally locked by a parent transaction that includes the first child transaction; (4) scanning for nodes with outstanding leases on the previous version (V) of the table descriptor using a second child transaction; if no nodes have outstanding leases on the previous version of the table descriptor, (5) reading a timestamp at which no nodes have outstanding leases and committing the second child transaction; if one or more nodes have outstanding leases on the previous version of the table descriptor, (6) issuing a query transaction (i.e. QueryTxn) operation on the parent transaction to determine one or more concurrent blocking transactions that are waiting on the parent transaction, where the one or more concurrent blocking transactions correspond to nodes with outstanding leases on the previous version of the table descriptor; for concurrent blocking transactions involving reads, (7) pushing a timestamp of the parent transaction above the highest timestamp of the concurrent waiting transactions involving reads; for concurrent blocking transactions involving writes, (8) aborting the concurrent blocking transactions (e.g., while increasing the priority of the concurrent blocking transactions), and (9) pushing the timestamp of the parent transaction to a timestamp at which all of the leases of the previous version of the table descriptor were observed (by the second child transaction) to be dropped. In some cases, in place of pushing a timestamp of the parent transaction as described above with respect to (7), the gateway node may wait for the nodes corresponding to the concurrent blocking transactions to drop their outstanding leases on the previous version of the table descriptor.

In some embodiments, to add or create a schema element (e.g., a column or an index) via a transactional schema change for a particular schema (e.g., table, type, view, sequence, database, role, etc.) one or more child transactions may be used to add or create the schema element, increment versions of table descriptors (or other suitable descriptors) along with state changes for the added or created schema element, and/or wait for nodes to release leases on the previous versions of table descriptors. The version(s) of the table descriptor written by the one or more child transactions may not include logical changes to the state of the table. As an example, concurrent transactions may not logically observe the physical changes to the table descriptor and corresponding table. The version(s) of the table descriptor written by the one or more child transactions may include only physical changes to the state of the table. A parent transaction may write a synthetic descriptor after one or more child transactions add (e.g., physically, but not logically add) a schema element to a table. A parent transaction may write a new version of a particular table descriptor that includes the one or more logical changes implied the one or more child transactions. In some cases, the one or more logical changes may be implied by a generated synthetic descriptor used during a transactional schema change. Use of the synthetic descriptor may enable the parent transaction to interact with the synthetic descriptor as though it has been added as a new version of the table descriptor, while the synthetic descriptor remains logically non-existent to other concurrent transactions. As an example, the parent transaction may write a value to a row in a column added by the transactional schema change, while the column is not visible to other concurrent transactions.

In some embodiments, to add a new schema element to a table corresponding to a table descriptor (or any other suitable descriptor corresponding to a particular schema) in a transactional schema change, a gateway node may execute a transaction to acquire a lease for the table descriptor corresponding to the table (if the gateway node does not already hold a lease for the version of the table descriptor). The gateway node may acquire a lease for the table descriptor having a version V. A parent transaction may write to the descriptor coordination table to acquire a lock on the table descriptor subject to the transactional schema change. After the parent transaction acquires a lock on the table descriptor, a first child transaction may read the table descriptor locked by the parent transaction. In some cases, if the table descriptor has pending schema changes (e.g., failed schema changes), the parent transaction may release a lease on a version (V) of a table descriptor and one or more child transactions may clean up (e.g., remove, eliminate, roll back, and/or otherwise discard) the pending schema changes. One or more child transactions may clean up the pending schema changes (e.g., pending created or dropped indexes) using one or more jobs (e.g., asynchronous GC jobs). For example, a GC job may be used to clean up a failed create index operation, where a partially created index is visible to other transactions. The one or more child transactions may safely clean up the pending schema changes based on locking the table descriptor in the descriptor coordination table. If the table descriptor does not have pending schema changes, the parent transaction may release a lease on a version (V) of a table descriptor and the first child transaction corresponding to transaction (i.e. parent transaction) may write a new version (V+1) of a table descriptor, add or create a schema element to/for a table in a delete-only state, and commit. After the first child transaction commits, a second child transaction may execute the condition observation method as described herein to wait for leases on the previous version (V) of the table descriptor to be released. After the second child transaction observes the release of leases on the previous version of the table descriptor, a third child transaction may increment the version (V+1) of the table descriptor to a new version (V+2), change the added schema element from delete-only to write-only, and commit. After the third child transaction commits, a fourth child transaction may execute the condition observation method as described herein to wait for leases on the previous version (V+1) of the table descriptor to be released. After a commit of the fourth child transaction, the parent transaction may backfill the added schema element in the write-only state using an index backfill (or modified column backfill) operation as described herein. In some cases, a source index used in the backfill may include write intents corresponding to write operations of the parent transaction that execute prior to execution of the transactional schema change in the parent transaction. In other cases, the parent transaction may buffer the write operations in memory and may re-issue the write operations for any newly created indexes corresponding to the index backfill. Such implementations would avoid the need for child transactions to be able to read uncommitted write intents of their corresponding parent transaction.

In some embodiments, after backfilling the added schema element (e.g., column or index), the parent transaction may push its timestamp above that of the timestamp at which nodes (e.g., all nodes or a quorum of nodes) were using the version (V+2) of the table descriptor that includes the write-only schema element. After pushing its timestamp, the parent transaction may synthesize and/or otherwise generate a synthetic descriptor (V+3) corresponding to the table descriptor, where the synthetic descriptor includes the primary index of the current version (V+2) of the table descriptor in a write-only state and a backfilled primary index (with the added schema element) as the primary index of the synthetic descriptor in a public state. The synthetic descriptor may be an in-memory version of the table descriptor that is visible only to the parent transaction, such that subsequent read, write, and delete operations in the parent transaction may operate on the public primary index of the synthetic descriptor. The synthetic descriptor may include a pending drop index mutation to drop the write-only primary index, which may be written and/or otherwise executed when the synthetic descriptor is written during a commit of the parent transaction.

In some embodiments, after synthesizing the synthetic descriptor, the parent transaction may execute read, write, and delete (e.g., DML) operations (if present in the parent transaction) using the primary index of the synthetic descriptor. For example, the parent transaction may execute operations to insert data to an index added by the parent transaction. After executing zero or more operations, the parent transaction may commit. To commit, the parent transaction may validate that only one version (V+2) of the table descriptor is active and/or otherwise in use by nodes of the cluster 102. Based on validating that only one version (V+2) of the table descriptor is active, the gateway node may write the synthetic descriptor (or a modified version of the synthetic descriptor) as a new version (V+3) of the table descriptor with one or more jobs (e.g., GC jobs) to drop the write-only primary index from the version (V+3) of the table descriptor. After writing the synthetic descriptor (or modified synthetic descriptor) as the new version (V+3) of the table descriptor, the parent transaction may commit and may wait for the one or more jobs to complete dropping the write-only primary index from the table descriptor. In some cases, one or more additional versions of the table descriptor may be written according to the child transaction protocol as described herein to optimize the behavior of concurrent transactions.

Figure 5A:
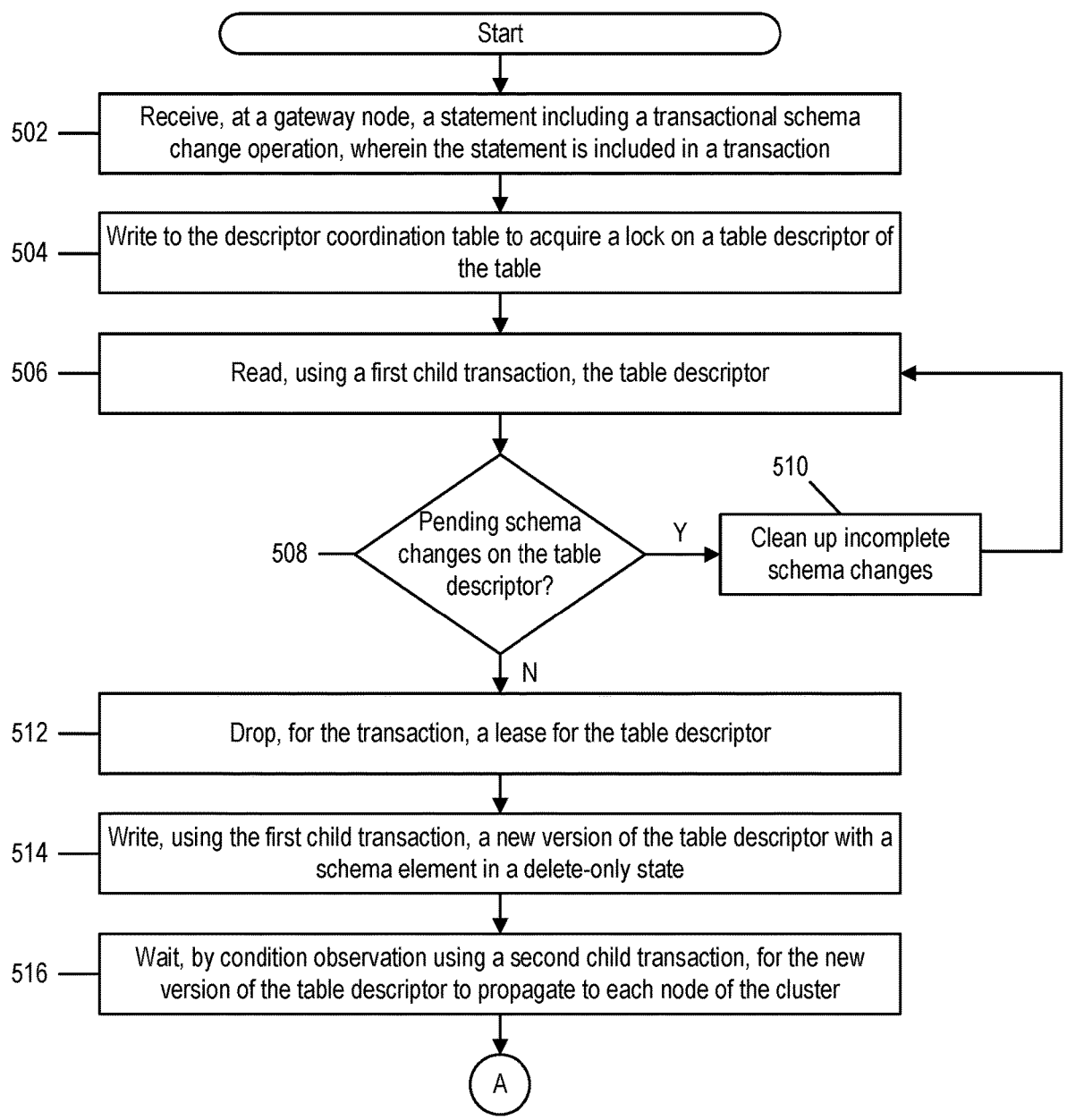
FIG. 5A shows an example flowchart of an execution method for transactional schema changes at the computing system, according to some embodiments.
Figure 5B:
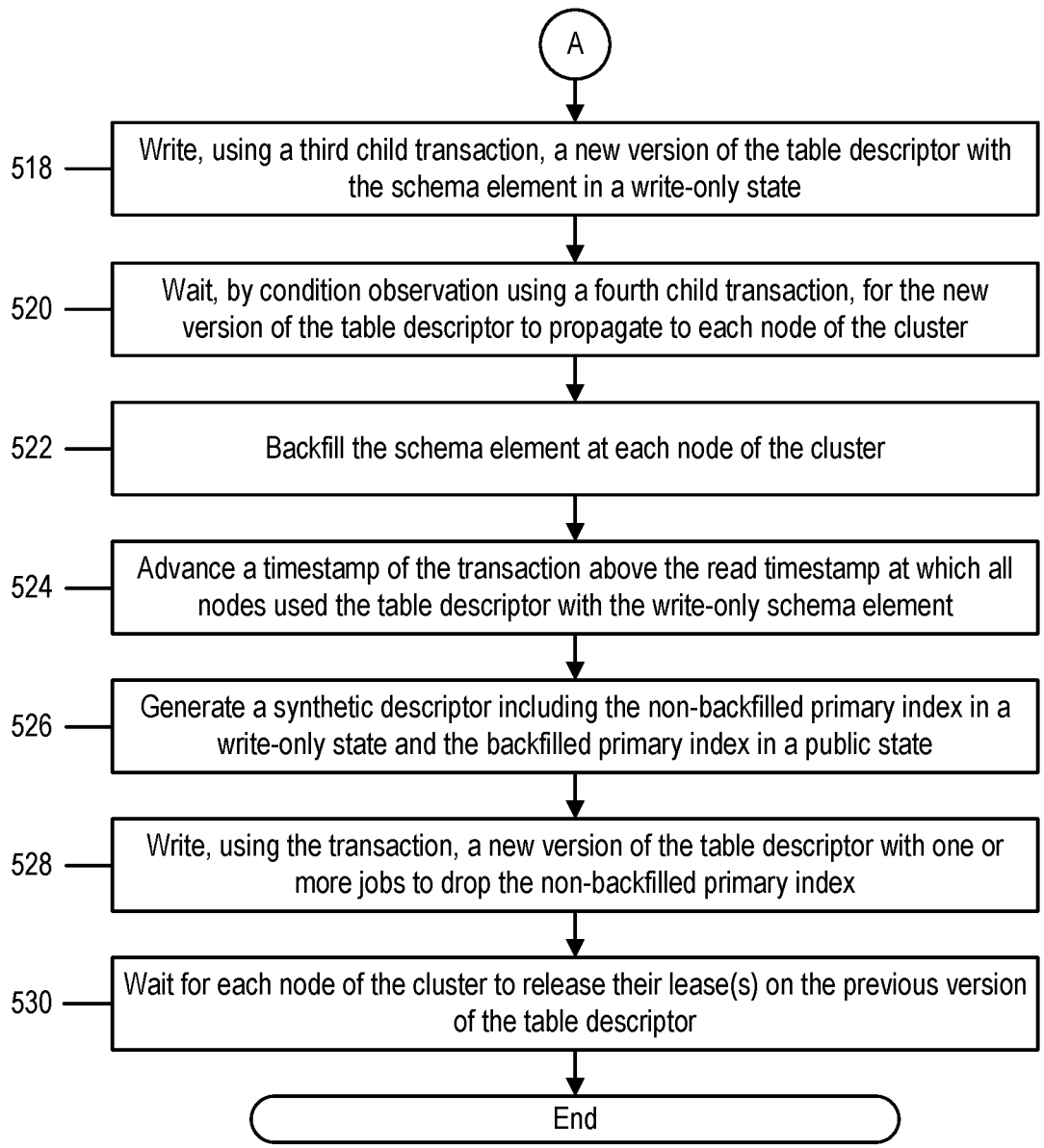
FIG. 5B shows an example flowchart of an execution method for transactional schema changes at the computing system, according to some embodiments.

Referring to FIGS. 5A and 5B, example flowcharts of an execution method for transactional schema changes at the computing system 100 are shown, in accordance with some embodiments. FIGS. 5A and 5B show an example flowchart for an execution method 500 for adding or creating a schema element to/for a table stored in the computing system 100. The method 500 is suitable for executing transactional schema changes, including adding or creating schema elements (e.g., columns or indexes) to/for an existing table stored by nodes of a cluster (e.g., cluster 102). The method 500 may be performed by one or more client devices (e.g., client device 106a, client device 106b, etc.) and one or more nodes of a cluster (e.g., cluster 102) of nodes. An output of the method 500 may include updated schema with an added schema element, including a column or an index. For simplicity, the following paragraphs describe the method 500 with reference to adding a single schema element to a table during a transaction. However, one of ordinary skill in the art will appreciate that the steps 502-530 of the method 500 may be performed for any suitable number of schema element add or create operations. In an example, a transactional schema change operation may create, drop, and/or mutate (i.e. change) multiple elements and multiple operations (e.g., DDLs and DMLs) may be issued serially as part of the same transaction according to the method 500. While the description of the method 500 below includes the use of ordinal terms (e.g., first, second, third, etc.), any suitable number of operations (e.g., child transactions) may be used to execute the method 500. The method 500 may be performed by wholly or in part by a client device, a gateway node, and/or any other suitable node that is delegated by the gateway node (e.g., using one or more nodes). In some cases, the gateway node may forward the instructions for steps of the method 500 to another node of the cluster to delegate the schema change operation.

In some embodiments, the method 500 involves (1) receiving, at a gateway node, a statement including a transactional schema change operation directed to a table, wherein the statement is included in a transaction; (2) writing to the descriptor coordination table to acquire a lock on a table descriptor of the table; (3) reading, using a first child transaction, the table descriptor; (4) determining whether there are any pending schema changes on the table descriptor; if there are pending schema changes on the table descriptor, (5) cleaning up incomplete schema changes; if there are not pending schema changes on the table descriptor, (6) dropping, for the parent transaction, a lease for the table descriptor; (7) write, using the first child transaction, a new version of the table descriptor with a schema element in a delete-only state; (8) waiting, by condition observation using a second child transaction, for the new version of the table descriptor to propagate to each node of the cluster; (9) writing, using a third child transaction, a new version of the table descriptor with the schema element in a write-only state; (10) waiting, by condition observation using a fourth child transaction, for the new version of the table descriptor to propagate to each node of the cluster; (11) backfilling the schema element at each node of the cluster; (12) advancing a timestamp of the transaction above the read timestamp at which all nodes used the table descriptor with the write-only schema element; (13) generating a synthetic descriptor including the non-backfilled primary index in a write-only state and the backfilled primary index in a public state as the primary index of the synthetic descriptor; (14) writing, using the transaction, a new version of the table descriptor with one or more jobs to drop the non-backfilled primary index; and (15) waiting for each node of the cluster to release their lease(s) on the previous version of the table descriptor.

In some embodiments, at step 502, a gateway node (e.g., node 120c) of the cluster 102 may receive a statement including a transactional schema change operation. The gateway node may receive the statement from a SQL client. A "begin" statement may precede the statement including the transactional schema change operation. In some cases, the begin statement, the statement including the transactional schema change operation, and a "commit" statement may be included as a part of a transaction (i.e. parent transaction). The SQL client may be operating at a client device (e.g., client device 106b). The gateway node may receive the transaction including the transactional schema change operation via the network 111. The schema change operation may include a DDL directed to a particular table, where the table is stored by a plurality of nodes of the cluster 102 (e.g., for survivability purposes). In an example, the DDL may be an "add column" or a "create index" operation, where a column or an index is respectively added to a table (and all replicas of the table).

At step 504, the transaction may write to the descriptor coordination table to acquire a lock on the table descriptor subject to the transactional schema change. The transaction may attempt to write to the descriptor coordination table at a key space corresponding to the table descriptor identifier to acquire an exclusive lock for performing schema changes to the table descriptor. In some cases, the attempt to write may encounter an existing lock in the descriptor coordination table at the table descriptor's key space and the transaction may block on that lock. In some cases, the attempt to write may not encounter an existing lock in the descriptor coordination table (e.g., corresponding to a concurrent transaction) at the table descriptor's key space and the transaction may acquire a lock on the table descriptor. In some cases, if the transaction and a concurrent transaction are deadlocked (e.g., blocked on each other), the deadlock detection mechanism may abort one of the transaction or the concurrent transaction.

At step 506, a first child transaction of the transaction may read the table descriptor. The first child transaction may read the table descriptor to identify whether any schema changes directed to the table are pending and/or otherwise incomplete. In some cases, step 506 may occur before or concurrently with step 504.

At step 508, the first child transaction may determine whether any schema changes (e.g., incomplete schema changes) are pending on the table descriptor. In some cases, the first child transaction may determine that there are one or more pending schema changes on the table descriptor. In other cases, the first child transaction may determine that there are no pending schema changes on the table descriptor.

At step 510, based on determining that there are one or more pending schema changes on the table descriptor, the one or more child transactions may clean up the one or more pending schema changes for the table descriptor. One or more child transactions may create one or more jobs (e.g., GC jobs) to clean up the one or more pending schema changes. Based on cleaning up the one or more pending schema changes, the method 500 may revert to step 506.

At step 512, based on determining that that there are no pending schema changes on the table descriptor, the transaction may drop the lease for the version V of the table descriptor. The table descriptor may remain locked by the descriptor coordination table after the transaction drops the lease for the table descriptor.

At step 514, the first child transaction may write a new version (V+1) of the table descriptor that includes an added or created schema element in a delete-only state. The schema element may be a column or an index. To write the new version (V+1) of the table descriptor, the child transaction may acquire a lease for the version V of the table descriptor corresponding to the table. Based on acquiring the lease for the table descriptor, the child transaction may validate that only one version of the table descriptor is active and/or otherwise in use by nodes of the cluster 102. Based on validating that only one version (V) of the table descriptor is active, if the transactional schema change corresponds to creating an index, the child transaction may create a new index for the table, increment the version of the table descriptor corresponding to the updated table to an updated version (V+1), and mark an index descriptor included in the table descriptor to identify the index as delete-only. If the transactional schema change corresponds to adding a column, the child transaction may create a new index for the table with an added column, increment the version of the table descriptor corresponding to the updated table to an updated version (V+1), and mark an index descriptor and column descriptor included in the table descriptor to identify both the index and column as delete-only. After writing the new version of the table descriptor, the first child transaction may commit.

At step 516, a second child transaction may wait by condition observation for the updated version (V+1) of the table descriptor with the delete-only index (and optionally delete-only column) to propagate to each node of the cluster. Condition observation by the second child transaction may include scanning for nodes with outstanding leases on the previous version (V) of the table descriptor at a system lease table. If no nodes have outstanding leases on the previous version of the table descriptor, the second child transaction may read a timestamp at which no nodes have outstanding leases on the previous version of the table descriptor and may commit. If one or more nodes have outstanding leases on the previous version of the table descriptor, the second child transaction may issue a request to determine the set of transactions which might be blocked on the parent transaction. The set of transactions which might be blocked on the parent transaction may correspond to nodes with outstanding leases on the previous version (V) of the table descriptor. The request may be a query transaction (i.e. QueryTxn) request. The request may be addressed to the key space and identifier corresponding to the parent transaction and may return metadata about the other transactions which are currently waiting on the parent transaction. In some cases, queries may wait on another transaction by issuing a Push-Request. A PushRequest may attempt to abort another transaction (i.e. Push Abort) or move the other transaction's timestamp forward (i.e. Push Timestamp). Push requests may wait in the TWQ, which may located on the gateway node of the leaseholder of the range where the transaction's record is located. The TWQ may facilitate deadlock detection. In some cases, if one or more nodes have outstanding leases on the previous version of the table descriptor, the gateway node may wait for a duration of time for the nodes to drop the outstanding leases on the previous version of the table descriptor. If the determined concurrent blocking transaction(s) involve reads, the second child transaction may advance (e.g., push) a timestamp of the transaction above the highest timestamp of the concurrent waiting transactions that involve reads. If the determined concurrent blocking transaction(s) involve writes, the second child transaction may abort the concurrent blocking transactions (e.g., while increasing the priority of the concurrent blocking transactions). The second child transaction may advance the timestamp of the transaction to a timestamp at which all of the leases of the previous version (V) of the table descriptor were observed to be dropped. The second child transaction may wait for each of the nodes storing the table subject to the transactional schema change to drop their leases on the previous version (V) of the table descriptor, such that only the updated version (V+1) of the table descriptor is active across the cluster.

At step 518, a third child transaction may write a new version (V+2) of the table descriptor that includes the added or created schema element in a write-only state. To add the write-only schema element, the child transaction may acquire a lease for the table descriptor corresponding to the table having a version V+1. Based on acquiring the lease for the version V+1 of the table descriptor, the child transaction may validate that only one version of the table descriptor is active and/or otherwise in use by nodes of the cluster 102. Based on validating that only one version (V+1) of the table descriptor is active, if the transactional schema change corresponds to creating an index, the child transaction may increment the version of the table descriptor corresponding to the updated table to an updated version (V+2) and may mark an index descriptor included in the table descriptor to identify the index as write-only. If the transactional schema change corresponds to adding a column, the child transaction may increment the version of the table descriptor corresponding to the updated table to an updated version (V+2) and may mark an index descriptor and column descriptor included in the table descriptor to identify both the index and column as write-only. After writing the new version of the table descriptor, the third child transaction may commit.

At step 520, a fourth child transaction may wait by condition observation for the updated version (V+2) of the table descriptor with the write-only index (and optionally write-only column) to propagate to each node of the cluster. Condition observation by the fourth child transaction may include scanning for nodes with outstanding leases on the previous version (V+1) of the table descriptor at a system lease table. If no nodes have outstanding leases on the previous version of the table descriptor, the fourth child transaction may read a timestamp at which no nodes have outstanding leases on the previous version of the table descriptor and may commit. If one or more nodes have outstanding leases on the previous version of the table descriptor, the fourth child transaction may issue a request (e.g., query transaction request) as described herein to determine the set of transactions which might be blocked on the parent transaction. In some cases, if one or more nodes have outstanding leases on the previous version of the table descriptor, the gateway node may wait for a duration of time for the nodes to drop the outstanding leases on the previous version of the table descriptor. If the determined concurrent blocking transaction(s) involve reads, the fourth child transaction may advance (e.g., push) a timestamp of the transaction above the highest timestamp of the concurrent waiting transactions that involve reads. If the determined concurrent blocking transaction(s) involve writes, the fourth child transaction may abort the concurrent blocking transactions (e.g., while increasing the priority of the concurrent blocking transactions). The fourth child transaction may advance the timestamp of the transaction to a timestamp at which all of the leases of the previous version (V+1) of the table descriptor were observed to be dropped. The fourth child transaction may wait for each of the nodes storing the table subject to the transactional schema change to drop their leases on the previous version (V+1) of the table descriptor, such that only the updated version (V+2) of the table descriptor is active across the cluster.

At step 522, the fourth child transaction may backfill the added index (and added column if applicable). For a transactional schema change used to create an index, the fourth child transaction may backfill the added index using an index backfill operation as described herein. For a transactional schema change used to add a column, the fourth child transaction may backfill the added index using an modified column backfill operation as described herein. The source primary index for both the index and modified column backfills may include write intents corresponding to zero or more write statements that procedure the transactional schema change statement in the transaction. Based on backfilling the added index (and added column if applicable), the fourth child transaction may write data to the added index and/or added column, where the written data corresponding to data written by concurrent write transactions having timestamps greater than the timestamp of the source index for the index and/or modified column backfill.

At step 524, the transaction may advance its timestamp above the timestamp at which the version (V+2) of the table descriptor with the write-only index propagated to each of the nodes storing the table subject to the transactional schema change (e.g., as observed in step 524). The timestamp at which the version (V+2) of the table descriptor with the write-only index propagated to each of the nodes may be the timestamp at which all of the nodes released their leases on the previous version (V+1) of the table descriptor.

At step 526, the transaction may synthesize and/or otherwise generate a synthetic descriptor corresponding to the leased version (V+2) of the table descriptor, where the synthetic descriptor includes the non-backfilled primary index of the current version (V+2) of the table descriptor in a write-only state and the backfilled primary index of the current version (V+2) of the table descriptor in a public state as the primary index of the synthetic descriptor. As described herein, the synthetic descriptor may be an in-memory version of the table descriptor that is visible only to the transaction, such that subsequent read, write, and delete operations in the transaction may operate on the public primary index of the synthetic descriptor. In some cases, prior to proceeding to step 528, the parent transaction may include any suitable number of DMLs and/or DDLs (e.g., further transactional schema changes). If the parent transaction includes one or more additional DDLs, the method 500 may revert to step 504 for each additional transactional schema change or may perform the method 600 for each additional transactional constraint change.

At step 528, the transaction may write a new version (V+3) of the table descriptor corresponding to the synthetic descriptor with one or more jobs to drop the write-only, non-backfilled primary index of the previous version (V+2)

of the table descriptor. The new version (V+3) of the table descriptor may include the public, backfilled primary index of the synthetic descriptor and the write-only, non-backfilled primary index of the synthetic descriptor. To write the new version (V+3) of the table descriptor, the transaction may write the synthetic descriptor (or a modified version of the synthetic descriptor) as the new version (V+3) of the table descriptor. Based on writing the new version (V+3) of the table descriptor, the transaction may write one or more jobs (e.g., GC jobs) to drop the write-only primary index from the new version (V+3) of the table descriptor. After writing the new version (V+3) of the table descriptor and/or after writing records for any jobs (e.g., jobs to drop the write-only primary index), the transaction may commit.

At step 530, the gateway node (or a node delegated by the gateway node) may wait for the one or more jobs to drop the write-only, non-backfilled primary index and for the new version (V+3) of the table descriptor including the only public primary index from the synthetic descriptor to propagate to the other nodes of the cluster 102 that store the table. Nodes of the cluster 102 may release their leases on the previous version (V+2) of the table descriptor as described herein. The gateway node (or a delegated node) may scan the system lease table to identify whether any nodes hold leases on the previous version (V+2) of the table descriptor before concluding the method 500. As such, the gateway node may wait until leases are held for only the current version (V+3) of the table descriptor before concluding the method 500.

In some embodiments, to drop a schema element (e.g., a column or an index) via a transactional schema change, one or more child transactions may be used to drop the schema element, increment versions of table descriptors along with state changes for the dropped schema element, and/or wait for nodes to release leases on the previous versions of table descriptors. As described herein, the version(s) of the table descriptor written by the one or more child transactions may not include logical changes to the state of the table. The version(s) of the table descriptor written by the one or more child transactions may include only physical changes to the state of the table. The method 500 may be modified based on the method 350 for dropping a schema element (e.g., a column or an index) based on logically synthesizing the dropped schema element and physically dropping the schema element after the transaction commits. One or more jobs may be used to physically cleanup the table after the schema element has been logically dropped from the table. In some embodiments, step 510 of the method 500 may include transactionally dropping the pending schema changes as described herein with respect to the method 500. While the method 500 is described with respect to a table and table descriptor, any suitable schema or schema element and corresponding descriptor may be modified by a transactional schema change as described herein with respect to FIGS. 5A-5B and the method 500, such that the schema or schema element replaces the table in the method 500 and the corresponding descriptor replaces the table descriptor (unless the descriptor is also a table descriptor) in the method 500.

In some embodiments, a transactional schema change may include a schema change corresponding to a constraint. For example, a constraint may be added, dropped, or changed using a transactional schema change. Conventionally, a transaction that adds or changes a constraint for a particular column of a table may validate (using a validate constraint operation) that existing data in the column meets the condition of the constraint, but the constraint may not validate that concurrent writes to the column meet the condition of the constraint. To prevent concurrent write operations from violating a constraint of a column, concurrent transactions that write to a column undergoing a constraint change or addition may observe a state of the constraint. Concurrent transactions may observe the constraint being added or changed in a "validating" state, such that the concurrent transactions may detect whether they would violate the constraint (e.g., if the constraint was public) and whether the constraint change has been committed by its transaction. If the concurrent transaction determines the constraint change has not been committed, the concurrent transaction may cause the constraint change to not commit to the column and may return a flag indicator to a SQL client corresponding to the concurrent transaction.

In some embodiments, to ensure that an ongoing (e.g., non-committed) constraint change operation of a transactional schema change will not be violated by a concurrent write operation, the concurrent write operation may transparently prevent the transactional schema change from being applied in order to avoid leaking the existence of the uncommitted schema change to the user. In some embodiments, the concurrent writer may prevent the transactional schema change from being applied by writing to a key span which the transactional schema change previously read. Because the schema change transaction executes using serializable isolation, a write to a key span which the schema change transaction read before its final commit timestamp will prevent the schema change transaction from committing. The key span may be included in a constraint coordination table. In some embodiments, before committing, the schema change may attempt to delete all entries in the constraint coordination span. Based on the schema change transaction previously determining that the key span was empty, if it now discovers any rows to be deleted, the schema change transaction may abort. In some cases, the values being written to the key span by the concurrent write transaction may be empty values to avoid any need for garbage collection for the key span. The empty values may include a time stamp and the corresponding key of the key span.

In some embodiments, to add a constraint via a transactional schema change, one or more child transactions may be used to add the constraint, increment versions of table descriptors along with state changes for the added constraint, and/or wait for nodes to release leases on the previous versions of table descriptors. As described herein, the version(s) of the table descriptor written by the one or more child transactions may not include logical changes to the state of the table. The version(s) of the table descriptor written by the one or more child transactions may include only physical changes to the state of the table. A parent transaction may generate and use a synthetic descriptor after one or more child transactions to add a constraint to a column (or columns) of a table.

In some embodiments, to add a constraint (e.g., a check constraint) to a table (corresponding to a table descriptor) in a transactional schema change, a gateway node may execute a transaction to acquire a lease for the table descriptor corresponding to the table (if the gateway node does not already hold a lease for the version of the table descriptor). The gateway node may acquire a lease for the table descriptor having a version V. A parent transaction may write to the descriptor coordination table to acquire a lock on the table descriptor subject to the transactional schema change. After the parent transaction acquires a lock on the table descriptor, a first child transaction may read the table descriptor locked by the parent transaction. If the table descriptor has pending schema changes, the one or more child transactions may clean up the pending schema changes using one or more jobs (e.g., GC jobs). If the table descriptor does not have pending schema changes, the parent transaction may release a lease on a version (V) of a table descriptor and the first child transaction corresponding to transaction (i.e. parent transaction) may write a new version (V+1) of a table descriptor, add a constraint to a column indicated by the transactional schema change in a validating state, and commit. After the first child transaction commits, a second child transaction may execute the condition observation method as described herein to wait for leases on the previous version (V) of the table descriptor to be released. After all leases on the previous version (V) of the table descriptor to be released, the transaction may scan the constraint coordination table to determine whether any concurrent transactions have written to the constraint coordination table, such that written values may violate the added constraint if applied to the table. As described herein, a concurrent write transaction may write to the constraint coordination table if the concurrent transaction observes the constraint in a validating state and the value(s) written by the concurrent write transaction will violate the added constraint. The parent transaction may validate that the constraint coordination table is empty. If the constraint coordination table is empty, the parent transaction may proceed. If the constraint coordination table is not empty, concurrent transactions may have written values to a subset (i.e. key space) of the constraint coordination table corresponding to the added constraint and the transaction may abort to prevent the violation of the added constraint.

In some embodiments, after validating the constraint coordination table is empty, the parent transaction may push its timestamp above that of the timestamp at which nodes (e.g., all nodes or a quorum of nodes) were using the version (V+1) of the table descriptor that includes the validating constraint. After pushing its timestamp, the parent transaction may acquire a lease on the current version (V+1) of the table descriptor. The parent transaction may synthesize and/or otherwise generate a synthetic descriptor corresponding to the leased table descriptor, where the synthetic descriptor includes the table with the added constraint in a public state. The synthetic descriptor may be an in-memory version of the table descriptor that is visible only to the parent transaction, such that subsequent read, write, and delete operations in the parent transaction may operate on the table with the public constraint corresponding to the synthetic descriptor.

In some embodiments, after synthesizing the synthetic descriptor, the parent transaction may execute read, write, and delete (e.g., DML) operations (if present in the parent transaction) using the primary index of the synthetic descriptor. For example, the parent transaction may execute operations to insert or update data in the column subject to the constraint added by the parent transaction. After executing zero or more operations, the parent transaction may commit. To commit, the parent transaction may issue a delete range command over the subset (e.g., span) of the constraint coordination table corresponding to the descriptor. After issuing the delete range command and determining that no rows in the subset of the descriptor coordination table have been written, the parent transaction may validate that only one version (V+1) of the table descriptor is active and/or otherwise in use by nodes of the cluster 102. Based on validating that only one version (V+1) of the table descriptor is active, the gateway node may write the synthetic descriptor (or a modified version of the synthetic descriptor) as a new version (V+2) of the table descriptor. After writing the synthetic descriptor (or a modified version of the synthetic descriptor) as the new version of the table descriptor, the parent transaction may commit and may wait for the new version (V+2) of the table descriptor to propagate to the nodes of the cluster 102. In some cases, one or more additional versions of the table descriptor may be written according to the child transaction protocol as described herein to optimize the behavior of concurrent transactions.

Figure 6A:
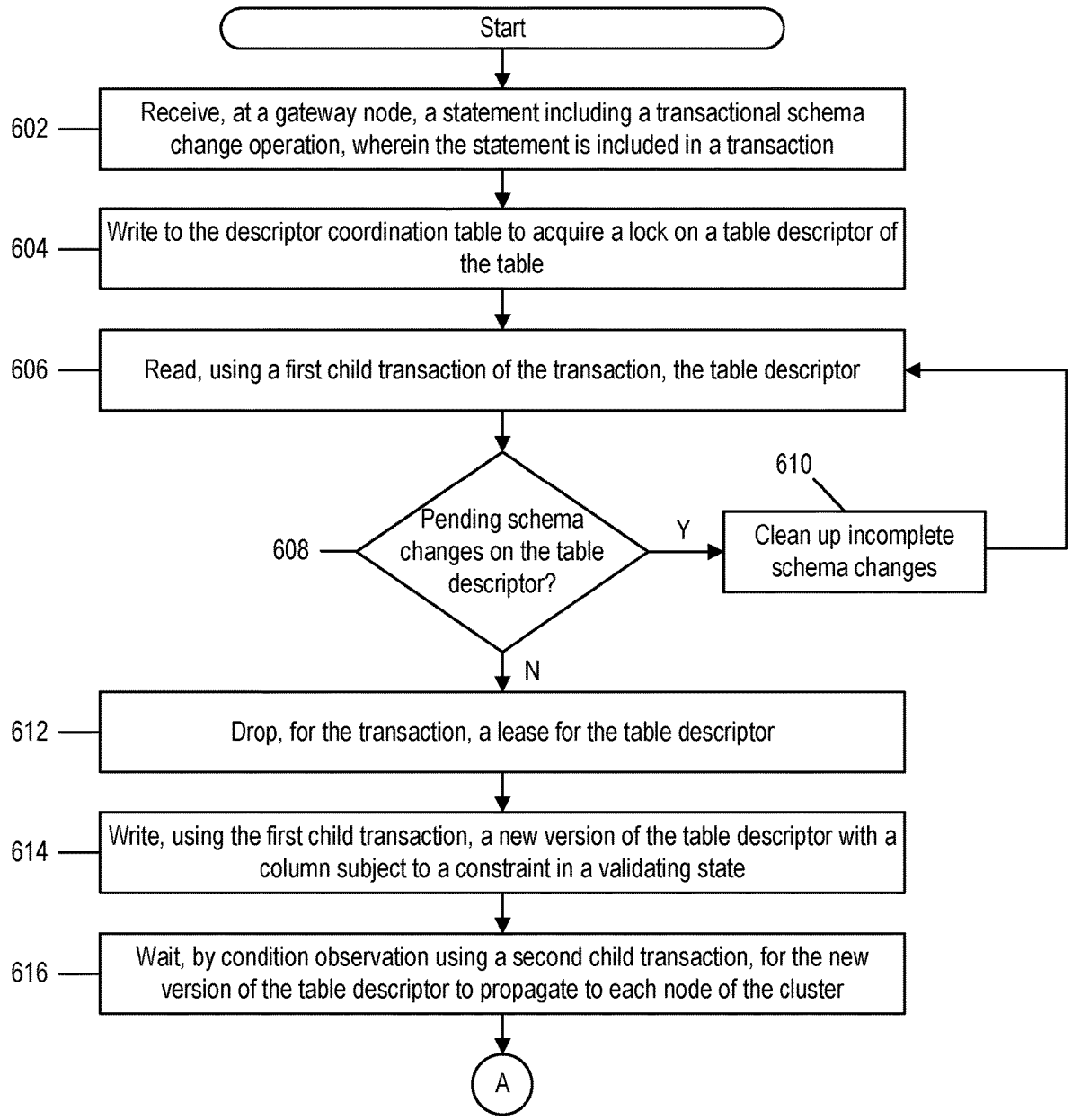
FIG. 6A shows an example flowchart of an execution method for transactional schema changes at the computing system, according to some embodiments.
Figure 6B:
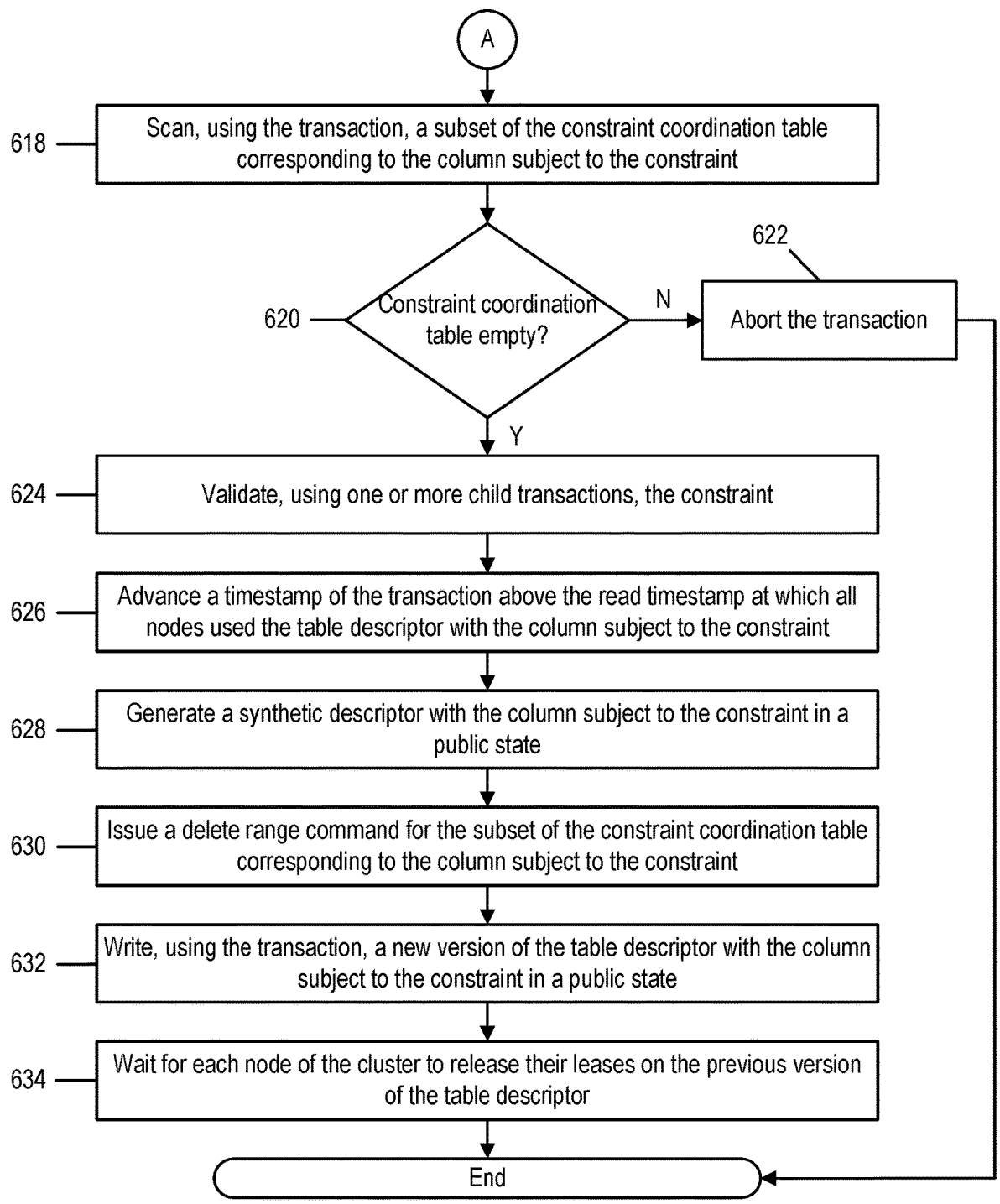
FIG. 6B shows an example flowchart of an execution method for transactional schema changes at the computing system, according to some embodiments.

Referring to FIGS. 6A and 6B, example flowcharts of an execution method for transactional schema changes at the computing system 100 are shown, in accordance with some embodiments. FIGS. 6A and 6B show an example flowchart for an execution method 600 for adding or creating a schema element to/for a table stored in the computing system 100. The method 600 is suitable for executing transactional schema changes, including adding constraints to column(s) of a table stored by nodes of a cluster (e.g., cluster 102). Examples of constraints that may be added via the method 600 may include check, unique without index, not null, and foreign key constraints. The method 600 may be performed by one or more client devices (e.g., client device 106a, client device 106b, etc.) and one or more nodes of a cluster (e.g., cluster 102) of nodes. An output of the method 600 may include updated schema with an added constraint to a column (or columns). For simplicity, the following paragraphs describe the method 600 with reference to adding a single constraint to a single column of a table during a transaction. However, one of ordinary skill in the art will appreciate that the steps 602-634 of the method 600 may be performed for any suitable number of add constraint operations. In an example, a schema change operation may create, drop, and/or mutate (i.e. change) multiple elements and multiple operations (e.g., DDLs and DMLs) may be issued serially as part of the same transaction according to the method 600. While the description of the method 600 below includes the use of ordinal terms (e.g., first, second, third, etc.), any suitable number of operations (e.g., child transactions) may be used to execute the method 600. The method 600 may be performed by wholly or in part by a client device, a gateway node, and/or any other suitable node that is delegated by the gateway node (e.g., using one or more nodes). In some cases, the gateway node may forward the instructions for steps of the method 600 to another node of the cluster to delegate the schema change operation.

In some embodiments, the method 600 involves (1) receiving, at a gateway node, a statement including a transactional schema change operation directed to a table, wherein the statement is included in a transaction; (2) writing to the descriptor coordination table to acquire a lock on a table descriptor of the table; (3) reading, using a first child transaction of the transaction, the table descriptor; (4) determining whether there are any pending mutations on the table descriptor; if there are pending mutations on the table descriptor, (5) cleaning up incomplete mutations; if there are not pending mutations on the table, (6) dropping, for the transaction, a lease for the table descriptor; (7) writing, using the first child transaction, a new version of the table descriptor with a column subject to an added constraint in a validating state; (8) waiting, by condition observation using a second child transaction, for the new version of the table descriptor to propagate to each node of the cluster; (9) scanning, by the transaction, a subset of the constraint coordination table corresponding to the column subject to the constraint; (10) determining whether the subset of the constraint coordination table corresponding to the column subject to the constraint is empty; if the subset of the constraint coordination table corresponding to the column subject to the constraint is non-empty, (11) aborting the transaction corresponding to the transactional schema change; if the subset of the constraint coordination table corresponding to the column subject to the constraint is empty, (12) validating, using one or more child transactions, the constraint for the values stored by the column; (13) advancing a timestamp of the transaction above the read timestamp at which all nodes used the table descriptor with the column subject to the constraint in the validating state; 14) generating a synthetic descriptor with the column subject to the constraint in a validating state; (15) issuing a delete range command for the subset (i.e. key space) of the constraint coordination table corresponding to the column subject to the constraint; if the subset of the constraint coordination table is empty, (16) writing, using the transaction, a new version of the table descriptor with the column subject to the constraint in a public state; and (17) waiting for a table descriptor including the constraint to propagate to each node of the cluster In some embodiments, at step 602, a gateway node (e.g., node 120c) of the cluster 102 may receive a statement including a transactional schema change operation. The gateway node may receive the statement from a SQL client. A "begin" statement may precede the statement including the transactional schema change operation. In some cases, the begin statement, the statement including the transactional schema change operation, and a "commit" statement may be included as a part of a transaction (i.e. parent transaction). The SQL client may be operating at a client device (e.g., client device 106b). The gateway node may receive the transaction including the transactional schema change operation via the network 111. The transactional schema change operation may include a DDL directed to a particular table, where the table is stored by a plurality of nodes of the cluster 102 (e.g., for survivability purposes). In an example, the DDL may be an "add constraint" operation, where a column is added to a column or columns of a table (and all replicas of the table).

At step 604, the transaction may write to the descriptor coordination table to acquire a lock on the table descriptor subject to the transactional schema change. The transaction may attempt to write to the descriptor coordination table at a key space corresponding to the table descriptor identifier to acquire an exclusive lock for performing schema changes to the table descriptor. In some cases, the attempt to write may encounter an existing lock in the descriptor coordination table at the table descriptor's key space and the transaction may block on that lock. In some cases, the attempt to write may not encounter an existing lock in the descriptor coordination table (e.g., corresponding to a concurrent transaction) at the table descriptor's key space and the transaction may acquire a lock on the table descriptor. In some cases, if the transaction and a concurrent transaction are deadlocked (e.g., blocked on each other), the deadlock detection mechanism may abort one of the transaction or the concurrent transaction.

At step 606, a first child transaction of the transaction may read the table descriptor. The first child transaction may read the table descriptor to identify whether any schema changes directed to the table are pending and/or otherwise incomplete. In some cases, step 606 may occur before or concurrently with step 604.

At step 608, the transaction may determine whether any schema changes are pending on the table descriptor. In some cases, the first child transaction may determine that there are one or more pending schema changes on the table descriptor.

In other cases, the first child transaction may determine that there are no pending schema changes on the table descriptor.

At step 610, based on determining that that there are one or more pending schema changes on the table descriptor, one or more child transactions may clean up the one or more pending schema changes for the table descriptor. The one or more child transactions may create one or more jobs (e.g., GC jobs) to clean up the one or more pending schema changes. Based on cleaning up the one or more pending schema changes, the method 600 may revert to step 606.

At step 612, based on determining that there are no pending schema changes on the table descriptor, the transaction may drop the lease for the table descriptor. The table descriptor may remain locked by the descriptor coordination table after the transaction drops the lease for the table descriptor.

At step 614, the first child transaction may write a new version (V+1) of the table descriptor that includes an added constraint in a validating state. Examples of the added constraint may include a check or foreign key constraint. To write the new version (V+1) of the table descriptor, the child transaction may acquire a lease for the version V of the table descriptor corresponding to the table. Based on acquiring the lease for the table descriptor, the child transaction may validate that only one version of the table descriptor is active and/or otherwise in use by nodes of the cluster 102. Based on validating that only one version (V) of the table descriptor is active, the child transaction may add the constraint to a column of the table, increment the version of the table descriptor corresponding to the updated table to an updated version (V+1), and mark a constraint descriptor included in the table descriptor to identify the index as validating. By marking the constraint as validating, in some cases, concurrent transactions may observe the partially committed constraint addition to the column and may write to the constraint coordination table if value(s) written by the concurrent transactions will violate the constraint. In other cases, concurrent transactions may observe the partially committed constraint addition to the column and may fail to commit and/or otherwise abort to prevent violating the added constraint. After writing the new version of the table descriptor, the first child transaction may commit.

At step 616, a second child transaction may wait by condition observation for the updated version (V+1) of the table descriptor with the column subject to the validating constraint to propagate to each node of the cluster. Condition observation by the second child transaction may include scanning for nodes with outstanding leases on the previous version (V) of the table descriptor at a system lease table. If no nodes have outstanding leases on the previous version of the table descriptor, the second child transaction may read a timestamp at which no nodes have outstanding leases on the previous version of the table descriptor and may commit. If one or more nodes have outstanding leases on the previous version of the table descriptor, the second child transaction may issue a query transaction (i.e. QueryTxn) operation on the transaction (i.e. parent transaction) to determine one or more concurrent blocking transactions that are waiting on the transaction, where the one or more concurrent blocking transactions correspond to nodes with outstanding leases on the previous version (V) of the table descriptor. In some cases, if one or more nodes have outstanding leases on the previous version of the table descriptor, the gateway node may wait for a duration of time for the nodes to drop the outstanding leases on the previous version of the table descriptor. If the determined concurrent blocking transaction(s) involve reads, the second child transaction may advance (e.g., push) a timestamp of the transaction above the highest timestamp of the concurrent waiting transactions that involve reads. If the determined concurrent blocking transaction(s) involve writes, the second child transaction may abort the concurrent blocking transactions (e.g., while increasing the priority of the concurrent blocking transactions). The second child transaction may advance the timestamp of the transaction to a timestamp at which all of the leases of the previous version (V) of the table descriptor were observed to be dropped. The second child transaction may wait for each of the nodes storing the table subject to the transactional schema change to drop their leases on the previous version (V) of the table descriptor, such that only the updated version (V+1) of the table descriptor is active across the cluster.

At step 618, the transaction may scan a subset of a constraint coordination table corresponding to the column subject to the constraint. As described herein, concurrent write transactions that violate the constraint of the column may write to the constraint coordination table to indicate that the transaction may not commit without violating the constraint. The transaction may determine the subset of the constraint coordination table to be empty if concurrent transactions did not violate the column's constraint. The transaction may determine the subject of the constraint coordination table to be non-empty if concurrent transactions did violate the columns constraint.

At step 620, the transaction may determine whether the subset of a constraint coordination table corresponding to the constrained column subject is empty. As described herein, a concurrent transaction may detect when it would violate the constrained column and may write to the constraint coordination table when it will violate the constrained column in a validating state.

At step 622, based on determined the subset of a constraint coordination table corresponding to the constrained column subject to be non-empty, the transactional schema change may abort. Based on aborting, the transaction may return a flag to the SQL client to indicate the failed transactional schema change. The transaction may roll back the added constraint.

At step 624, based on determined the subset of a constraint coordination table corresponding to the constrained column subject to be empty, one or more child transactions (e.g., a second child transaction, a third child transaction, etc.) may validate the added constraint in view of the data stored by the column to verify that the data stored by the column does not violate the constraint.

At step 626, the transaction may advance its timestamp above the timestamp at which the version (V+1) of the table descriptor with the column subject to the validating constraint propagated to each of the nodes storing the table subject to the transactional schema change (e.g., as observed in step 620). The timestamp at which the version (V+1) of the table descriptor with the validating constraint propagated to each of the nodes may be the timestamp at which all of the nodes released their leases on the previous version (V) of the table descriptor.

At step 628, the transaction may synthesize and/or otherwise generate a synthetic descriptor corresponding to the leased version (V+1) of the table descriptor, where the synthetic descriptor includes the column subject to the constraint in a public state. As described herein, the synthetic descriptor may be an in-memory version of the table descriptor that is visible only to the transaction, such that subsequent read, write, and delete operations in the transaction may operate on the column and the associated public constraint in the table corresponding to the synthetic descriptor.

At step 630, the transaction may issue a delete range command for the subset of the constraint coordination table corresponding to the column subject to the constraint. If the transaction identifies one or more non-empty rows in the subset of the constraint coordination table, the transaction may abort. If the transaction identifies the rows in the subset of the constraint coordination table as empty, the transaction may proceed to step 632. In some cases, prior to proceeding to step 632, the parent transaction may include any suitable number of DMLs and/or DDLs (e.g., further transactional schema changes). If the parent transaction includes one or more additional DDLs, the method 600 may revert to step 604 for each additional transactional constraint change or may perform the method 500 for each additional transactional schema change.

At step 632, the transaction may write a new version (V+2) of the table descriptor corresponding to the synthetic descriptor (or a modified version of the synthetic descriptor) with the column subject to the public constraint. The new version (V+2) of the table descriptor may include the column in the table that is the subject of the transactional schema change operation (e.g., constraint change), where the column has the added constraint indicated by the transactional schema change operation. To write the new version (V+2) of the table descriptor, the transaction may write the synthetic descriptor as the new version (V+2) of the table descriptor which has the constraint marked as public for the column. After writing the new version (V+2) of the table descriptor, the transaction may commit.

At step 634, the gateway node may wait for all nodes to release their leases on the previous version (V+1) of the table descriptor. Nodes of the cluster 102 may release their leases on the previous version (V+1) of the table descriptor as described herein. The gateway node may scan the system lease table to identify whether any nodes hold leases on the previous version (V+1) of the table descriptor before concluding the method 600. As such, the gateway node may wait until leases are released for the for the previous version (V+1) of the table descriptor before concluding the method 600.

In some embodiments, step 610 of the method 600 may include transactionally dropping the pending schema changes as described herein with respect to the method 600. While the method 600 is described with respect to a table and table descriptor, any suitable schema or schema element and corresponding descriptor may be modified by a transactional schema (i.e. constraint) change as described herein with respect to FIGS. 6A-6B and the method 600, such that the schema or schema element replaces the table in the method 600 and the corresponding descriptor replaces the table descriptor (unless the descriptor is also a table descriptor) in the method 600.

In some embodiments, to add particular constraints (e.g., a unique constraint) involving the automatic creation of indexes, a transactional schema change may include a combination of the methods 500 and 600 to add both a new index for a table and to add a new constraint to a column of the table. As an example, to add a unique index, the methods 500 and 600 may be combined with an additional step to validate that the number of rows in the primary index and the added unique index are the same. To add a foreign key constraint, the foreign key may be added to the referencing table (e.g., the destination or child table) and a reference may be added to the referenced table (e.g., the origin or parent table).

During validation of the foreign key constraint, the transaction (or one or more child transactions) may validate that every row in the referencing table refers to an existing row in the referenced table. One or more child transactions may be used to update the referenced table with a back-reference to the referencing table. During transaction execution for the case of a delete operation from the referenced table, the transaction (or one or more child transactions) may determine whether there are rows in the referencing table which, if the foreign key constraint were to be fully committed, would need to be deleted. If so, the transaction (or one or more child transactions) may determine whether the constraint has committed, read the descriptor, and optionally write to the constraint coordination span.

In some embodiments, a transactional schema change may fail to commit (e.g., as described herein with respect to step 622 of the method 600). A transactional schema change may fail to commit due to an explicit rollback of the transactional schema change or due to a session closing. If a transactional schema change fails to commit, the changes to the table descriptor may need to be reverted and partially created indexes may need to be removed. In some cases, partially created indexes may be cleaned up by the gateway node. In some cases partially created indexes may be cleaned up during a future transactional schema change (e.g., in steps 510 and 610 of the methods 500 and 600, respectively). One or more jobs (e.g., GC jobs) may be used to clean up (e.g., resolve) partially created indexes and other pending schema changes for a particular table descriptor.

In some cases, the method 600 may not use the constraint coordination table, such that a constraint is added in a write-only state and validated according to the method 400 as described herein. If the method 600 does not use the constraint coordination table, the steps 618, 620, 622, and 630 may not be performed. If the method 600 does not use the constraint coordination table, concurrent transactions may observe a constraint in a validating state as described with respect to step 614 and may fail to write to the constrained column(s) to prevent violation of the constraint (e.g., as described with respect to the method 400).

In some embodiments, to drop a constraint via a transactional schema change, one or more child transactions may be used to drop the constraint, increment versions of table descriptors along with state changes for the dropped constraint, and/or wait for nodes to release leases on the previous versions of table descriptors. As described herein, the version(s) of the table descriptor written by the one or more child transactions may not include logical changes to the state of the table. The version(s) of the table descriptor written by the one or more child transactions may include only physical changes to the state of the table. The method 600 may be modified based on the method 450 for dropping a constraint based on logically synthesizing the dropped constraint and physically dropping the constraint after the transaction commits. One or more jobs may be used to physically cleanup the table after the constraint has been logically dropped from the table.

Further Description of Some Embodiments

Figure 7:
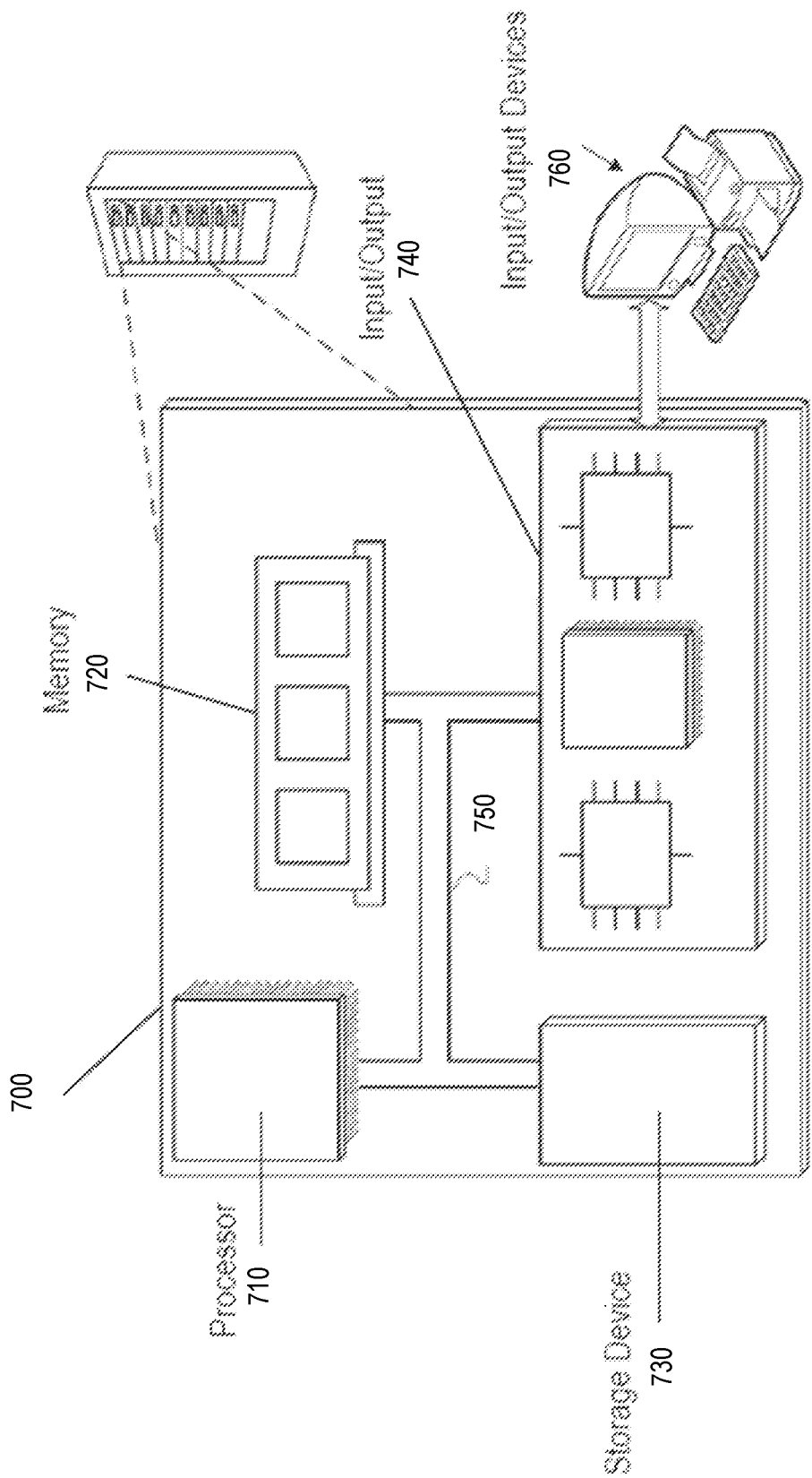
FIG. 7 is a block diagram of an example computer system.

FIG. 7 is a block diagram of an example computer system 700 that may be used in implementing the technology described in this document. General-purpose computers, network appliances, mobile devices, or other electronic systems may also include at least portions of the system 700. The system 700 includes a processor 710, a memory 720, a storage device 730, and an input/output device 740. Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 730 may be implemented in a distributed way over a network, for example as a server farm or a set of widely distributed servers, or may be implemented in a single computing device.

Although an example processing system has been described in FIG. 7, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method, comprising:
   receiving, at a gateway node of a plurality of database nodes, a statement corresponding to a schema of a database stored by the plurality of database nodes, wherein:
   a parent transaction comprises the statement,
   the statement comprises a schema change operation to modify the schema, and
   a first version of a plurality of versions of a descriptor comprises the schema;
   writing, by a first child transaction of the parent transaction, a second version of the plurality of versions of the descriptor, wherein the second version comprises an updated schema with an added schema element in a delete-only state, the updated schema being updated from the schema;
   waiting, based on the first child transaction and by a second child transaction of the parent transaction, for the second version of the descriptor to propagate to each of the plurality of database nodes;
   writing, based on the second child transaction and by a third child transaction of the parent transaction, a third version of the plurality of versions of the descriptor, wherein the third version comprises the updated schema with the added schema element in a write-only state different from the delete-only state;

generating, by the parent transaction and based on the first, second, and third child transactions, a version of a synthetic descriptor available to only the parent transaction and comprising the updated schema with the added schema element available to one or more data manipulation language (DML) operations of the parent transaction, wherein the version of the synthetic descriptor is physically compatible with a current version of the plurality of versions of the descriptor, and wherein up to two versions of the plurality of versions of the descriptor are leased by the plurality of database nodes at any time;

writing the version of the synthetic descriptor as an updated version of the plurality of versions of the descriptor, wherein the updated version comprises the updated schema with the added schema element in a publicly available state, wherein the current version of the descriptor precedes the updated version of the descriptor; and committing the parent transaction.

2. The method of claim 1, wherein the schema is one of a table, type, view, sequence, database, role, or namespace, wherein the schema is comprised of at least one of a column, index, constraint, value, overload, and default value.

3. The method of claim 1, wherein the schema change operation comprises a data definition language (DDL) operation.

4. The method of claim 1, further comprising:
acquiring a lock on the first version of the descriptor to exclusively modify the schema comprised in the first version of the descriptor by writing to a descriptor coordination table stored by the plurality of database nodes.

5. The method of claim 1, further comprising:
reading, by the first child transaction of the parent transaction, the first version of the descriptor comprising the schema.

6. The method of claim 5, wherein reading the first version of the descriptor comprising the schema further comprises:
determining whether a pending schema change exists for the first version of the descriptor; and
when the pending schema change exists for the first version of the descriptor, removing the pending schema change for the first version of the descriptor.

7. The method of claim 5, wherein the added schema element comprises a column or an index, wherein the index comprises one or more rows corresponding to at least one column of the schema, and further comprising:
committing the first child transaction.

8. The method of claim 7, wherein waiting for the second version of the descriptor to propagate to each of the plurality of database nodes further comprises waiting for each of the plurality of database nodes to drop a lease on the first version of the descriptor, and further comprising:
committing the second child transaction.

9. The method of claim 8, wherein the third version is the current version of the descriptor further comprising:
committing the third child transaction.

10. The method of claim 9, further comprising:
waiting, by a fourth child transaction of the parent transaction, for the third version of the descriptor to propagate to each of the plurality of database nodes; and
committing the fourth child transaction.

11. The method of claim 9, further comprising:
filling, at each of the plurality of database nodes, the added schema element comprised in the third version of the descriptor with one or more values based on a default value and one or more values written by one or more concurrent transactions operating on the schema.

12. The method of claim 5, wherein the second version comprises the updated schema with the added schema element in a validating state, wherein the added schema element comprises a constraint for one or more columns of the schema, wherein the second version is the current version of the descriptor, and further comprising:
committing the first child transaction.

13. The method of claim 12, further comprising:
validating that the one or more columns comprise data that adheres to the constraint.

14. The method of claim 13, wherein validating that the one or more columns comprise data that adheres to the constraint further comprises:
identifying whether one or more concurrent transactions operating on the schema violate the constraint; and
when the one or more concurrent transactions violate the constraint, failing to commit the parent transaction.

15. The method of claim 14, wherein identifying whether one or more concurrent transactions violate the constraint further comprises:
scanning a constraint coordination table to identify whether the one or more concurrent transactions have written to the constraint coordination table.

16. The method of claim 1, further comprising:
before writing the version of the synthetic descriptor as the updated version of the plurality of versions of the descriptor:
receiving a second statement as a part of the parent transaction, wherein the second statement comprises a data manipulation language (DML) operation or a data definition language (DDL) operation corresponding to the added schema element; and
modifying, within the parent transaction and based on the DML operation or the DDL operation, the updated schema comprised in the synthetic descriptor.

17. The method of claim 1, further comprising:
waiting, by the parent transaction, for each of the plurality of database nodes to release a lease for a preceding version of the plurality of versions of the descriptor that precedes the updated version of the descriptor.

18. The method of claim 17, further comprising:
sending, based the updated version of the descriptor propagating to each of the database nodes of the plurality of database nodes, an indication of a success of the schema change operation to modify the schema to a client device.

19. A system comprising:
one or more of a plurality of computing devices programmed to perform operations comprising:
receiving, at a first computing device of the plurality of computing devices, a statement corresponding to a schema of a database stored by the plurality of computing devices, wherein:
a parent transaction comprises the statement,
the statement comprises a schema change operation to modify the schema, and
a first version of a plurality of versions of a descriptor comprises the schema;
writing, by a first child transaction of the parent transaction, a second version of the plurality of versions of the descriptor, wherein the second version comprises an updated schema with an added schema element in a delete-only state, the updated schema being updated from the schema;

waiting, based on the first child transaction and by a second child transaction of the parent transaction, for the second version of the descriptor to propagate to each of the plurality of computing devices;

writing, based on the second child transaction and by a third child transaction of the parent transaction, a third version of the plurality of versions of the descriptor, wherein the third version comprises the updated schema with the added schema element in a write-only state different from the delete-only state;

generating, by the parent transaction and based on the first, second, and third child transactions, a version of a synthetic descriptor available to only the parent transaction and comprising the updated schema with the added schema element configured to be available to one or more data manipulation language (DML) operations within the parent transaction, wherein the version of the synthetic descriptor is physically compatible with a current version of the plurality of versions of the descriptor, and wherein up to two versions of the plurality of versions of the descriptor are leased by the plurality of computing devices at any time;

writing the version of the synthetic descriptor as an updated version of the plurality of versions of the descriptor, wherein the updated version comprises the updated schema with the added schema element in a publicly available state, wherein the current version of the descriptor precedes the updated version of the descriptor; and committing the parent transaction.

20. The system of claim 19, wherein the schema is one of a table, type, view, sequence, database, role, or namespace, wherein the schema is comprised of at least one of a column, index, constraint, value, overload, and default value.

21. The system of claim 19, wherein the schema change operation comprises a data definition language (DDL) operation.

22. The system of claim 19, wherein the operations further comprise:

acquiring a lock on the first version of the descriptor to exclusively modify the schema comprised in the first version of the descriptor by writing to a descriptor coordination table stored by the plurality of computing devices.

23. The system of claim 19, wherein the operations further comprise:

reading, by the first child transaction of the parent transaction, the first version of the descriptor comprising the schema.

24. The system of claim 23, wherein reading the first version of the descriptor comprising the schema further comprises:

determining whether a pending schema change exists for the first version of the descriptor; and when the pending schema change exists for the first version of the descriptor, removing the pending schema change for the first version of the descriptor.

25. The system of claim 23, wherein the added schema element comprises a column or an index, wherein the index comprises one or more rows corresponding to at least one column of the schema, and wherein the operations further comprise:

committing the first child transaction.

26. The system of claim 25, wherein waiting for the second version of the descriptor to propagate to each of the plurality of computing devices further comprises waiting for each of the plurality of computing devices to drop a lease on the first version of the descriptor, and wherein the operations further comprise:

committing the second child transaction.

27. The system of claim 26, wherein the third version is the current version of the descriptor, wherein the operations further comprise:

committing the third child transaction.

28. The system of claim 27, wherein the operations further comprise:

waiting, by a fourth child transaction of the parent transaction, for the third version of the descriptor to propagate to each of the plurality of computing devices; and committing the fourth child transaction.

29. The system of claim 27, wherein the operations further comprise:

filling, at each of the plurality of computing devices, the added schema element comprised in the third version of the descriptor with one or more values based on a default value and one or more values written by one or more concurrent transactions operating on the schema.

* * * * *